United States Patent
Amano et al.

(10) Patent No.: US 7,842,742 B2
(45) Date of Patent: *Nov. 30, 2010

(54) PRESSURE-SENSITIVE ADHESIVE COMPOSITION, PRESSURE-SENSITIVE ADHESIVE SHEETS, AND SURFACE PROTECTING FILM

(75) Inventors: Tatsumi Amano, Ibaraki (JP); Natsuki Kobayashi, Ibaraki (JP); Masahiko Ando, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 125 days.

This patent is subject to a terminal disclaimer.

(21) Appl. No.: 12/052,951

(22) Filed: Mar. 21, 2008

(65) Prior Publication Data

US 2008/0176976 A1    Jul. 24, 2008

Related U.S. Application Data

(62) Division of application No. 11/188,561, filed on Jul. 25, 2005.

(30) Foreign Application Priority Data

| Jul. 26, 2004 | (JP) | ................. 2004-217350 |
| Dec. 3, 2004 | (JP) | ................. 2004-351535 |
| Jan. 19, 2005 | (JP) | ................. 2005-011714 |
| Apr. 7, 2005 | (JP) | ................. 2005-110917 |
| Apr. 27, 2005 | (JP) | ................. 2005-129393 |

(51) Int. Cl.
| C08K 5/34 | (2006.01) |
| C08K 5/3412 | (2006.01) |
| C08K 5/3415 | (2006.01) |
| C08K 5/3417 | (2006.01) |
| C08K 5/3432 | (2006.01) |
| C08K 5/3462 | (2006.01) |
| C08K 5/3472 | (2006.01) |
| C08K 5/3477 | (2006.01) |

(52) U.S. Cl. .................. 524/86; 524/94; 524/98; 524/99; 524/100; 524/104; 524/106; 524/115; 524/154; 524/236; 524/251; 156/327; 428/343; 428/522

(58) Field of Classification Search .......... 524/86, 524/94, 98, 99, 100, 104, 106, 115, 154, 524/236, 251; 156/327; 428/343, 522
See application file for complete search history.

(56) References Cited

U.S. PATENT DOCUMENTS

| 3,492,276 | A | 1/1970 | Smith |
| 4,145,327 | A | 3/1979 | Dolch et al. |
| 5,183,841 | A | 2/1993 | Bernard |
| 5,433,892 | A | 7/1995 | Czech |
| 5,631,079 | A | 5/1997 | Gutman et al. |
| 5,885,678 | A | 3/1999 | Malhotra |
| 5,952,398 | A | 9/1999 | Dietz et al. |
| 6,028,132 | A | 2/2000 | Hayashi |
| 6,103,316 | A | 8/2000 | Tran et al. |
| 6,245,847 | B1 | 6/2001 | Green et al. |
| 6,372,829 | B1 | 4/2002 | Lamanna et al. |
| 6,407,788 | B1 | 6/2002 | Okumura et al. |
| 6,657,011 | B2 | 12/2003 | Lau et al. |
| 6,706,920 | B2 | 3/2004 | Lamanna et al. |
| 6,939,911 | B2 | 9/2005 | Tosaki et al. |
| 7,491,758 | B2 | 2/2009 | Amano et al. |
| 2001/0031835 | A1 | 10/2001 | Ohrui et al. |
| 2001/0041763 | A1 | 11/2001 | Suzuki et al. |
| 2002/0132111 | A1 | 9/2002 | Zhou et al. |
| 2002/0137825 | A1 | 9/2002 | Lamanna et al. |
| 2003/0114560 | A1 | 6/2003 | Yang et al. |
| 2004/0054041 | A1 | 3/2004 | Schmidt |
| 2005/0025903 | A1 | 2/2005 | Fink et al. |
| 2005/0080195 | A1 | 4/2005 | Iwama |
| 2005/0197450 | A1 | 9/2005 | Amano et al. |
| 2005/0266238 | A1 | 12/2005 | Amano et al. |
| 2006/0100323 | A1 | 5/2006 | Schmidt et al. |
| 2006/0188711 | A1 | 8/2006 | Kishioka et al. |
| 2006/0207722 | A1 | 9/2006 | Amano et al. |
| 2007/0141329 | A1 | 6/2007 | Yang et al. |
| 2007/0149650 | A1 | 6/2007 | Masuda |
| 2009/0029162 | A1 | 1/2009 | Ukei et al. |
| 2009/0163626 | A1 | 6/2009 | Ukei et al. |
| 2009/0317635 | A1 | 12/2009 | Amano et al. |

FOREIGN PATENT DOCUMENTS

EP    0 435 080    7/1991

(Continued)

OTHER PUBLICATIONS

Brochure regarding "Functional Chemicals" published by Kyoeisha Chemical Co., LTD., printed and published in May 2003, front page, pp. 11-12, 19-20 and back page.

(Continued)

*Primary Examiner*—Kriellion A Sanders
(74) *Attorney, Agent, or Firm*—Knobbe Martens Olson & Bear LLP

(57) ABSTRACT

An object of the present invention is to provide a pressure-sensitive adhesive composition excellent in antistatic property of a non-electrification-prevented adherend (subject to be protected) upon peeling, and has reduced stainability in an adherend and excellent in adhesion reliance, and electrification preventing pressure-sensitive adhesive sheets using the same. There is provided a pressure-sensitive composition comprising an ionic liquid, and a (meth)acryl-based polymer containing, as a monomer component, 0.1 to 100% by weight of a (meth)acrylic acid alkylene oxide. In addition, there is provided a pressure-sensitive composition comprising an ionic liquid, and a polymer containing, as a monomer component, 0.5 to 30% by weight of a nitrogen-containing monomer and having a glass transition temperature Tg of no higher than 0° C. Furthermore, there is provided a pressure-sensitive composition comprising an ionic liquid, and a (meth)acryl-based polymer containing, as a monomer component, 0.01 to 20% by weight of a reactive surfactant.

10 Claims, 1 Drawing Sheet

FOREIGN PATENT DOCUMENTS

| | | |
|---|---|---|
| EP | 0 873 986 | 10/1998 |
| EP | 1 102 108 | 5/2001 |
| EP | 1 491 604 | 12/2004 |
| EP | 1 548 750 | 6/2005 |
| EP | 1 574 557 | 9/2005 |
| EP | 1 591 506 | 11/2005 |
| EP | 1 595 929 | 11/2005 |
| EP | 1 602 698 | 12/2005 |
| EP | 1 621 596 | 2/2006 |
| GB | 2121061 | 12/1983 |
| JP | 59-226076 | 12/1984 |
| JP | 61-138901 | 6/1986 |
| JP | 4-309585 | 11/1992 |
| JP | 5-009449 | 1/1993 |
| JP | 6-051121 | 2/1994 |
| JP | 6-128539 | 5/1994 |
| JP | 9-157618 | 6/1997 |
| JP | 9-165460 | 6/1997 |
| JP | 9-208910 | 8/1997 |
| JP | 10-231325 | 9/1998 |
| JP | 10-298539 | 11/1998 |
| JP | 11-256116 | 9/1999 |
| JP | 11-349910 | 12/1999 |
| JP | 2000-129235 | 5/2000 |
| JP | 2001-209039 | 8/2001 |
| JP | 2001-318230 | 11/2001 |
| JP | 2002-022960 | 1/2002 |
| JP | 2002-544364 | 12/2002 |
| JP | 2003-511505 | 3/2003 |
| JP | 2003-195044 | 7/2003 |
| JP | 2003-202722 | 7/2003 |
| JP | 2003-268334 | 9/2003 |
| JP | 2003-342483 | 12/2003 |
| JP | 2004-517185 | 6/2004 |
| JP | 2004-217931 | 8/2004 |
| JP | 2004-287199 | 10/2004 |
| JP | 2004-536940 | 12/2004 |
| JP | 2005-15524 | 1/2005 |
| JP | 2005-105228 | 4/2005 |
| JP | 2005-206776 | 8/2005 |
| JP | 1 582 573 | 10/2005 |
| WO | WO 97/08260 | 3/1997 |
| WO | WO 98/36005 | 8/1998 |
| WO | WO 00/24839 | 5/2000 |
| WO | WO 00/69985 | 11/2000 |
| WO | WO 01/25326 | 4/2001 |
| WO | WO 02/13980 | 2/2002 |
| WO | WO 02/053636 | 7/2002 |
| WO | WO 03/011958 | 2/2003 |
| WO | WO 03/068280 | 8/2003 |
| WO | WO 03/085050 | 10/2003 |
| WO | WO 03/099953 | 12/2003 |
| WO | WO 2004/005391 | 1/2004 |
| WO | WO 2004/027788 | 4/2004 |
| WO | WO 2004/065523 A1 | 8/2004 |
| WO | WO 2005/061627 | 7/2005 |

OTHER PUBLICATIONS

European Office Action issued on the corresponding European Patent Application No. EP05016102.5, dated Apr. 16, 2007.
European Search Report issued on the related European Patent Application No. EP05011720.9, dated Sep. 30, 2005.
European Search Report issued on the corresponding European Patent Application No. EP05016102.5, dated Dec. 29, 2005.
European Search Report issued on the related European Patent Application No. EP06110235.6, dated May 25, 2007.
European Search Report issued on the related European Patent Application No. EP05004925, dated Oct. 24, 2005.
European Search Report issued on the related European Patent Application No. EP06111107, dated Jun. 27, 2006.
European Search Report issued on the related European Patent Application No. 05005660, dated Jun. 30, 2005.
European Search Report issued on the related European Patent Application No. 05020138, dated Nov. 28, 2005.
European Search Report issued on the related European Patent Application No. 05009331, dated Jul. 22, 2005.
European Search Report issued on the related European Patent Application No. 05004925, dated Aug. 19, 2005.
European Search Report issued on the related European Patent Application No. 05020102, dated Nov. 29, 2005.
European Search Report issued on the related European Patent Application No. 05010330, dated Sep. 19, 2005.
European Search Report issued on the related European Patent Application No. 05015766, dated Nov. 4, 2005.
European Search Report issued on the related European Patent Application No. 05016102, dated Nov. 8, 2005.
File History of the related U.S. Appl. No. 11/073,456, as of Mar. 6, 2008.
File History of the related U.S. Appl. No. 11/141,590, as of Feb. 27, 2008.
File History of the related U.S. Appl. No. 11/358,808, as of Feb. 27, 2008.
File History of the related U.S. Appl. No. 11/375,963, as of Mar. 6, 2008.
File History of the related U.S. Appl. No. 11/914,939, as of Mar. 6, 2008.
File History of the related U.S. Appl. No. 12/065,652, as of Mar. 6, 2008.
Information Supplement filed on the related Japanese Patent Application No. 2005-26704, dated May 14, 2007.
International Search Report issued on the related PCT Application No. PCT/JP2006/309712, dated Jun. 20, 2006.
International Search Report issued on the related PCT Application No. PCT/JP2006/317522, dated Dec. 12, 2006.
Partial European Search Report issued on the corresponding European Patent Application No. EP05016102, dated Nov. 8, 2005.
Peter Wasserscheid et al., "Ionic Liquids—New "Solutions" for Transition Metal Catalysis," Angewandte Chemie. International Edition, Verlag Chemie. Weinheim, Germany, vol. 39, No. 21, Nov. 3, 2000.
Japanese Office Action issued on the corresponding Japanese Patent Application No. 2006-011228, dated Aug. 4, 2009.
File History of the related U.S. Appl. No. 11/073,456, for the period of Mar. 7, 2008-Sep. 2, 2009.
File History of the related U.S. Appl. No. 11/141,590, for the period of Feb. 28, 2008-Sep. 2, 2009.
File History of the related U.S. Appl. No. 11/188,561, for the period of Mar. 22, 2008-Sep. 2, 2009.
File History of the related U.S. Appl. No. 11/375,963, for the period of Mar. 7, 2008-Sep. 2, 2009.
File History of the related U.S. Appl. No. 11/914,939, for the period of Mar. 7, 2008-Sep. 2, 2009.
File History of the related U.S. Appl. No. 12/065,652, for the period of Mar. 7, 2008-Sep. 2, 2009.
File History of the related U.S. Appl. No. 12/548,318 as of Sep. 2, 2009.
Hans-Georg Elias: "Makromoleküle Band 1 Grundlagen Struktur-Synthese-Eigenschaften", Hüthig & Wepf Verlag, Basel Heidelberg New York, pp. 845-857 (1990).
M.D. Lechner, K. Gehrke, E.H. Nordmeier: "Makromolekulare Chemie-Ein Lehrbuch für Chemiker, Physiker, Materialwissenschaftler und Verfahrenstechniker" Birkhäuser Verlag, Basel Boston Berlin, pp. 295-299 (1996).
File History of the related U.S. Appl. No. 11/073,456, for the period of Sep. 3, 2009-Jan. 14, 2010.
File History of the related U.S. Appl. No. 11/141,590, for the period of Sep. 3, 2009-Jan. 14, 2010.
File History of the related U.S. Appl. No. 11/188,561, for the period of Sep. 3, 2009-Jan. 13, 2010.
File History of the related U.S. Appl. No. 11/375,963, for the period of Sep. 3, 2009-Jan. 14, 2010.

File History of the related U.S. Appl. No. 11/914,939, for the period of Sep. 3, 2009-Jan. 14, 2010.
File History of the related U.S. Appl. No. 12/065,652, for the period of Sep. 3, 2009-Jan. 14, 2010.
File History of the related U.S. Appl. No. 12/548,318, for the period of Sep. 3, 2009-Jan. 14, 2010.
European Office Action issued in the corresponding European Patent Application No. 09165905, dated Aug. 25, 2010.
European Office Action issued in the corresponding European Patent Application No. 09165906, dated Aug. 26, 2010.
European Search Report issued in the corresponding European Patent Application No. 10165984, dated Aug. 25, 2010.

"Polyacrylate" in: Jürgen Falbe, Manfred Regitz: "Römpp Chemie Lexikon", 1992, Georg Thieme Verlag, Stuttgart New York, pp. 3506-3507.
Rudolf Riesen et al.: "Dle Glasübergangtemperatur gemessen mit verschiedenen TA-Techniken, Teil 2: Ermittlung der Glasübergangstemperaturen", Usercom Informationen Fur Anwender Von Mettler Toledo Thermoanalysen-Systemen, [Online] No. 18, Feb. 2003, pp. 1-20, XP002594785, Retrieved from the Internet: URL: http://de.mt.com/global/de/home/supportive_content/usercom/TA_UserCom18.z2vUzxipv0vKAxrVCMLHBfb-HCI45nAzOnG-MediaFileComponent.html/tausercl8d.pdf> [retrieved on Feb. 1, 2003].

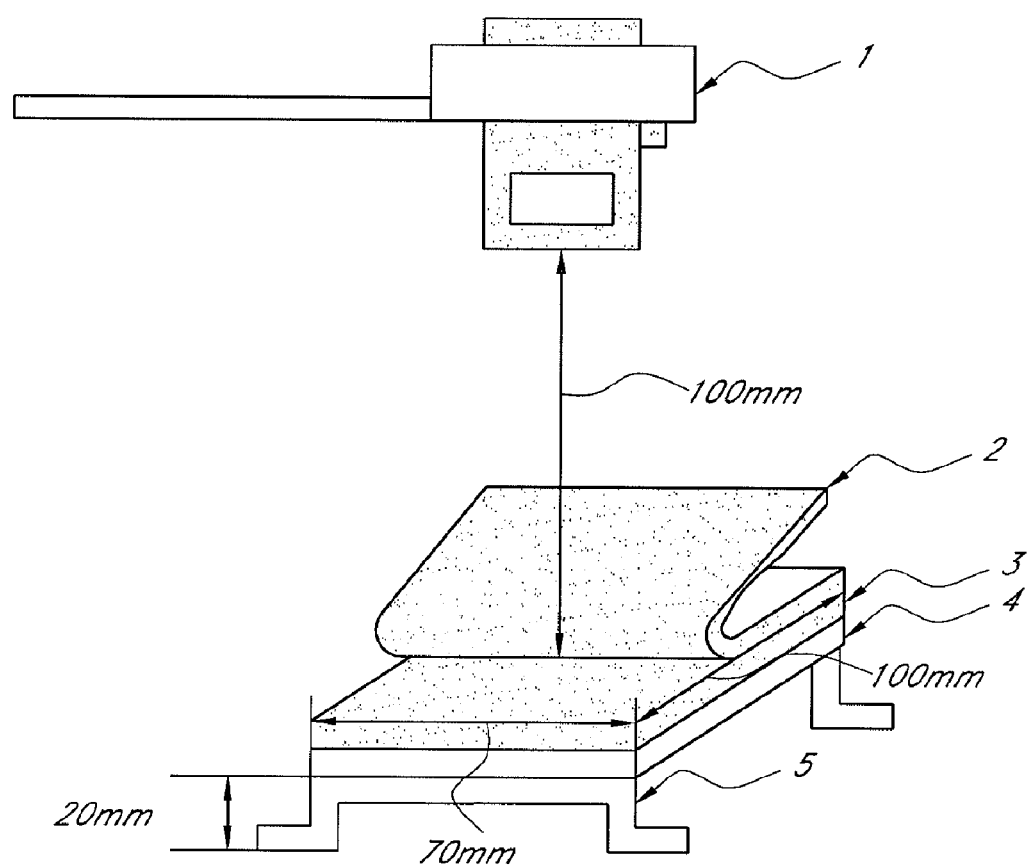

PRESSURE-SENSITIVE ADHESIVE COMPOSITION, PRESSURE-SENSITIVE ADHESIVE SHEETS, AND SURFACE PROTECTING FILM

CROSS-REFERENCE TO PRIORITY AND RELATED APPLICATIONS

This application is a divisional application of U.S. patent application Ser. No. 11/188,561, filed Jul. 25, 2005, which claims priority to Japanese Patent Applications No. 2004-217350, filed Jul. 26, 2004, No. 2004-351535, filed Dec. 3, 2004, No. 2005-011714, filed Jan. 19, 2005, No. 2005-110917, filed Apr. 7, 2005, and No. 2005-129393, filed Apr. 27, 2005. The disclosures of each of the above-referenced applications are incorporated by reference herein. This application also is related to U.S. patent application Ser. No. 11/073,456, filed Mar. 7, 2005, Ser. No. 11/141,590, filed May 31, 2005, Ser. No. 11/358,808, filed Feb. 21, 2006, Ser. No. 11/375,963, filed Mar. 15, 2006, Ser. No. 11/914,939, filed Nov. 19, 2007 and Ser. No. 12/065,652, filed Mar. 4, 2008.

BACKGROUND OF THE INVENTION

1. Field of the Invention

The present invention relates to a pressure-sensitive adhesive composition having antistatic property, and pressure-sensitive adhesive sheets and a surface protecting film obtained by formulating into a form of a sheet or a tape using the composition.

Pressure-sensitive sheets comprising an antistatic pressure-sensitive adhesive composition of the present invention is suitably used in plastic products on which static electricity is easily generated. Among them, particularly, the sheets are useful as antistatic pressure-sensitive adhesive sheets used in utilities disliking static electricity such as an electronic instrument, as well as a surface protecting film.

2. Description of the Related Art

A surface protecting film is generally used for the purpose of preventing a scratch or a stain produced at processing or conveyance of a subject to be protected by applying to a subject to be protected via a pressure-sensitive adhesive layer coated on a protecting film side. For example, for the purpose of preventing a scratch or a stain, a surface protecting film is applied to an optical member such as a polarizing plate and a wavelength plate used in a panel of a liquid crystal display via a pressure-sensitive adhesive layer.

When a liquid crystal display is produced with these optical members, since a surface protecting film become unnecessary, it is peeled and removed from an optical member. Since the aforementioned optical member, pressure-sensitive adhesive, and surface protecting film are constructed of a plastic material, they have high electrical insulating property and generate static electricity upon friction or peeling. Therefore, also when a surface protecting film is peeled from an optical member, static electricity is generated. Therefore, also when a protecting film is peeled from an optical member such as a polarizing plate, static electricity is generated. When a voltage is applied to a liquid crystal in the state where static electricity remains, orientation of a liquid crystal molecule is lost, and a defect of a panel is generated. Then, in order to prevent such the disadvantage, a surface protecting film is subjected to various antistatic treatments.

Previously, as an attempt to suppress the aforementioned electrification of static electricity, for example, a method of preventing electrification by adding a low-molecular surfactant to a pressure-sensitive adhesive, and transferring a surfactant from a pressure-sensitive adhesive to an adherend has been disclosed (for example, see Patent Publication 1). However, the low-molecular surfactant is easily bled on a surface of a pressure-sensitive adhesive agent and, when applied to a protecting film, staining of an adherend is feared. Therefore, when a pressure-sensitive adhesive with a low-molecular surfactant added thereto is applied to a protecting film for an optical member, there is a problem that optical property of an optical member is deteriorated.

In addition, a method of adding an antistatic agent comprising polyether polyol and alkali metal salt to an acryl pressure-sensitive adhesive to suppress an antistatic agent from bleeding on a surface of a pressure-sensitive adhesive has been disclosed (for example, see Patent Publication 2). However, also in this method, bleeding of an antistatic agent is not avoided, and it has been found out that, when applied to a surface protecting film, staining of an adherend occurs with time or under a high temperature.

Furthermore, a method for providing antistatic to the base polymer itself of a pressure-sensitive adhesive composition is disclosed as a means for reducing the aforementioned staining (see, for example, Patent Publication 3). In this disclosure, a pressure-sensitive adhesive composition made of a (meth) acryl-based polymer that contains a reactive surfactant is cited. However, great effects of suppressing the peeling electrification voltage on the adherend side that has not been electrification-prevented, according to this method, are not recognized, and as a result, it has been found that it is difficult to reduce staining and at the same time suppress the peeling electrification voltage on the adherend side that has not been electrification-prevented.

[Patent Publication 1] JP-A No. 9-165460
[Patent Publication 2] JP-A No. 6-128539
[Patent Publication 3] JP-A No. 9-208910

SUMMARY OF THE INVENTION

In light of such the circumstances, an object of the present invention is to solve problems to provide an antistatic pressure-sensitive adhesive composition which is excellent in antistatic property of a non-electrification-prevented adherend (subject to be protected) upon peeling, and has reduced stainability in an adherend and is excellent in adhesion reliance, and electrification preventing pressure-sensitive adhesive sheets using the same.

In addition, an object of the present invention is to solve problems to provide an antistatic pressure-sensitive adhesive composition which is excellent in antistatic property of a non-electrification-prevented adherend (subject to be protected) upon peeling, and has reduced stainability in an adherend, suppresses occurrence of peeling off from an adherend, and is excellent in adhesion reliance, and electrification preventing pressure-sensitive adhesive sheets using the same.

SUMMARY OF THE INVENTION

In order to solve the aforementioned problems, the present inventors intensively studied and, as a result, found out that the aforementioned object can be attained by a pressure-sensitive adhesive composition shown below, which resulted in completion of the present invention.

That is, a pressure-sensitive adhesive composition of the present invention is characterized in that it contains an ionic liquid, and a (meth)acryl-based polymer containing, as a monomer component, 0.1 to 100% by weight of a (meth) acrylic acid alkylene oxide.

According to the pressure-sensitive adhesive composition of the present invention, as shown in results of Example I, since 0.1 to 100% by weight of a (meth)acrylic acid alkylene oxide is a monomer component, and an ionic liquid is further contained, in a pressure-sensitive adhesive layer obtained by crosslinking this, staining property on an adherend (subject to be protected) is reduced, and antistatic property of an adherend (subject to be protected) upon peeling becomes excellent. Although details of reasons why a crosslinked base polymer using the aforementioned monomer component as a main component manifests such the property are not clear, it is presumed that, by coordination of an ether group in an acrylic acid alkylene oxide with an ionic liquid, bleeding of an ionic liquid becomes difficult, and both of excellent antistatic property and low staining property are realized.

The ionic liquid in the present invention refers to a melt salt (ionic compound) exhibiting the liquid state at room temperature (25° C.).

According to the present invention, by use of the aforementioned ionic liquid as an antistatic agent, a pressure-sensitive adhesive composition in which bleeding of an antistatic agent is suppressed, and adhesion reliance to an adherend with time or even under a high temperature is excellent, is obtained. Although the reason why bleeding can be suppressed using an ionic liquid is not clear, it is presumed to be the high compatibility with a base polymer in comparison with surfactants or the like. In addition, an ionic liquid itself exhibits high conductivity, and therefore, sufficient antistatic properties can be gained, even when staining on a surface of an adherend is microscopic.

In addition, the aforementioned ionic liquids are preferably in the state of liquid at room temperature, and therefore, addition to, diffusion in, and dissolving in pressure-sensitive adhesive compositions can be easily carried out, in comparison with solid salts. Furthermore, the ionic liquid has no vapor pressure (non-volatile), and therefore, it does not vanish with time, and antistatic properties are maintained.

In the present invention, a (meth)acryl-based polymer containing, as a monomer component, 0.1 to 100% by weight of a (meth)acrylic acid alkylene oxide is used as a base polymer. The (meth)acryl-based polymer in the present invention refers to an acryl-based polymer and/or a methacryl-based polymer. In addition, the (meth)acrylic acid alkylene oxide refers to an acrylic acid alkylene oxide and/or a methacrylic acid alkylene oxide, and, the (meth)acrylate refers to an acrylate and/or a methacrylate.

In the foregoing, it is preferable that the ionic liquid is one or more kinds of a nitrogen-containing onium salt, a sulfur-containing onium salt, and a phosphorus-containing onium salt. In particular, it is preferable that the ionic liquid contains one or more kinds of cations represented by the following general formulas (A) to (D). By an ionic liquids having these cations, further excellent antistatic ability is obtained.

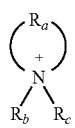
(A)

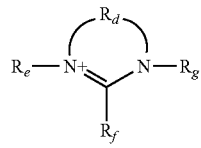
(B)

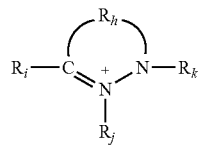
(C)

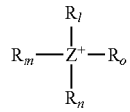
(D)

[in the formula (A), $R_a$ represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present]

[in the formula (B), $R_d$ represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom]

[in the formula (C), $R_h$ represents a hydrocarbon group of a carbon number of 2 to 20, and may contain a hetero atom, and $R_i$, $R_j$ and $R_k$ are the same or different, represent a hydrogen or a hydrocarbon group of a carbon number of 1 to 16, and may contain a hetero atom]

[in the formula (D), Z represents a nitrogen atom, a sulfur atom, or a phosphorus atom, and $R_l$, $R_m$, $R_n$ and $R_o$ are the same or different, represent a hydrocarbon group of a carbon number of 1 to 20, and may contain a hetero atom, provided that, when Z is a sulfur atom, $R_o$ is not present]

In addition, it is preferable that the pressure-sensitive adhesive composition contains an ethylene oxide group-containing compound. By using such the ethylene oxide group-containing compound, more excellent antistatic property is obtained.

Furthermore, it is preferable that the ethylene oxide group-containing compound is a surfactant having an ethylene oxide group. By using a surfactant having an ethylene oxide group, compatibility with an ionic liquid and a base polymer is further improved, bleeding onto an adherend is suppressed, and a low staining pressure-sensitive adhesive composition is obtained.

In addition, a pressure-sensitive adhesive composition of the present invention is characterized in that it contains an ionic liquid, and a polymer containing, as a monomer component, 0.5 to 30% by weight of a nitrogen-containing monomer and having a glass transition temperature Tg of no higher than 0° C.

According to the pressure-sensitive adhesive composition of the present invention, as shown in results of Example II, since 0.5 to 30% by weight of a nitrogen-containing monomer is a monomer component and a polymer having a glass transition temperature Tg of no higher than 0° C. as a base polymer, and an ionic liquid is further contained, in a pressure-sensitive adhesive layer obtained by crosslinking this, staining property on an adherend (subject to be protected) is reduced, occurrence of peeling off can not be realized, and antistatic property of an adherend (subject to be protected) upon peeling becomes excellent. Although details of reasons why a crosslinked base polymer using the aforementioned monomer component as a main component manifests such the property are not clear, it is presumed that, by coordination of a nitrogen atom in a nitrogen-containing monomer with an ionic liquid, bleeding of an ionic liquid becomes difficult, and both of excellent antistatic property and low staining property are realized.

In the present invention, the (meth)acryl-based polymer containing, as a monomer component, 0.5 to 30% by weight of a nitrogen-containing monomer and having a glass transition temperature Tg of no higher than 0° C. is used as a base polymer.

In addition, a nitrogen-containing monomer in the present invention refers to a polymerizable monomer containing one or more nitrogen atoms in the monomer structure thereof. Examples thereof include an amide group containing monomer, an amino group containing monomer, an imide group containing monomer, a cyano group containing monomer, acryloylmorpholine, and the like.

In the foregoing, it is preferable that the ionic liquid is one or more kinds of a nitrogen-containing onium salt, a sulfur-containing onium salt, and a phosphorus-containing onium salt. In particular, it is preferable that the ionic liquid contains one or more kinds of cations represented by the following general formulas (A) to (D). By an ionic liquids having these cations, further excellent antistatic ability is obtained.

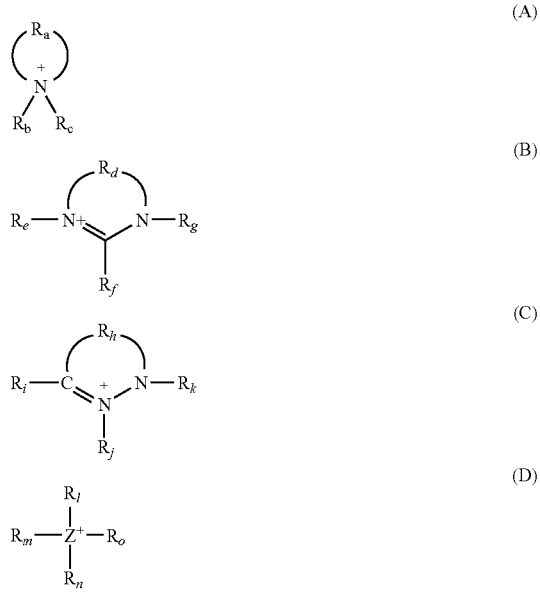

[in the formula (A), $R_a$ represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present]

[in the formula (B), $R_d$ represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom]

[in the formula (C), $R_h$ represents a hydrocarbon group of a carbon number of 2 to 20, and may contain a hetero atom, and $R_i$, $R_j$ and $R_k$ are the same or different, represent a hydrogen or a hydrocarbon group of a carbon number of 1 to 16, and may contain a hetero atom]

[in the formula (D), Z represents a nitrogen atom, a sulfur atom, or a phosphorus atom, and $R_l$, $R_m$, $R_n$ and $R_o$ are the same or different, represent a hydrocarbon group of a carbon number of 1 to 20, and may contain a hetero atom, provided that, when Z is a sulfur atom, $R_o$ is not present]

In addition, it is preferable that the aforementioned polymer is a (meth)acryl-based polymer containing, as a main component, one or more kinds of (meth)acrylate having an alkyl group of a carbon number of 1 to 14. By these (meth) acryl-based polymers, balance of compatibility with an ionic liquid and a base polymer becomes better, and adhering property can be sufficiently maintained.

In aforementioned pressure-sensitive adhesive composition, it is preferable that the pressure-sensitive adhesive composition contains an alkylene oxide group-containing compound. By using such the alkylene oxide group-containing compound, more excellent antistatic property is obtained.

Furthermore, a pressure-sensitive adhesive composition of the present invention is characterized in that it contains an ionic liquid, and a (meth)acryl-based polymer containing, as a monomer component, 0.01 to 20% by weight of a reactive surfactant.

According to the pressure-sensitive adhesive composition of the present invention, as shown in results of Example III, since 0.01 to 20% by weight of a reactive surfactant is a monomer component, and an ionic liquid is further contained, in a pressure-sensitive adhesive layer obtained by crosslinking this, staining property on an adherend (subject to be protected) is reduced, and antistatic property of an adherend (subject to be protected) upon peeling, especially antistatic property of an adherend which has not electrification-prevented upon peeling, becomes excellent. Although details of reasons why a crosslinked base polymer using the aforementioned monomer component as a main component manifests such the property are not clear, it is presumed that, by coordination of an ester group and/or an ether group in a reactive surfactant with an ionic liquid, bleeding of an ionic liquid becomes difficult, and both of excellent antistatic property and low staining property are realized.

The reactive surfactant in the present invention refers to a reactive surfactant having a reactive unsaturated bond.

In the present invention, the (meth)acryl-based polymer containing, as a monomer component, 0.01 to 20% by weight of a reactive surfactant is used as a base polymer.

In the foregoing, it is preferable that the ionic liquid is one or more kinds of a nitrogen-containing onium salt, a sulfur-containing onium salt, and a phosphorus-containing onium salt. In particular, it is preferable that the ionic liquid contains one or more kinds of cations represented by the following general formulas (A) to (D). By an ionic

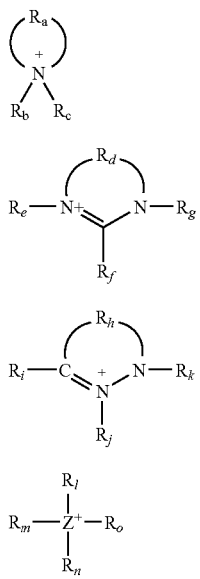

(A)
(B)
(C)
(D)

[in the formula (A), $R_a$ represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present]

[in the formula (B), $R_d$ represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom]

[in the formula (C), $R_h$ represents a hydrocarbon group of a carbon number of 2 to 20, and may contain a hetero atom, and $R_i$, $R_j$ and $R_k$ are the same or different, represent a hydrogen or a hydrocarbon group of a carbon number of 1 to 16, and may contain a hetero atom]

[in the formula (D), Z represents a nitrogen atom, a sulfur atom, or a phosphorus atom, and $R_l$, $R_m$, $R_n$ and $R_o$ are the same or different, represent a hydrocarbon group of a carbon number of 1 to 20, and may contain a hetero atom, provided that, when Z is a sulfur atom, $R_o$ is not present]

In addition, it is preferable that the aforementioned reactive surfactant contains an ethylene oxide group. By using the reactive surfactant that contains an ethylene oxide group, a pressure-sensitive adhesive composition having more low-staining property is provided.

Although the reason why such properties are exhibited by using the reactive surfactant that contains an ethylene oxide group is not clear, it is presumed that the ether group of the reactive surfactant more strongly coordinates the ionic liquid than ester groups, and thereby, bleeding of the ionic liquid is restricted.

On the other hand, a pressure-sensitive adhesive layer of the present invention is characterized in that the aforementioned pressure-sensitive adhesive composition is crosslinked. By performing crosslinking by appropriately regulating a constitutional unit and a constitutional ratio of a (meth)acryl-based polymer, selection of a crosslinking agent, and an addition ratio, a surface protecting film more excellent in heat resistance and weather resistance can be obtained.

In addition, a pressure-sensitive adhesive sheet is characterized in that the sheet has a pressure-sensitive adhesive layer, which is formed by crosslinking a pressure-sensitive adhesive composition as defined above on one side or both sides of a support. According to the pressure-sensitive adhesive sheet of the present invention, since the pressure-sensitive adhesive composition of the present invention exerting the aforementioned action and effect is used, electrification of an adherend (subject to be protected) which has not electrification-prevented can be prevented upon peeling, and a pressure-sensitive adhesive sheet which can reduce staining property on an adherend (subject to be protected), and excellent adhesion reliance can be obtained.

In particular, according to the aforementioned pressure-sensitive adhesive sheet of the present invention which contains, as a monomer component, 0.5 to 30% by weight of a nitrogen-containing monomer and has a glass transition temperature Tg of no higher than 0° C., since the pressure-sensitive adhesive composition of the present invention exerting the aforementioned action and effect is used, electrification of an adherend (subject to be protected) which has not electrification-prevented can be prevented upon peeling, and a pressure-sensitive adhesive sheet which can reduce staining property on an adherend (subject to be protected), occurrence of peeling off can not be realized, and excellent adhesion reliance can be obtained.

Furthermore, when the pressure-sensitive adhesive composition of the present invention is applied to a surface protecting film, it is preferable that a plastic substrate used in a protecting film is antistatic-treated. By subjecting the plastic film to electrification preventing treatment, more excellent antistatic property is obtained.

BRIEF DESCRIPTION OF THE DRAWING

The FIGURE is a schematic construction view of an electrostatic measuring part used for measuring a peeling electrification voltage in Example I to Example III.

BEST MODE FOR CARRYING OUT THE INVENTION

Embodiments of the present invention will be explained in detail below.

The pressure-sensitive adhesive composition of the present invention is characterized in that it contains an ionic liquid, and a (meth)acryl-based polymer containing, as a monomer component, 0.1 to 100% by weight of a (meth)acrylic acid alkylene oxide.

In addition, a pressure-sensitive adhesive composition of the present invention is characterized in that it contains an ionic liquid, and a polymer containing, as a monomer component, 0.5 to 30% by weight of a nitrogen-containing monomer and having a glass transition temperature Tg of no higher than 0° C.

Furthermore, the pressure-sensitive adhesive composition of the present invention is characterized in that it contains an ionic liquid, and a (meth)acryl-based polymer containing, as a monomer component, 0.01 to 20% by weight of a reactive surfactant.

The ionic liquid in the present invention refers to a melt salt (ionic compound) exhibiting the liquid state at room temperature (25° C.).

As the ionic liquid, a nitrogen-containing onium salt, a sulfur-containing onium salt or a phosphorus-containing onium salt is preferably used. In particular, since excellent antistatic ability is obtained, an ionic liquid comprising an organic cation component represented by the following general formulas (A) to (D), and an anion component is preferably used.

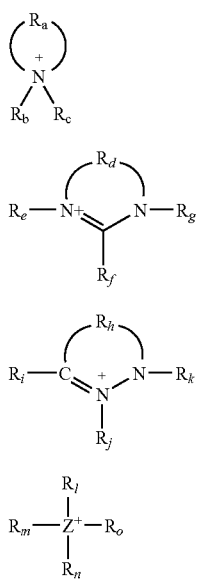

[in the formula (A), $R_a$ represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present]

[in the formula (B), $R_d$ represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom]

[in the formula (C), $R_h$ represents a hydrocarbon group of a carbon number of 2 to 20, and may contain a hetero atom, and $R_i$, $R_j$ and $R_k$ are the same or different, represent a hydrogen or a hydrocarbon group of a carbon number of 1 to 16, and may contain a hetero atom]

[in the formula (D), Z represents a nitrogen atom, a sulfur atom, or a phosphorus atom, and $R_l$, $R_m$, $R_n$, and $R_o$ are the same or different, represent a hydrocarbon group of a carbon number of 1 to 20, and may contain a hetero atom, provided that, when Z is a sulfur atom, $R_o$ is not present]

Examples of the cation represented by the formula (A) include a pyridinium cation, a piperidinium cation, a pyrrolidinium cation, a cation having a pyrroline skeleton, and a cation having a pyrrole skeleton.

Specific examples include 1-ethylpyridinium cation, a 1-butylpyridinium cation, 1-hexylpyridinium cation, a 1-butyl-3-methylpyridinium cation, a 1-butyl-4-methylpyridinium cation, a 1-hexyl-3-methylpyridinium cation, a 1-butyl-3,4-dimethylpyridinium cation, a 1,1-dimethylpyrrolidinium cation, a 1-ethyl-1-methylpyrrolidinium cation, a 1-methyl-1-propylpyrrolidinium cation, a 2-methyl-1-pyrroline cation, a 1-ethyl-2-phenylindole cation, a 1,2-dimethylindole cation, and a 1-ethylcarbazole cation.

Examples of the cation represented by the formula (B) include an imidazolium cation, a tetrahydropyrimidinium cation, and a dihydropyrimidinium cation.

Specific examples include a 1,3-dimethylimidazolium cation, a 1,3-diethylimidazolium cation, a 1-ethyl-3-methylimidazolium cation, a 1-butyl-3-methylmidazolium cation, a 1-hexyl-3-methylimidazolium cation, 1-ocytl-3-methylimidazolium cation, a 1-decyl-3-methylimidazolium cation, a 1-dodecyl-3-methylimidazolium cation, a 1-tetradecyl-3-methylimidazolium cation, a 1,2-dimethyl-3-propylimidazolium cation, a 1-ethyl-2,3-dimethylimidazolium cation, a 1-butyl-2,3-dimethylimidazolium cation, a 1-hexyl-2,3-dimethylimidazolium cation, a 1,3-dimethyl-1,4,5,6-tetrahydropyrimidinium cation, a 1,2,3-trimethyl-1,4,5,6-tetrahydropyrimidinium cation, a 1,2,3,4-tetramethyl-1,4,5,6-tetrahydropyrimidinium cation, a 1,2,3,5-tetramethyl-1,4,5,6-tetrahydropyrimidinium cation, a 1,3-dimethyl-1,4-dihydropyrimidinium cation, a 1,3-dimethyl-1,6-dihydropyrimidinium cation, a 1,2,3-trimethyl-1,4-dihydropyrimidinium cation, a 1,2,3-trimethyl-1,6-dihydropyrimidinium cation, a 1,2,3,4-tetramethyl-1,4-dihydropyrimidinium cation, and a 1,2,3,4-tetramethyl-1,6-dihydropyrimidinium cation.

Examples of the cation represented by the formula (C) include a pyrazolium cation, and a pyrazolinium cation.

Specific examples include a 1-methylpyrazolium cation, a 3-methylpyrazolium cation, and a 1-ethyl-2-methylpyrazolinium cation.

Examples of the cation represented by the formula (D) include a tetraalkylammonium cation, a trialkylsulfonium cation, a tetraalkylphosphonium cation, and those cations in which a part of the alkyl group is substituted with an alkenyl group, an alkoxyl group, or an epoxy group.

Specific examples include, for example, a tetramethyl ammonium cation, a tetraethyl ammonium cation, a tetrapropyl ammonium cation, a tetrabutyl ammonium cation, a tetrapentyl ammonium cation, a tetrahexyl ammonium cation, a tetraheptyl ammonium cation, a triethyl methyl ammonium cation, a tributyl ethyl ammonium cation, a trimethyl decyl ammonium cation, a trioctyl methyl ammonium cation, a tripentyl butyl ammonium cation, a trihexyl methyl ammonium cation, a trihexyl pentyl ammonium cation, a triheptyl methyl ammonium cation, a triheptyl hexyl ammonium cation, an N,N-diethyl-N-methyl-N-(2-metoxyetyl) ammonium cation, a glycidyl trimethyl ammonium cation, a diallyl dimethyl ammonium cation, an N,N-dimethyl-N,N-dipropyl ammonium cation, an N,N-dimethyl-N,N-dihexyl ammonium cation, an N,N-dipropyl-N,N-dihexyl ammonium cation, an N,N-dimethyl-N-ethyl-N-propyl ammonium cation, an N,N-dimethyl-N-ethyl-N-butyl ammonium cation, an N,N-dimethyl-N-ethyl-N-pentyl ammonium cation, an N,N-dimethyl-N-ethyl-N-hexyl ammonium cation, an N,N-dimethyl-N-ethyl-N-heptyl ammonium cation, an N,N-dimethyl-N-propyl-N-butyl ammonium cation, an N,N-dimethyl-N-propyl-N-pentyl ammonium cation, an N,N-dimethyl-N-propyl-N-hexyl ammonium cation, an N,N-dimethyl-N-propyl-N-heptyl ammonium cation, an N,N-dimethyl-N-butyl-N-hexyl ammonium cation, an N,N-dimethyl-N-butyl-N-heptyl ammonium cation, an N,N-dimethyl-N-pentyl-N-hexyl ammonium cation, an N,N-dimethyl-N-hexyl-N-heptyl ammonium cation, a trimethyl heptyl ammonium cation, an N,N-diethyl-N-methyl-N-propyl ammonium cation, an N,N-diethyl-N-methyl-N-pentyl ammonium cation, an N,N-diethyl-N-methyl-N-heptyl ammonium cation, an N,N-diethyl-N-propyl-N-pentyl ammonium cation, an triethyl methyl ammonium cation, a triethyl propyl ammonium cation, a triethyl pentyl ammonium cation, a triethyl heptyl ammonium cation, an N,N-dipropyl-N-methyl-N-ethyl ammonium cation, an N,N-dipropyl-N-methyl-N-pentyl ammonium cation, an N,N-dipropyl-N-butyl-N-hexyl ammonium cation, an N,N-dibutyl-N-methyl-N-pentyl ammonium cation, an N,N-dibutyl-N-methyl-N-hexyl ammonium cation, a trioctyl methyl ammonium cation, an N-methyl-N-ethyl-N-propyl-N-pentyl ammonium cation, a trimethyl sulfonium cation, a triethyl sulfonium cation, a tributyl sulfonium cation, a trihexyl sulfonium cation, a diethyl methyl sulfonium cation, a dibutyl ethyl sulfonium cation, a dimethyl decyl sulfonium cation, a tetramethyl phosphonium cation, a tetraethyl phosphonium cation, a tetrabutyl phosphonium cation, a tetrapentyl phosphonium cation, a tetrahexyl phosphonium cation, a tetraheptyl phosphonium cation, a tetraoctyl phosphonium cation, a triethyl methyl phosphonium cation, a tributyl ethyl phosphonium cation, a trimethyl decyl phosphonium cation, and the like.

Among them, there are preferably used a tetra alkyl ammonium cation, such as a triethyl methyl ammonium cation, a tributyl ethyl ammonium cation, a trimethyl decyl ammonium cation, a trioctyl methyl ammonium cation, a tripentyl butyl ammonium cation, a trihexyl methyl ammonium cation, a trihexyl pentyl ammonium cation, a triheptyl methyl ammonium cation, a triheptyl hexyl ammonium cation, an N,N-diethyl-N-methyl-N-(2-metoxy ethyl)ammonium cation, a glycidyl trimethyl ammonium cation, an N,N-dimethyl-N-ethyl-N-propyl ammonium cation, an N,N-dimethyl-N-ethyl-N-butyl ammonium cation, an N,N-dimethyl-N-ethyl-N-pentyl ammonium cation, an N,N-dimethyl-N-ethyl-N-hexyl ammonium cation, an N,N-dimethyl-N-ethyl-N-heptyl ammonium cation, an N,N-dimethyl-N-ethyl-N-nonyl ammonium cation, an N,N-dimethyl-N-propyl-N-butyl ammonium cation, an N,N-dimethyl-N-propyl-N-pentyl ammonium cation, an N,N-dimethyl-N-propyl-N-hexyl ammonium cation, an N,N-dimethyl-N-propyl-N-heptyl ammonium cation, an N,N-dimethyl-N-butyl-N-hexyl ammonium cation, an N,N-dimethyl-N-butyl-N-heptyl ammonium cation, an N,N-dimethyl-N-pentyl-N-hexyl ammonium cation, an N,N-dimethyl-N-hexyl-N-heptyl ammonium cation, an N,N-dimethyl-N,N-dihexyl ammonium cation, a trimethyl heptyl ammonium cation, an N,N-diethyl-N-methyl-N-propyl ammonium cation, an N,N-diethyl-N-methyl-N-pentyl ammonium cation, an N,N-diethyl-N-methyl-N-heptyl ammonium cation, an N,N-diethyl-N-propyl-N-pentyl ammonium cation, a triethyl propyl ammonium cation, a triethyl pentyl ammonium cation, a triethyl heptyl ammonium cation, an N,N-dipropyl-N-methyl-N-ethyl ammonium cation, an N,N-dipropyl-N-methyl-N-pentyl ammonium cation, an N,N-dipropyl-N-butyl-N-hexyl ammonium cation, an N,N-dipropyl-N,N-dihexyl ammonium cation, an N,N-dibutyl-N-methyl-N-pentyl ammonium cation, an N,N-dibutyl-N-methyl-N-hexyl ammonium cation, and an N-methyl-N-ethyl-N-propyl-N-pentyl ammonium cation, a trialkyl sulfonium cation, such as a trimethyl sulfonium cation, a triethyl sulfonium cation, a tributyl sulfonium cation, a trihexyl sulfonium cation, a diethyl methyl sulfonium cation, a dibutyl ethyl sulfonium cation, and a dimethyl decyl sulfonium cation, a tetraalkyl phosphonium cations, such as a tetramethyl phosphonium cation, a tetraethyl phosphonium cation, a tetrabutyl phosphonium cation, a tetrapentyl phosphonium cation, a tetrahexyl phosphonium cation, a tetraheptyl phosphonium cation, a tetraoctyl phosphonium cation, a triethyl methyl phosphonium cation, a tributyl ethyl phosphonium cation, and a trimethyl decyl phosphonium cation.

On the other hand, the anionic component is not particularly limited as far as it satisfies that it becomes an ionic liquid. Specifically, for example, Cl—, Br—, I—, AlCl4-, Al2Cl7-, BF4-, PF6-, ClO4-, NO3-, CH3COO—, CF3COO—, CH3SO3-, CF3SO3-, (CF3SO2)2N—, (CF3SO2)3C—, AsF6-, SbF6-, NbF6-, TaF6-, F(HF)n-, (CN)2N—, C4F9SO3-, (C2F5SO2)2N—, C3F7COO—, and (CF3SO2)(CF3CO)N— are used. Among them, in particular, an anionic component containing a fluorine atom is preferably used because a low melting point ionic compound is obtained.

An embodiment of an ionic liquid used in the present invention is used by appropriately selecting from a combination of the aforementioned cation component and anion component.

Specific examples include, for example, 1-butyl pyridinium tetrafluoro borate, 1-butyl pyridinium hexafluoro phosphate, 1-butyl-3-methylpyridinium tetrafluoro borate, 1-butyl-3-methylpyridinium trifluoromethane sulfonate, 1-butyl-3-methylpyridinium bis(trifluoromethanesulfonyl)imide, 1-butyl-3-methylpyridinium (pentafluoro ethane sulfonyl)imide, 1-hexyl pyridinium tetrafluoro borate, 2-methyl-1-pyrroline tetrafluoro borate, 1-ethyl-2-phenyl indole tetrafluoro borate, 1,2-dimethyl indole tetrafluoro borate, 1-ethyl carbazole tetrafluoro borate, 1-ethyl-3-methyl imidazolium tetrafluoro borate, 1-ethyl-3-methyl imidazolium acetate, 1-ethyl-3-methyl imidazolium trifluoro acetate, 1-ethyl-3-methyl imidazolium heptafluoro butyrate, 1-ethyl-3-methyl imidazolium trifluoromethane sulfonate, 1-ethyl-3-methyl imidazolium perfluoro butane sulfonate, 1-ethyl-3-methyl imidazolium dicyanamide, 1-ethyl-3-methyl imidazolium bis(trifluoromethanesulfonyl)imide, 1-ethyl-3-methyl imidazolium bis(pentafluoro ethane sulfonyl)imide, 1-ethyl-3-methyl imidazolium tris(trifluoromethanesulfonyl)methyl, 1-butyl-3-methyl imidazolium tetrafluoro borate, 1-butyl-3-methyl imidazolium hexafluoro phosphate, 1-butyl-3-methyl imidazolium trifluoro acetate, 1-butyl-3-methyl imidazolium heptafluoro butyrate, 1-butyl-3-methyl imidazolium trifluoromethane sulfonate, 1-butyl-3-methyl imidazolium perfluoro butane sulfonate, 1-butyl-3-methyl imidazolium bis(trifluoromethanesulfonyl)imide, 1-hexyl-3-methyl imidazolium bromide, 1-hexyl-3-methyl imidazolium chloride, 1-hexyl-3-methyl imidazolium tetrafluoro borate, 1-hexyl-3-methyl imidazolium hexafluoro phosphate, 1-hexyl-3-methyl imidazolium trifluoromethane sulfonate, 1-octyl-3-methyl imidazolium tetrafluoro borate, 1-octyl-3-methyl imidazolium hexafluoro phosphate, 1-hexyl-2,3-dimethyl imidazolium tetrafluoro borate, 1,2-dimethyl-3-propyl imidazolium bis(trifluoromethanesulfonyl)imide, 1-methylpyrazolium tetrafluoro borate, 3-methyl pyrazolium tetrafluoro borate, tetra hexyl ammonium bis(trifluoromethanesulfonyl)imide, diallyl dimethyl ammonium tetrafluoro borate, diallyl dimethyl ammonium trifluoromethane sulfonate, diallyl dimethyl ammonium bis(trifluoromethanesulfonyl)imide, diallyl dimethyl ammonium bis(pentafluoro ethane sulfonyl)imide, N,N-diethyl-N-methyl-N-(2-methoxy ethyl)ammonium tetrafluoro borate, N,N-diethyl-N-methyl-N-(2-methoxy ethyl)ammonium trifluoromethane sulfonate, N,N-diethyl-N-methyl-N-(2-methoxy ethyl)ammonium bis(trifluoromethanesulfonyl)imide, N,N-diethyl-N-methyl-N-(2-methoxy ethyl)ammonium bis(pentafluoro ethane sulfonyl)imide, glycidyl trimethyl ammonium trifluoromethane sulfonate, glycidyl trimethyl ammonium bis(trifluoromethanesulfonyl)imide, glycidyl trimethyl ammonium bis(pentafluoro ethane sulfonyl)imide, 1-butyl pyridinium (trifluoromethanesulfonyl)trifluoro acetamide, 1-butyl-3-methylpyridinium (trifluoromethanesulfonyl)trifluoro acetamide, 1-ethyl-3-methyl imidazolium (trifluoromethanesulfonyl)trifluoro acetamide, N,N-diethyl-N-methyl-N-(2-methoxy ethyl) ammonium (trifluoromethane sulfonate) trifluoro acetamide, diallyl dimethyl ammonium (trifluoromethanesulfonyl)trifluoro acetamide, glycidyl trimethyl ammonium (trifluoromethanesulfonyl)trifluoro acetamide, N,N-dimethyl-N-ethyl-N-propyl ammonium bis(trifluoromethanesulfonyl)imide, N,N-dimethyl-N-ethyl-N-butyl ammonium bis(trifluoromethanesulfonyl)imide, N,N-dimethyl-N-ethyl-N-pentyl ammonium bis(trifluoromethanesulfonyl)imide, N,N-dimethyl-N-ethyl-N-hexyl ammonium bis(trifluoromethanesulfonyl)imide, N,N-dimethyl-N-ethyl-N-heptyl ammonium bis(trifluoromethanesulfonyl)imide, N,N-dimethyl-N-ethyl-N-nonyl ammonium bis(trifluoromethanesulfonyl)imide, N,N-dimethyl-N,N-dipropyl ammonium bis(trifluoromethanesulfonyl)imide, N,N-dimethyl-N-propyl-N-butyl ammonium bis(trifluoromethanesulfonyl)imide, N,N-dimethyl-N-propyl-N-pentyl ammonium bis(trifluoromethanesulfonyl)imide, N,N-dimethyl-N-propyl-N-hexyl ammonium bis(trifluoromethanesulfonyl)imide, N,N-dimethyl-N-propyl-N-heptyl ammonium bis(trifluoromethanesulfonyl)imide, N,N-dimethyl-N-butyl-N-hexyl ammonium bis(trifluoromethanesulfonyl)imide, N,N-dimethyl-N-butyl-N-heptyl ammonium bis(trifluoromethanesulfonyl)imide, N,N-dimethyl-N-pentyl-N-hexyl ammonium bis(trifluoromethanesulfonyl)imide, N,N-dimethyl-N,N-dihexyl ammonium bis(trifluoromethanesulfonyl)imide, trimethyl heptyl ammonium bis(trifluoromethanesulfonyl)imide, N,N-diethyl-N-methyl-N-propyl ammonium bis(trifluoromethanesulfonyl)imide, N,N-diethyl-N-methyl-N-pentyl ammonium bis(trifluoromethanesulfonyl)imide, N,N-diethyl-N-methyl-N-heptyl ammonium bis(trifluoromethanesulfonyl)imide, N,N-diethyl-N-propyl-N-pentyl ammonium bis(trifluoromethanesulfonyl)imide, triethyl propyl ammonium bis(trifluoromethanesulfonyl) imide, triethyl pentyl ammonium bis(trifluoromethanesulfonyl)imide, triethyl heptyl ammonium bis(trifluoromethanesulfonyl)imide, N,N-dipropyl-N-methyl-N-ethyl ammonium bis(trifluoromethanesulfonyl)imide, N,N-dipropyl-N-methyl-N-pentyl ammonium bis(trifluoromethanesulfonyl)imide, N,N-dipropyl-N-butyl-N-hexyl ammonium bis(trifluoromethanesulfonyl)imide, N,N-dipropyl-N,N-dihexyl ammonium bis(trifluoromethanesulfonyl)imide, N,N-dibutyl-N-methyl-N-pentyl ammonium bis(trifluoromethanesulfonyl)imide, N,N-dibutyl-N-methyl-N-hexyl ammonium bis(trifluoromethanesulfonyl)imide, trioctyl methyl ammonium bis(trifluoromethanesulfonyl)imide, N-methyl-N-ethyl-N-propyl-N-pentyl ammonium bis(trifluoromethanesulfonyl)imide.

As the aforementioned ionic liquid, a commercially available ionic liquid may be used, or the liquid may be synthesized as described below. A method of synthesizing an ionic liquid is not particularly limited as far as an objective ionic liquid is obtained. Generally, a halide method, a hydroxide method, an acid ester method, a chelate forming method, and a neutralization method described in the publication "Ionic liquid—The Front and Future of Development—" (published by CMC) are used.

Regarding a halide method, a hydroxide method, an acid ester method, a chelate forming method, and a neutralization method, a synthesis method using an example of a nitrogen-containing onium salt will be shown below, but other ionic liquid such as a sulfur-containing onium salt, and a phosphorus-containing onium salt can be obtained by the similar procedure.

The halide method is a method which is performed by a reaction shown in the following formulas (1) to (3). First, a tertiary amine and alkyl halide are reacted to obtain halide (Reaction Equation (1), as a halogen, chlorine, bromine or iodine is used).

The resulting halide is reacted with an acid (HA) having an anion structure (A−) of an objective ionic liquid or a salt (MA, M is a cation forming a salt with an objective anion such as ammonium, lithium, sodium and potassium) of an objective ionic liquid to obtain an objective ionic liquid ($R_4NA$).

$$R_3N+RX \rightarrow R_4NX(X{:}Cl,Br,I) \qquad (1)$$

$$R_4NX+HA \rightarrow R_4NA+HX \qquad (2)$$

$$R_4NX+MA \rightarrow R_4NA+MX(M{:}NH_4,Li,Na,K,Ag\ etc.) \qquad (3)$$

The hydroxide method is a method performed by a reaction shown in (4) to (8). First, a halide (R4NX) is subjected to ion exchange membrane method electrolysis (reaction equation (4)), an OH-type ion exchange resin method (reaction equation (5)) or a reaction with silver oxide (Ag2O) (reaction equation (6)) to obtain a hydroxide (R4NOH) (as a halogen, chlorine, bromine or iodine is used).

The resulting hydroxide is subjected to a reaction of reaction equations (7) to (8) as in the aforementioned halide method to obtain an objective ionic liquid ($R_4NH$).

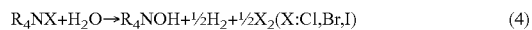

$$R_4NX+H_2O \rightarrow R_4NOH+\tfrac{1}{2}H_2+\tfrac{1}{2}X_2(X{:}Cl,Br,I) \qquad (4)$$

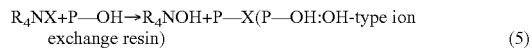

$$R_4NX+P{\rm{-}}OH \rightarrow R_4NOH+P{\rm{-}}X(P{\rm{-}}OH{:}OH\text{-type ion exchange resin}) \qquad (5)$$

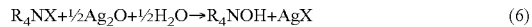

$$R_4NX+\tfrac{1}{2}Ag_2O+\tfrac{1}{2}H_2O \rightarrow R_4NOH+AgX \qquad (6)$$

$$R_4NOH+HA \rightarrow R_4NA+H_2O \qquad (7)$$

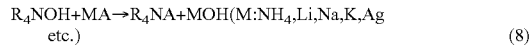

$$R_4NOH+MA \rightarrow R_4NA+MOH(M{:}NH_4,Li,Na,K,Ag\ etc.) \qquad (8)$$

The acid ester method is a method performed by a reaction shown in (9) to (11). First, tertiary amine (R3N) is reacted with acid ester to obtain an acid esterified substance (reaction equation (9), as acid ester, ester of an inorganic acid such as sulfuric acid, sulfurous acid, phosphoric acid, phosphorous acid, and carbonic acid, or ester of organic acid such as methanesulfonic acid, methylphosphonic acid and formic acid is used).

The resulting acid esterified substance is subjected to a reaction of reaction equations (10) to (11) as in the aforementioned halide method, to obtain an objective ionic liquid (R4NA). Alternatively, as acid ester, methyl trifluoromethane sulfonate, or methyl trifluoroacetate may be used to directly obtain an ionic liquid.

$$R_3N+ROY \rightarrow R_4NOY \qquad (9)$$

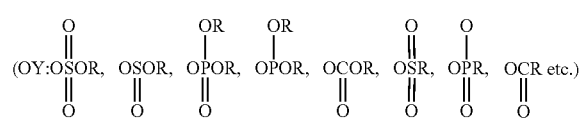

$$R4NOY+HA \rightarrow R4NA+HOY \qquad (10)$$

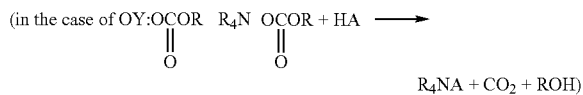

$$R_4NA + CO_2 + ROH$$

$$R_4NOY + MA \rightarrow R_4NA + MOY (M:NH_4, Li, Na, K, Ag \text{ etc.}) \quad (11)$$

The chelate forming method is a method performed by a reaction as shown in (12) to (15). First, halide of quaternary ammonium (R4NX), hydroxide of quaternary ammonium (R4NOH), or carbonic acid esterified substance of quaternary ammonium (R4NOCO2CH3) is reacted with hydrogen fluoride (HF) or ammonium fluoride (NH4F) to obtain a quaternary ammonium fluoride salt (reaction equation (12) to (14)).

The resulting quaternary ammonium fluoride salt can be subjected to a chelate forming reaction with fluoride such as BF3, AlF3, PF5, ASF5, SbF5, NbF5 and TaF6, to obtain an ionic liquid (reaction equation (15)).

$$R_4NX + HF \rightarrow R_4NF + HX (X:Cl, Br, I) \quad (12)$$

$$R_4NY + HF \rightarrow R_4NF + HY (Y:OH, OCO_2CH_3) \quad (13)$$

$$R_4NY + NH_4F \rightarrow R_4NF + NH_3 + HY (Y:OH, OCO_2CH_3) \quad (14)$$

$$R_4NF + MF_{n-1} \rightarrow R_4NMF_n \quad (15)$$

($MF_{n-1}$: $BF_3$, $AlF_3$, $PF_5$, $ASF_5$, $SbF_5$, $NbF_5$, $TaF_5$ etc.)

The neutralization method is a method performed by a reaction shown in (16). An ionic liquid can be obtained by reacting tertiary amine and an organic acid such as HBF4, HPF6, CH3COOH, CF3COOH, CF3SO3H, (CF3SO2)2NH, (CF3SO2)3CH, and (C2F5SO2)2NH.

$$R_3N + HZ \rightarrow R_3HN^+Z^- \quad (16)$$

[HZ: $HBF_4$, $HPF_6$, $CH_3COOH$, $CF_3COOH$, $CF_3SO_3H$, $(CF_3SO_2)_2NH$, $(CF_3SO_2)_3CH$, $(C_2F_5SO_2)_2NH$ organic acid such as]

The aforementioned R represents hydrogen or a hydrocarbon group of a carbon number of 1 to 20, and may contain a hetero atom.

Since an amount of an ionic liquid to be blended varies depending on compatibility between a polymer and an ionic liquid to be used, the amount can not be always indiscriminately defined, but generally is preferably 0.01 to 40 parts by weight, more preferably 0.03 to 20 parts by weight, most preferably 0.05 to 10 parts by weight relative to 100 parts by weight of a base polymer. When the amount is less than 0.01 part by weight, sufficient antistatic property is not obtained and, when the amount exceeds 40 parts by weight, there is a tendency that staining on an adherend is increased.

The pressure-sensitive adhesive composition of the present invention is characterized in that it contains an ionic liquid, and a (meth)acryl-based polymer containing, as a monomer component, 0.1 to 100% by weight of a (meth)acrylic acid alkylene oxide.

In the present invention, a (meth)acryl-based polymer containing, as a monomer component, 0.1 to 100% by weight of a (meth)acrylic acid alkylene oxide is used as a base polymer.

The aforementioned (meth)acryl-based polymer used in the present invention is not particularly limited as far as it is a (meth)acryl-based polymer having pressure-sensitive adhering property corresponding to the aforementioned property.

Examples of an oxyalkylene unit of a (meth)acrylic acid alkylene oxide in the present invention include an alkylene group of a carbon number of 1 to 6 such as an oxymethylene group, an oxyethylene group, an oxypropylene group, and an oxybutylene group.

In addition, a mole number of addition of an oxyalkylene unit to (meth)acrylic acid is preferably 1 to 30, more preferably 1 to 20 from a viewpoint of affinity with an ionic liquid. An end of an oxyalkylene chain may remain a hydroxyl group, or may be substituting with other functional group, and is preferably substituted with an alkyl group, a phenyl group, or the like for appropriately controlling a crosslinking density.

Examples of a (meth)acrylic acid alkylene oxide in the present invention include methoxy-polyethylene glycol (meth)acrylate type such as methoxy-diethylene glycol (meth)acrylate, and methoxy-triethylene glycol (meth)acrylate, ethoxy-polyethylene glycol (meth)acrylate type such as ethoxy-diethylene glycol (meth)acrylate, and ethoxy-triethylene glycol (meth)acrylate, butoxy-polyethylene glycol (meth)acrylate type such as butoxy-diethylene glycol (meth)acrylate, and butoxy-triethylene glycol (meth)acrylate, phenoxy-polyethylene glycol (meth)acrylate type such as phenoxy-diethylene glycol (meth)acrylate, and phenoxy-triethylene glycol (meth)acrylate, and methoxy-polypropylene glycol (meth)acrylate type such as methoxy-dipropylene glycol (meth)acrylate. Among them, ethoxy-diethylene glycol acrylate is preferably used.

(Meth)acrylic acid alkylene oxide may be used alone, or two or more kinds may be used by mixing, and a content as a whole is preferably 0.1 to 100% by weight, more preferably 0.3 to 90% by weight, particularly preferably 0.5 to 80% by weight in a monomer component of a (meth)acryl-based polymer. When a content of a (meth)acrylic acid alkylene oxide is less than 0.1% by weight, effect of suppressing bleeding of an ionic liquid and effect of reducing staining of an adherend (subject to be protected) are not sufficiently obtained, which is not preferable.

Furthermore, in the present invention, in addition to the aforementioned (meth)acrylic acid alkylene oxide monomer component, (meth)acryl-based monomer components having an alkyl group of a carbon number of 1 to 14 and other polymerizable monomer components for regulating the glass transition temperature and the peeling properties of the (meth)acryl-based polymer can be utilized.

In the present invention, a (meth)acryl-based monomer having an alkyl group of a carbon number of 1 to 14 can be used, and it is more preferable to use a (meth)acryl-based monomer having an alkyl group of a carbon number of 2 to 13. Specific examples of (meth)acrylate having an alkyl group of a carbon number of 1 to 14 include methyl(meth)acrylate, ethyl(meth)acrylate, n-butyl(meth)acrylate, s-butyl(meth)acrylate, t-butyl (meth)acrylate, isobutyl(meth)acrylate, hexyl(meth)acrylate, 2-ethylhexyl (meth)acrylate, n-octyl(meth)acrylate, isooctyl(meth)acrylate, n-nonyl (meth)acrylate, isononyl(meth)acrylate, n-decyl(meth)acrylate, isodecyl(meth)acrylate, n-dodecyl (meth)acrylate, n-tridecyl(meth)acrylate, and n-tetradecyl(meth)acrylate, or the like.

Among them, n-butyl(meth)acrylate, s-butyl(meth)acrylate, t-butyl (meth)acrylate, isobutyl(meth)acrylate, hexyl (meth)acrylate, 2-ethylhexyl(meth)acrylate, n-octyl (meth)acrylate, isooctyl(meth)acrylate, n-nonyl(meth)acrylate, isononyl(meth)acrylate, n-decyl(meth)acrylate, isodecyl (meth)acrylate or the like are preferable to use for the present invention.

In the present invention, (meth)acryl-based monomers having an alkyl group of a carbon number of 1 to 14 may be used alone, or two or more kinds may be used by mixing, and a content as a whole is preferably 0 to 99.9% by weight, more preferably 10 to 99.7% by weight, particularly preferably 20 to 99.5% by weight in a monomer component of a (meth) acryl-based polymer. By using a (meth)acryl-based monomer having an alkyl group of a carbon number of 1 to 14, better interaction with an ionic liquid, and better adherability can be appropriately regulated.

As other polymerizable monomer component other than aforementioned (meth)acryl-based monomer, a polymerizable monomer for regulating a glass transition point or peelability of a (meth)acryl-based polymer can be used in such a range that the effect of the present invention is not deteriorated.

As other polymerizable monomer component, a cohesive strength or a heat resistance improving component such as a sulfonic acid group-containing monomer, a phosphoric acid group-containing monomer, a cyano group-containing monomer, vinyl esters, and an aromatic vinyl compound, and a component having a functional group working for improving an adhering force or for a crosslinking point, such as a carboxyl group-containing monomer, an acid anhydride group-containing monomer, a hydroxyl group-containing monomer, an amido group-containing monomer, an amino group-containing monomer, an imido group-containing monomer, an epoxy group-containing monomer, vinyl ethers can be appropriately used. Other components may be used alone, or two or more of them may be used by mixing.

Here, when (meth)acrylate having an acid functional group such as a carboxyl group, a sulfonic acid group, and a phosphoric acid group is used, it is preferable to adjust an acid value of a (meth)acryl-based polymer 29 or less. When an acid value of a (meth)acryl-based polymer exceeds 29, there is a tendency that antistatic property is deteriorated.

An acid value can be adjusted by an amount of (meth)acrylate having an acid functional group to be blended, and examples thereof include a (meth)acryl-based polymer obtained by copolymerizing 2-ethylhexyl acrylate as a (meth)acryl-based polymer having a carboxyl group, and acrylic acid. In this case, by adjusting acrylic acid at 3.7 parts by weight relative to a total of 100 parts by weight of 2-ethylhexyl acrylate and acrylic acid, the aforementioned acid value can be satisfied.

Examples of the sulfonic acid group-containing monomer include styrenesulfonic acid, allylsulfonic acid, 2-(meth)acrylamido-2-methylpropanesulfonic acid, (meth)acrylamidopropanesulfonic acid, sulfopropyl(meth)acrylate, (meth)acryloyloxynaphthalenesulfonic acid, and sodium vinylsulfonate.

Examples of the phosphoric acid group-containing monomer include 2-hydroxyethylacryloyl phosphate.

Examples of the cyano group-containing monomer include acrylonitrile and methacrylonitrile.

Examples of vinylesters include vinyl acetate, vinyl propionate, and vinyl laurate.

Examples of the aromatic vinyl compound include styrene, chlorostyrene, chloromethylstyrene, α-methylstyrene, and other substituted styrene.

Examples of the carboxyl group-containing monomer include (meth)acrylic acid, carboxyethyl(meth)acrylate, carboxypentyl(meth)acrylate, itaconic acid, maleic acid, fumaric acid, crotonic acid, and isocrotonic acid.

Examples of the acid anhydride group-containing monomer include maleic acid anhydride, itaconic acid anhydride, and an acid anhydride of the aforementioned carboxyl group-containing monomer.

Examples of the hydroxyl group-containing monomer include 2-hydroxyethyl(meth)acrylate, 2-hydroxypropyl (meth)acrylate, 4-hydroxybutyl(meth)acrylate, 6-hydroxyhexyl(meth)acrylate, 8-hydroxyoctyl(meth)acrylate, 10-hydroxydecyl (meth)acrylate, 12-hydroxylauryl(meth)acrylate, (4-hydroxymethylcyclohexyl)methyl acrylate, N-methylol (meth)acrylamide, vinyl alcohol, allyl alcohol, 2-hydroxyethyl vinyl ether, 4-hydroxybutylvinyl ether, and diethylene glycol monovinyl ether.

Examples of the amido group-containing monomer include acrylamide, methacrylamide, diethylacrylamide, N-vinylpyrrolidone, N,N-dimethylacrylamide, N,N-dimethylmethacrylamide, N,N-diethylacrylamide, N,N-diethylmethacrylamide, N,N'-methylenebisacrylamide, N,N-dimethylaminopropylacrylamide, N,N-dimethylaminopropylmethacrylamide, and diacetoneacrylamide.

Examples of the amino group-containing monomer include aminoethyl (meth)acrylate, N,N-dimethylaminoethyl(meth)acrylate, N,N-dimethylaminopropyl (meth)acrylate, and (meth)acryloylmorpholine.

Examples of the imido group-containing monomer include cyclohexylmaleimide, isopropylmaleimide, N-cyclohexylmaleimide, and itaconeimide.

Examples of the epoxy group-containing monomer include glycidyl (meth)acrylate, methylglycidyl(meth)acrylate, and allyl glycidyl ether.

Examples of vinyl ethers include methyl vinyl ether, ethyl vinyl ether, and isobutyl vinyl ether.

The aforementioned other polymerizable monomer component may be used alone, or two or more kinds may be used by mixing, and a content as a whole is such that a polymerizable monomer component is preferably 0 to 85 parts by weight, more preferably 1 to 80 parts by weight, particularly preferably 2 to 75 parts by weight relative to 100 parts by weight of a total constituting unit of a (meth)acryl-based polymer. By using the aforementioned other polymerizable monomer component, better interaction with an ionic liquid, and better adherability can be appropriately regulated.

The aforementioned (meth)acryl-based polymer used in the present invention has a weight average molecular weight of preferably 100,000 to 5,000,000, more preferably 200,000 to 4,000,000, further preferably 300,000 to 3,000,000. When a weight average molecular weight is less than 100,000, there is a tendency that paste (adhesive residue) remaining is generated due to reduction in a cohesive strength of a pressure-sensitive adhesive composition. On the other hand, when a weight average molecular weight exceeds 5,000,000, there is a tendency that fluidity of a polymer is reduced, wetting on a polarizing plate becomes insufficient, and there is a tendency that this is a cause for peeling off which is generated between a polarizing plate and a pressure-sensitive adhesive composition layer of a surface protecting film. A weight average molecular weight is obtained by measurement with GPC (gel permeation chromatography).

In addition, the aforementioned (meth)acryl-based polymer of which the glass transition temperature (Tg) of is no lower than −100° C. is generally used, and it is preferable for the glass transition temperature to be −90° C. to 0° C., and it is more preferable for it to be −80° C. to −10° C. When a glass transition temperature is higher than 0° C., it becomes difficult to obtain a sufficient adhering property and tends to be a cause for peeling off which is generated between a polarizing plate and a pressure-sensitive adhesive composition layer of a pressure-sensitive adhesive sheet. Furthermore, a glass transition temperature (Tg) of a (meth)acryl-based polymer can be adjusted in the aforementioned range by appropriating changing a monomer component and a composition ratio to be used.

In addition, a pressure-sensitive adhesive composition of the present invention is characterized in that it contains an ionic liquid, and a polymer containing, as a monomer component, 0.5 to 30% by weight of a nitrogen-containing monomer and having a glass transition temperature Tg of no higher than 0° C.

In the present invention, a (meth)acryl-based polymer containing, as a monomer component, 0.5 to 30% by weight of a nitrogen-containing monomer and having a glass transition temperature Tg of no higher than 0° C. is used as a base polymer.

The aforementioned (meth)acryl-based polymer used in the present invention is not particularly limited as far as it is a (meth)acryl-based polymer having pressure-sensitive adhering property corresponding to the aforementioned property.

Specific examples of a nitrogen-containing monomer in the present invention include, for example, an amino group containing monomer, an imide group containing monomer, a cyano group containing monomer, acryloylmorpholine, and the like.

Examples of the amido group-containing monomer include acrylamide, methacrylamide, diethylacrylamide, N-vinylpyrrolidone, N,N-dimethylacrylamide, N,N-dimethylmethacrylamide, N,N-diethylacrylamide, N,N-diethylmethacrylamide, N,N'-methylenebisacrylamide, N,N-dimethylaminopropylacrylamide, N,N-dimethylaminopropylmethacrylamide, and diacetoneacrylamide.

Examples of the amino group-containing monomer include aminoethyl (meth)acrylate, N,N-dimethylaminoethyl(meth)acrylate, N,N-dimethylaminopropyl (meth)acrylate, and (meth)acryloylmorpholine.

Examples of the imido group-containing monomer include cyclohexylmaleimide, isopropylmaleimide, N-cyclohexylmaleimide, and itaconeimide.

Examples of the cyano group-containing monomer include acrylonitrile and methacrylonitrile.

A nitrogen-containing monomer may be used alone, or two or more of them may be used by mixing, and it is preferable for the amount of nitrogen-containing monomer to be 0.5% to 30% by weight in the monomer component of the aforementioned polymer, 1% to 25% by weight is more preferable, and 2% to 20% by weight is particularly preferable. In the case where the content of nitrogen-containing monomer is lower than 0.5% by weight, bleeding restricting effects of the ionic liquid and staining reducing effects on the adherend sometimes fail to be sufficiently gained, which is not preferable. On the other hand, in the case where the content of nitrogen-containing monomer is greater than 30% by weight, the adhesive strength of the pressure-sensitive adhesive composition becomes too high, which sometimes causes damage to the adherend, particularly when applied as a surface protecting film, which is not preferable.

In addition, the aforementioned polymer of which the glass transition temperature (Tg) is no higher than 0° C. is generally used as the base polymer, and it is preferable for the glass transition temperature to be −100° C. to −5° C., and it is more preferable for it to be −80° C. to −10° C. In the case where the glass transition temperature is higher than 0° C., sometimes it becomes difficult to obtain sufficient adhesive strength. Here, the glass transition temperature (Tg) of the base polymer can be regulated within the aforementioned range by appropriately changing the monomer components that are used and the composition ratio thereof.

As these polymers, polymers which are generally used as a polymer in pressure-sensitive adhesive compositions are cited, such as (meth)acryl-based polymers comprising one or more kinds of (meth)acrylate having an alkyl group of a carbon number of 1 to 14 as the main component, natural rubbers, styrene-isoprene-styrene block copolymers (SIS block copolymers), styrene-butadiene-styrene block copolymers (SBS block copolymers), styrene-ethylene.butylene-styrene block copolymers (SEBS block copolymers), styrene-butadiene rubbers, polybutadiene, polyisoprene, polyisobutylene, butyl rubbers, chloroprene rubbers, silicone rubbers, or the like.

Among them, the (meth)acryl-based polymers comprising one or more kinds of (meth)acrylate having an alkyl group of a carbon number of 1 to 14 as the main component are preferably used, since a high compatibility with an ionic liquid and excellent adhesive properties can be gained.

As for the (meth)acryl-based polymer comprising one or more kinds of (meth)acrylate having an alkyl group of a carbon number of 1 to 14 as the main component, a (meth)acryl-based polymer comprising 50% to 99.5% by weight of one or more kinds of (meth)acrylate having an alkyl group of a carbon number of 1 to 14 as the main component can be cited as a preferable example.

Examples of (meth)acrylate having an alkyl group of a carbon number of 1 to 14 include methyl(meth)acrylate, ethyl (meth)acrylate, n-butyl(meth)acrylate, s-butyl (meth)acrylate, t-butyl(meth)acrylate, isobutyl(meth)acrylate, hexyl (meth)acrylate, 2-ethylhexyl(meth)acrylate, n-octyl(meth) acrylate, isooctyl(meth)acrylate, n-nonyl (meth)acrylate, isononyl(meth)acrylate, n-decyl(meth)acrylate, isodecyl (meth)acrylate, n-dodecyl (meth)acrylate, n-tridecyl(meth) acrylate, and n-tetradecyl(meth)acrylate.

Among them, when used in the surface protecting film of the present invention, (meth)acrylate having an alkyl group of a carbon number of 6 to 14 such as hexyl (meth)acrylate, 2-ethylhexyl(meth)acrylate, n-octyl(meth)acrylate, isooctyl (meth)acrylate, n-nonyl(meth)acrylate, isononyl(meth)acrylate, n-decyl(meth)acrylate, isodecyl (meth)acrylate, n-dodecyl(meth)acrylate, n-tridecyl(meth)acrylate, and n-tetradecyl (meth)acrylate is suitably used. By using a (meth)acryl-based polymer consisting of (meth)acrylate having an alkyl group of a carbon number of 6 to 14, it becomes easy to control an adhesive strength to an adherend low, and excellent re-peelability is obtained.

In addition, as for other polymerizable monomer components, a polymerizable monomer for regulating the glass transition temperature and the peeling properties of the (meth) acryl-based polymer can be utilized so that Tg becomes no higher than 0° C. (conventionally, −100° C. or higher), since it becomes easy to maintain adhesive performance, as long as the effects of the present invention are not lost.

As other polymerizable monomer component, a cohesive strength or a heat resistance improving component such as a sulfonic acid group-containing monomer, a phosphoric acid group-containing monomer, vinyl esters, and an aromatic vinyl compound, and a component having a functional group working for improving an adhering force or for a crosslinking point, such as a carboxyl group-containing monomer, an acid anhydride group-containing monomer, a hydroxyl group-containing monomer, an epoxy group-containing monomer, vinyl ethers can be appropriately used. Other components may be used alone, or two or more of them may be used by mixing.

Here, when (meth)acrylate having an acid functional group such as a carboxyl group, a sulfonic acid group, and a phosphoric acid group is used, it is preferable to adjust an acid value of a (meth)acryl-based polymer 29 or less. When an acid value of a (meth)acryl-based polymer exceeds 29, there is a tendency that antistatic property is deteriorated. Furthermore, in the case where the material is applied to a surface protecting film, it is preferable to adjust the acid value of the (meth)acryl-based polymer to 1 or less. In the case where the acid value of the (meth)acryl-based polymer exceeds 1, the adhesive strength tends to increase with time.

As specific examples of the aforementioned other polymerizable monomer components, the previously illustrated examples of the present specification can be cited.

The aforementioned other polymerizable monomer components may be used alone, or two or more kinds may be used by mixing, and a content as a whole is such that a polymerizable monomer component is preferably 0.1 to 20 parts by weight, more preferably 0.5 to 10 parts by weight of a total constituting unit of a (meth)acryl-based polymer. By using the aforementioned other polymerizable monomer component, better interaction with an ionic liquid, and better adherability can be appropriately regulated.

The aforementioned (meth)acryl-based polymer used in the present invention has a weight average molecular weight of preferably 100,000 to 5,000,000, more preferably 200,000 to 4,000,000, further preferably 300,000 to 3,000,000. When a weight average molecular weight is less than 100,000, there is a tendency that paste (adhesive residue) remaining is generated due to reduction in a cohesive strength of a pressure-sensitive adhesive composition. On the other hand, when a weight average molecular weight exceeds 5,000,000, there is a tendency that fluidity of a polymer is reduced, wetting on a polarizing plate becomes insufficient, and there is a tendency that this is a cause for peeling off which is generated between a polarizing plate and a pressure-sensitive adhesive composition layer of a surface protecting film. A weight average molecular weight is obtained by measurement with GPC (gel permeation chromatography).

Furthermore, a pressure-sensitive adhesive composition of the present invention is characterized in that it contains an ionic liquid, and a (meth)acryl-based polymer containing, as a monomer component, 0.01 to 20% by weight of a reactive surfactant.

In the present invention, the (meth)acryl-based polymer containing, as a monomer component, 0.01 to 20% by weight of a reactive surfactant is used as a base polymer.

The aforementioned (meth)acryl-based polymer used in the present invention is not particularly limited as far as it is a (meth)acryl-based polymer having pressure-sensitive adhering property corresponding to the aforementioned property.

A reactive surfactant in the present invention refers to a reactive surfactant having a reactive unsaturated bond. Specific examples thereof include, for example, an anion type reactive surfactant, a nonion type reactive surfactant, and a cation type reactive surfactant, having an acryloyl group, a methacryloyl group, or an allyl group. Among them, an anion type reactive surfactant, a nonion type reactive surfactant, and a cation type reactive surfactant, which have an acryloyl group, a methacryloyl group, or an ally group with an ethylene oxide group, are preferably used.

The anion type reactive surfactants, represented by the formulas (A1) to (A16), are cited as examples.

(A1)

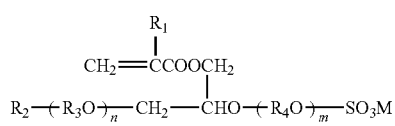

[in the formula (A1), $R_1$ represents a hydrogen or a methyl group, $R_2$ represents a hydrocarbon group or an acyl group of a carbon number of 1 to 30, M represents an alkali metal, an alkaline-earth metal, an ammonium group, or a hydroxyalkyl ammonium group of a carbon number of 1 to 4, $R_3$ and are the same or different and each is an alkylene group of a carbon number of 1 to 6, n is an integer from 0 to 50, and m is an integer from 0 to 20.]

(A2)

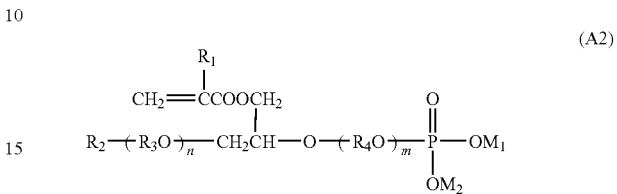

[in the formula (A2), $R_1$ represents a hydrogen or a methyl group, $R_2$ represents a hydrocarbon group or an acyl group of a carbon number of 1 to 30, $R_3$ and $R_4$ are the same or different and each is an alkylene group of a carbon number of 1 to 6, $M_1$ and $M_2$ are the same or different and each is an alkali metal, an alkaline-earth metal, an ammonium group, or a hydroxyalkyl ammonium group of a carbon number of 1 to 4, n is an integer from 0 to 50, and m is an integer from 0 to 20.]

(A3)

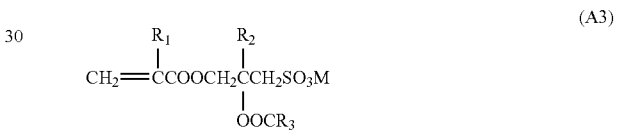

[in the formula (A3), $R_1$ and $R_2$ represent hydrogen or methyl groups, $R_3$ represents an alkyl group or an alkenyl group of a carbon number of 1 to 20, M represents an alkali metal, an alkaline-earth metal, or an ammonium group.]

(A4)

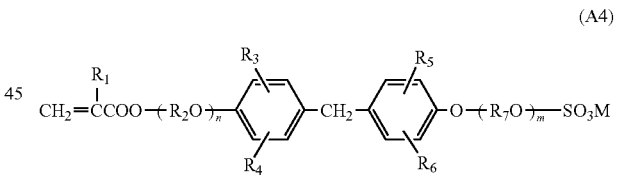

[in the formula (A4), $R_1$ represents a hydrogen or a methyl group, $R_2$ and $R_7$ are the same or different and each is an alkylene group of a carbon number of 1 to 6, $R_3$ and $R_5$ are the same or different and each is a hydrogen or alkyl group, $R_4$ and $R_6$ are the same or different and each is a hydrogen, an alkyl group, a benzyl group, or a styrene group, M represents an alkali metal, an alkali-earth metal or an ammonium group, and n and m represent integers from 1 to 50.]

(A5)

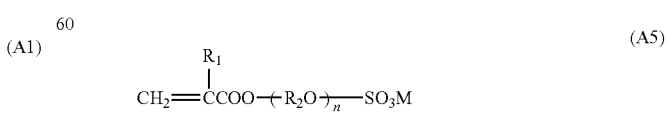

[in the formula (A5), $R_1$ represents a hydrogen or a methyl group, $R_2$ represents an alkylene group of a carbon number of 1 to 6, M represents an alkali metal, an alkaline-earth metal, or an ammonium group, and n represents an integer from 2 to 50.]

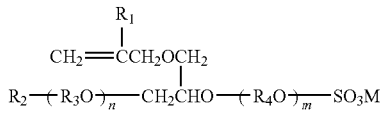
(A6)

[in the formula (A6), $R_1$ represents a hydrogen or a methyl group, $R_2$ represents a hydrocarbon group or an acyl group of a carbon number of 1 to 30, $R_3$ and $R_4$ are the same or different and each is an alkylene group of a carbon number of 1 to 6, M represents an alkali metal, an alkaline-earth metal, an ammonium group, or a hydroxalkyl ammonium group of a carbon number of 1 to 4, n represents an integer from 0 to 50, and m represents an integer from 0 to 20.]

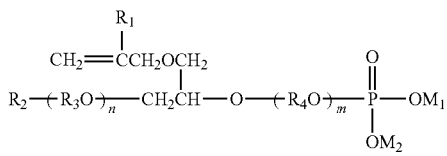
(A7)

[in the formula (A7), $R_1$ represents a hydrogen or a methyl group, $R_2$ represents a hydrocarbon group or an acyl group of a carbon number of 1 to 30, $R_3$ and $R_4$ are the same or different and each is an alkylene group of a carbon number of 1 to 6, $M_1$ and $M_2$ are the same or different and each is an alkali metal, an alkaline-earth metal, an ammonium group, or a hydroxyalkyl ammonium group of a carbon number of 1 to 4, n represents an integer from 0 to 50, and m represents an integer from 0 to 20.]

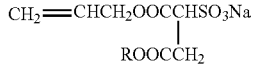
(A8)

[in the formula (A8), R represents a hydrocarbon group of a carbon number of 1 to 30 or an oxyalkylene group of a carbon number of 1 to 6.]

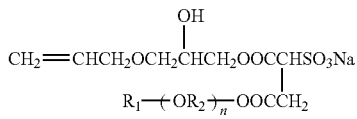
(A9)

[in the formula (A9), $R_1$ represents a hydrocarbon group, an amino group, or a carboxylic acid residue, $R_2$ represents an alkylene group of a carbon number of 1 to 6, and n represents an integer from 0 to 50.]

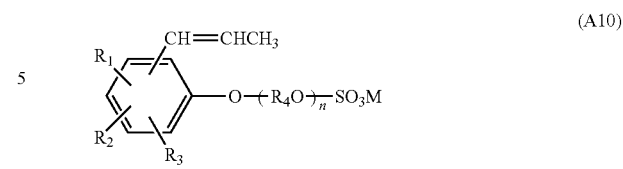
(A10)

[in the formula (A10), $R_1$ represents a hydrocarbon group of a carbon number of 1 to 30, $R_2$ represents a hydrogen or a hydrocarbon group of a carbon number of 1 to 30, $R_3$ represents a hydrogen or a propenyl group, $R_4$ represents an alkylene group of a carbon number of 1 to 6, M represents an alkali metal, an alkaline-earth metal, an ammonium group, or an alkanolamine residue, and n represents an integer from 1 to 50.]

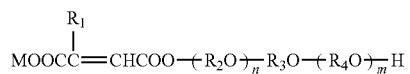
(A11)

[in the formula (A11), $R_1$ represents a hydrogen or a methyl group, $R_2$ and $R_4$ are the same or different and each is an alkylene groups of a carbon number of 1 to 6, $R_3$ represents a hydrocarbon group of a carbon number of 1 to 30, M represents a hydrogen, an alkali metal, an alkaline-earth metal, an ammonium group, or an alkanolammonium group, and n and m represent integers from 1 to 50.]

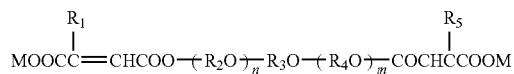
(A12)

[in the formula (A12), $R_1$ and $R_5$ are the same or different and each is a hydrogen or a methyl group, $R_2$ and $R_4$ are the same or different and each is an alkylene group of a carbon number of 1 to 6, $R_3$ represents a hydrocarbon group of a carbon number of 1 to 30, M represents a hydrogen, an alkali metal, an alkaline-earth metal, an ammonium group, or an alkanolammonium group, and n and m represent integers from 1 to 50.]

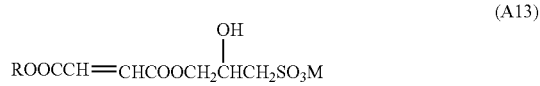
(A13)

[in the formula (A13), R represents a hydrocarbon group of a carbon number of 1 to 30, M is an alkali metal, an alkaline-earth metal, or an ammonium group.]

(A14)

[in the formula (A14), $R_1$ represents an alkylene group of a carbon number of 1 to 6, $R_2$ represents a hydrocarbon group of a carbon number of 1 to 30, M represents a hydrogen, an alkali metal, an alkaline-earth metal, an ammonium group, or an amine group, and n represents an integer from 1 to 50.]

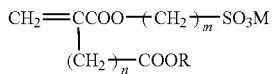
(A15)

[in the formula (A15), R represents a hydrocarbon group of a carbon number of 1 to 30, M represents a hydrogen, an alkali metal, an alkaline-earth metal, or an ammonium group, n represents an integer 1 or 2, an m represents an integer from 2 to 4.]

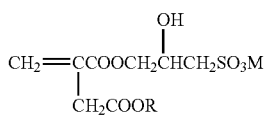
(A16)

[in the formula (A16), $R_1$ represents a hydrocarbon group of a carbon number of 1 to 30, and M represents a hydrogen, an alkali metal, an alkaline-earth metal, or an ammonium group.]

Nonion type reactive surfactants, represented by the formulas (N1) to (N5), can be cited as examples.

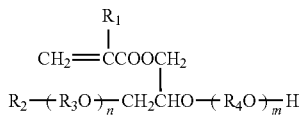
(N1)

[in the formula (N1), $R_1$ represents a hydrogen or a methyl group, $R_2$ represents a hydrocarbon group or an acyl group of a carbon number of 1 to 30, $R_3$ and $R_4$ represent the same or different and each is an alkylene group of a carbon number of 1 to 6, and n and m represent integers from 0 to 50.]

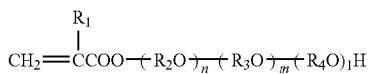
(N2)

[in the formula (N2), $R_1$ represents a hydrogen or a methyl group, $R_2$, $R_3$ and $R_4$ are the same or different and each is an alkylene group of a carbon number of 1 to 6, n, m and 1 are integers from 0 to 50 satisfying n+m+1 is 1 to 50.]

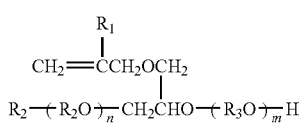
(N3)

[in the formula (N3), $R_1$ represents a hydrogen or a methyl group, $R_2$ and $R_3$ are the same or different and each is an alkylene group of a carbon number of 1 to 6, $R_4$ represents a hydrocarbon group or an acyl group of a carbon number of 1 to 30, and n and m represent integers from 0 to 50.]

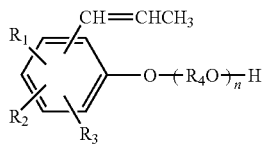
(N4)

[in the formula (N4), $R_1$ and $R_2$ are the same or different and each is a hydrocarbon group of a carbon number of 1 to 30, $R_3$ represents a hydrogen or a propenyl group, $R_4$ represents an alkylene group of a carbon number of 1 to 6, and n represents an integer from 1 to 50.]

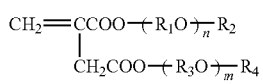
(N5)

[in the formula (N5), $R_1$ and $R_3$ are the same or different and each is an alkylene group of a carbon number of 1 to 6, $R_2$ and $R_4$ are the same or different and each is a hydrogen, hydrocarbon group, or acyl group of a carbon number of 1 to 30, and n and m are integers from 0 to 50 satisfying n+m is 3 to 50.]

Cation type reactive surfactants, represented by the formulas (C1) and (C2), can be cited as examples.

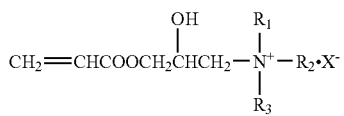
(C1)

[in the formula (C1), $R_1$ and $R_2$ are the same or different and each is an alkyl group of a carbon number of 1 to 30, $R_3$ represents a hydrocarbon group of a carbon number of 1 to 30, and X represents a chlorine or a bromine.]

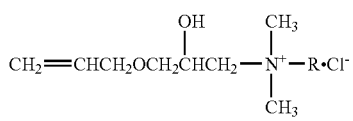
(C2)

[in the formula (C2), R represents a hydrocarbon group of a carbon number of 1 to 30, which may include a hetero atom.]

The reactive surfactants may be used alone, or two or more of them may be used by mixing, and it is preferable for the amount to be 0.01% to 20% by weight in the monomer components of the (meth)acryl-based polymer, more preferably from 0.05% to 10% by weight, particularly preferably from 0.1% to 5% by weight. In the case where the content of the reactive surfactant is lower than 0.01% by weight, bleeding restricting effects of the ionic liquid and staining reducing effects on the adherend sometimes fail to be sufficiently gained, which is not preferable. On the other hand, in the case where the content is greater than 20% by weight, the staining can occur on the adherend, which is not preferable.

In addition, as other polymerizable monomer component other than aforementioned reactive surfactant, a polymerizable monomer such as a (meth)acrylate having an alkyl group of a carbon number of 1 to 14 for regulating a glass transition point or peelability of a (meth)acryl-based polymer can be used in such a range that the effect of the present invention is not deteriorated.

In the present invention, a (meth)acryl-based monomer having an alkyl group of a carbon number of 1 to 14 can be used, and it is more preferable to use a (meth)acryl-based monomer having an alkyl group of a carbon number of 2 to 13.

Specific examples of (meth)acrylate having an alkyl group of a carbon number of 1 to 14 include methyl(meth)acrylate, ethyl(meth)acrylate, n-butyl (meth)acrylate, s-butyl(meth)acrylate, t-butyl(meth)acrylate, isobutyl(meth)acrylate, hexyl (meth)acrylate, 2-ethylhexyl(meth)acrylate, n-octyl (meth)acrylate, isooctyl(meth)acrylate, n-nonyl(meth)acrylate, isononyl(meth)acrylate, n-decyl(meth)acrylate, isodecyl (meth)acrylate, n-dodecyl(meth)acrylate, n-tridecyl (meth)acrylate, and n-tetradecyl (meth)acrylate or the like.

Among them, n-butyl(meth)acrylate, s-butyl(meth)acrylate, t-butyl (meth)acrylate, isobutyl(meth)acrylate, hexyl (meth)acrylate, 2-ethylhexyl(meth)acrylate, n-octyl (meth)acrylate, isooctyl(meth)acrylate, n-nonyl(meth)acrylate, isononyl(meth)acrylate, n-decyl(meth)acrylate, isodecyl (meth)acrylate or the like are preferable to use for the present invention.

In the present invention, (meth)acryl-based monomers having an alkyl group of a carbon number of 1 to 14 may be used alone, or two or more kinds may be used by mixing, and a content as a whole is preferably 50 to 99.9% by weight, more preferably 60 to 99% by weight, particularly preferably 70 to 95% by weight in a monomer component of a (meth)acryl-based polymer. By using a (meth)acryl-based monomer having an alkyl group of a carbon number of 1 to 14, better interaction with an ionic liquid, and better adherability can be appropriately regulated.

In addition, as other polymerizable monomer component other than aforementioned (meth)acryl-based monomer, a polymerizable monomer for regulating a glass transition point or peelability of a (meth)acryl-based polymer can be used in such a range that the effect of the present invention is not deteriorated.

As other polymerizable monomer component, a cohesive strength or a heat resistance improving component such as a sulfonic acid group-containing monomer, a phosphoric acid group-containing monomer, a cyano group-containing monomer, vinyl esters, and an aromatic vinyl compound, and a component having a functional group working for improving an adhering force or for a crosslinking point, such as a carboxyl group-containing monomer, an acid anhydride group-containing monomer, a hydroxyl group-containing monomer, an amido group-containing monomer, an amino group-containing monomer, an imido group-containing monomer, an epoxy group-containing monomer, vinyl ethers can be appropriately used. Other components may be used alone, or two or more of them may be used by mixing.

Here, when (meth)acrylate having an acid functional group such as a carboxyl group, a sulfonic acid group, and a phosphoric acid group is used, it is preferable to adjust an acid value of a (meth)acryl-based polymer 29 or less. When an acid value of a (meth)acryl-based polymer exceeds 29, there is a tendency that antistatic property is deteriorated. Furthermore, in the case where the material is applied to a surface protecting film, it is preferable to adjust the acid value of the (meth)acryl-based polymer to 1 or less. In the case where the acid value of the (meth)acryl-based polymer exceeds 1, the adhesive strength tends to increase with time.

As specific examples of the aforementioned other polymerizable monomer components, the previously illustrated examples of the present specification can be cited.

In the present invention, the aforementioned other polymerizable monomer may be used alone, or two or more kinds may be used by mixing, and a content as a whole is preferably 0 to 49.99% by weight, more preferably 0.5 to 40% by weight, particularly preferably 1 to 20% by weight in a monomer component of a (meth)acryl-based polymer. By using the aforementioned other polymerizable monomer, better interaction with an ionic liquid, and better adherability can be appropriately regulated.

The aforementioned (meth)acryl-based polymer used in the present invention has a weight average molecular weight of preferably 100,000 to 5,000,000, more preferably 200,000 to 4,000,000, further preferably 300,000 to 3,000,000. When a weight average molecular weight is less than 100,000, there is a tendency that paste (adhesive residue) remaining is generated due to reduction in a cohesive strength of a pressure-sensitive adhesive composition. On the other hand, when a weight average molecular weight exceeds 5,000,000, there is a tendency that fluidity of a polymer is reduced, wetting on a polarizing plate becomes insufficient, and there is a tendency that this is a cause for peeling off which is generated between a polarizing plate and a pressure-sensitive adhesive composition layer of a surface protecting film. A weight average molecular weight is obtained by measurement with GPC (gel permeation chromatography).

In addition, the aforementioned (meth)acryl-based polymer of which the glass transition temperature (Tg) of is no lower than −100° C. is generally used, and it is preferable for the glass transition temperature to be −90° C. to 0° C., and it is more preferable for it to be −80° C. to −10° C. When a glass transition temperature is higher than 0° C., there is a tendency that fluidity of a polymer is reduced, wetting on a polarizing plate becomes insufficient, and there is a tendency that this is a cause for peeling off which is generated between a polarizing plate and a pressure-sensitive adhesive composition layer of a surface protecting film. Here, a glass transition temperature (Tg) of a (meth)acryl-based polymer can be adjusted in the aforementioned range by appropriating changing a monomer component and a composition ratio to be used.

The aforementioned (meth)acryl-based polymer of the present invention is obtained by a polymerization method which is generally used as a procedure for synthesizing a (meth)acryl-based polymer such as solution polymerization, emulsion polymerization, bulk polymerization and suspension polymerization. In addition, the resulting polymer may be any of a random copolymer, a block copolymer, and a graft copolymer.

In the present invention, an ethylene oxide group-containing compound may be blended, if necessary. In particular, the ethylene oxide group-containing compound is preferably used when a (meth)acryl-based polymer containing, as a monomer component, 0.1 to 100% by weight of a (meth)acrylic acid alkylene oxide is preferably used as the base polymer.

The ethylene oxide group-containing compound in the present invention is not particularly limited, as long as it is a compound that has an ethylene oxide group, and surfactants that have an ethylene oxide group, ethylene oxide group-containing polyether based polymers, ethylene glycol group-containing (meth)acryl-based polymers, and the like can be cited as examples. In particular, surfactants having an ethylene oxide group provide well-balanced compatibility between the base polymer and the ionic liquid, and thus are preferably used.

Examples of the surfactants having an ethylene oxide group include, for example, nonionic surfactants, such as polyoxyethylene fatty acid esters, polyoxyethylene sorbitan fatty acid esters, polyoxyethylene sorbitol fatty acid esters, polyoxyethylene alkyl ethers, polyoxyethylene alkyl allyl ethers, polyoxyethylene alkyl phenyl ethers, polyoxyethylene derivatives, polyoxyethylene alkyl amines, and polyoxyethylene alkyl amine fatty acid esters, anionic surfactants, such as polyoxyethylene alkyl ether sulfates, polyoxyethylene alkyl ether phosphates and polyoxyethylene alkyl phenyl ether phosphates, and cationic surfactants, as well as cationic and anionic surfactants that include an ethylene oxide group. In addition, the surfactants may have a reactive substituent, such as (meth)acryloyl group or allyl group.

It is preferable for the number of moles of oxyethylene units added in the surfactant having ethylene oxide group as described above to be 1 to 50 from the point of view of interactions with the ionic liquid, and 2 to 40 is more preferable. In the case where the surfactant does not have an ethylene oxide group, it is difficult to provide a well balanced compatibility between the ionic liquid and the base polymer, which is not preferable since bleeding to the adherend tends to increase. On the other hand, in the case where a surfactant is used of which the number of moles of the added oxyethylene units exceeds 50, the ionic liquid is strongly coordinated by the ethylene oxide groups, so that the antistaticity tends to be lowered.

Examples of an ethylene oxide group-containing polyether-based polymer include a random copolymer and a block copolymer of polyethylene glycol and polypropylene glycol such as a block copolymer of polypropylene glycol-polyethylene glycol-polypropyelene glycol, a block copolymer of polypropylene glycol-polyethylene glycol, a block copolymer of polyethylene glycol-polypropylene glycol-polyethylene glycol, and a random copolymer of polypropylene glycol-polyethylene glycol. A terminus of a glycol chain may remain a hydroxyl group, or may be substituted with an alkyl group or a phenyl group.

A ratio of polyethylene glycol of these random copolymers and these block copolymers of polyethylene glycol and polypropylene glycol, 5 to 74% by weight is preferable, 10 to 70% by weight is more preferable. When a ratio of polyethylene glycol is less than 5% by weight, compatibility with an ionic liquid becomes worse, and there is a tendency that sufficient antistatic is hardly obtained and, when the ratio is 75% by weight or more, crystallizability becomes high, compatibility with an acryl-based polymer becomes worse, and there is a tendency that sufficient antistatic is hardly obtained.

As an ethylene glycol group-containing acryl-based polymer, an acryl-based polymer having ethylene glycol group-containing (meth)acrylate as an essential component is used.

As an addition mole number of an oxyethylene unit to (meth)acrylate, 1 to 30 is preferable, and 2 to 20 is more preferable from a viewpoint of coordination of an ionic liquid. A terminus of an ethylene oxide chain may remain a hydroxyl group, and may be substituted with an alkyl group or a phenyl group.

Specific examples of ethylene glycol group-containing (meth)acrylate include methoxy-polyethylene glycol (meth)acrylate type such as methoxy-diethylene glycol (meth)acrylate, and methoxy-triethylene glycol (meth)acrylate, ethoxy-polyethylene glycol (meth)acrylate type such as ethoxy-diethylene glycol (meth)acrylate, and ethoxy-triethylene glycol (meth)acrylate, butoxy-polyethylene glycol (meth)acrylate type such as butoxy-diethylene glycol (meth)acrylate, and butoxy-triethylene-glycol (meth)acrylate, phenoxy-polyethylene glycol (meth)acrylate type such as phenoxy-diethylene glycol (meth)acrylate, and phenoxy-triethylene glycol (meth)acrylate, 2-ethylhexyl-polyethylene glycol (meth)acrylate, and nonylphenol-polyethylene glycol (meth)acrylate type.

In addition, as a monomer component other than the aforementioned components, acrylate and/or methacrylate having an alkyl group of a carbon number of 1 to 14 such as methyl (meth)acrylate, ethyl(meth)acrylate, n-butyl(meth)acrylate, t-butyl (meth)acrylate, isobutyl(meth)acrylate, hexyl(meth)acrylate, 2-ethylhexyl(meth)acrylate, n-octyl (meth)acrylate, isooctyl(meth)acrylate, n-nonyl(meth)acrylate, isononyl (meth)acrylate, n-decyl(meth)acrylate, isodecyl(meth)acrylate, n-dodecyl(meth)acrylate, n-tridecyl (meth)acrylate, and n-tetradecyl(meth)acrylate can be also used.

Further, carboxyl group-containing (meth)acrylate, phosphoric acid group-containing (meth)acrylate, cyano group-containing (meth)acrylate, vinyl esters, aromatic vinyl compound, acid anhydride group-containing (meth)acrylate, hydroxyl group-containing (meth)acrylate, amido group-containing (meth)acrylate, amino group-containing (meth)acrylate, epoxy group-containing (meth)acrylate, N-acryloylmorpholine, and vinyl ethers may be also used.

As a ratio of ethylene glycol group-containing (meth)acrylate contained in an ethylene glycol group-containing (meth)acrylate polymer, 10 to 70% by weight is preferable. When a ratio of ethylene glycol group-containing (meth)acrylate is less than 10% by weight, compatibility with an ionic acid becomes worse, and sufficient antistatic is not obtained. On the other hand, when the ratio exceeds 70% by weight, compatibility with an acryl-based polymer which is a base polymer becomes worse, and sufficient antistatic is not obtained.

The aforementioned (meth)acrylate may be used alone, or may be used by mixing.

As a molecular weight of the aforementioned ethylene oxide group-containing polyether-based polymer or ethylene glycol group-containing (meth)acrylate polymer, a number average molecular weight of 10000 or less, preferably 200 to 5000 is preferably used. When a number average molecular weight exceeds 10000, there is a tendency that stain property onto an adherend is deteriorated. A number average molecular weight refers to a molecular weight obtained by measurement by GPC (gel permeation chromatography).

The aforementioned ethylene oxide group-containing compound may be used alone, or two or more of them may be used by mixing. An amount of ethylene oxide group-containing compound to be blended is 0.01 to 10 parts by weight, preferably 0.05 to 5 part by weight relative to 100 parts by weight of a base polymer. When the amount is less than 0.01 part by weight, sufficient electrification property is not obtained and, when the amount exceeds 10 parts by weight, bleeding onto an adherend is increased, there is a tendency that an adhesive strength is reduced.

In addition, in the case where a polymer containing, as a monomer component, 0.5 to 30% by weight of a nitrogen-containing monomer and having a glass transition temperature Tg of no higher than 0° C. is particularly used as the base polymer of a pressure-sensitive adhesive composition, it is preferable for the polymer to appropriately contain an alkylene oxide group-containing compound. When a pressure sensitive adhesive composition contains the alkylene oxide group-containing compound, in some cases, the pressure sensitive adhesive composition exhibits better antistatic.

An alkylene oxide group-containing compound in the present invention is not particularly limited, as long as the compound includes an alkylene oxide group and a surfactant having an alkylene oxide group, a polyether based polymer that contains an alkylene oxide group, and an alkylene glycol group-containing a (meth)acryl-based polymer can be cited as examples. In particular, the surfactant having an alkylene oxide group which easily provides a well balanced compatibility between the base polymer and an ionic liquid is preferably used.

As the surfactants having an alkylene oxide group, non-ionic surfactants, such as polyoxyalkylene fatty acid esters, polyoxyalkylene sorbitan fatty acid esters, polyoxyalkylene sorbitol fatty acid esters, polyoxyalkylene alkyl ethers, polyoxyalkylene alkyl allyl ethers, polyoxyalkylene alkyl phenyl ethers, polyoxyalkylene derivatives, polyoxyalkylene alkyl amines, and polyoxyalkylene alkyl amine fatty acid esters, anionic surfactants, such as polyoxyalkylene alkyl ether sulfates, polyoxyalkylene alkyl ether phosphates, and polyoxyalkylene alkyl phenyl ether phosphates, and cationic surfactants, as well as cationic and anionic surfactants that include an alkylene oxide group, for example, can be cited. In addition, these may have a reactive substituent group, such as a (meth)acryloyl group or an allyl group.

It is more preferable to use a surfactant having an ethylene oxide group in the pressure-sensitive adhesive composition in the present invention. Previously illustrated surfactants of the present specification can be cited as specific examples of surfactants having an ethylene oxide group.

It is preferable for the number of moles of oxyalkylene units added of the surfactant having the alkylene oxide group as described above to be 1 to 50 from the point of view of mutual interactions with the ionic liquid, and 2 to 40 is more preferable. In the case where the surfactant does not have an alkylene oxide group, it is difficult to provide a well balanced compatibility between an ionic liquid and the base polymer, and this is not preferable, since bleeding to the adherend tends to increase. On the other hand, in the case where a surfactant is used of which the number of moles of the added oxyalkylene units exceeds 50, the ionic liquid is bound by the alkylene oxide groups, so that the antistatic tend to be lowered, and this is not preferable.

The aforementioned surfactants having the alkylene oxide group may be used alone, or two or more of them may be used by mixing, and an amount to be blended is preferably 0.01 to 10 parts by weight, more preferably 0.05 to 5 parts by weight relative to 100 parts by weight of a base polymer. When an amount to be blended is less than 0.01 part by weight, effect of taking balance between antistatic and pollution property is hardly obtained and, when the amount exceeds 10 parts by weight, there is a tendency that stain onto an adherend is increased by the increase of the bleeding, being not preferable.

In the pressure-sensitive adhesive composition of the present invention, pressure-sensitive adhesive sheets further excellent in heat resistance are obtained by appropriately crosslinking a base polymer, in particular, a (meth)acryl-based polymer. Examples of a specific means for a crosslinking method include a so-called method of using a crosslinking agent, in which a compound having a group reactive with a carboxyl group, a hydroxyl group which is appropriately contained as a crosslinking basal point in a (meth)acryl-based polymer such as an isocyanate compound, an epoxy compound, a melanine-based resin and an aziridine compound is added to react them. Among them, from a viewpoint mainly of obtaining an appropriate cohesive strength, an isocyanate compound and an epoxy compound are particularly preferably used. These compounds may be used alone, or may be used by mixing two or more kinds of them.

Among them, examples of the isocyanate compound include aromatic isocyanate such as tolylene diisocyanate, and xylene diisocyanate, alicyclic isocyanate such as isophorone diisocyanate and aliphatic isocyanate such as hexamethylene diisocyanate.

More specific examples of the isocyanate compound include lower aliphatic polyisocyanates such as butylene diisocyanate, and hexamethylene diisocyanate, alicyclic isocyanates such as cyclopentylene diisocyanate, cyclohexylene diisocyanate, and isophorone diisocyanate, aromatic diisocyanates such as 2,4-tolylene diisocyanate, 4,4'-diphenylmethane diisocyanate, and xylene diisocyanate, and isocyanate adducts such as trimethylolpropane/tolylene diisocyanate trimer adduct (trade name: Coronate L manufactured by Nippon Polyurethane Industry Co., Ltd.), trimethylolpropane/hexamethylene diisocyanate trimer adduct (trade name: Coronate HL manufactured by Nippon Polyurethane Industry Co., Ltd.), and isocyanurate of hexamethylene diisocyanate (trade name: Coronate HX manufactured by Nippon Polyurethane Industry Co., Ltd.). These isocyanate compounds may be used alone, or may be used by mixing two or kinds of them.

Examples of the epoxy compound include N,N,N',N'-tetraglycidyl-m-xylenediamine (trade name TETRAD-X manufactured by Mitsubishi Gas Chemical Company, Inc.) and 1,3-bis(N,N-diglycidylaminomethyl)cyclohexane (trade name TETRAD-C manufactured by Mitsubishi Gas Chemical Company Inc.). These compounds may be used alone, or may be used by mixing two or more kinds.

Examples of the melamine-based resin include hexamethylolmelamine.

Examples of the aziridine derivative include trade name HDU, trade name TAZM, and trade name TAZO (all manufactured by Sogo Pharmaceutical Co., Ltd.) as a commercially available product. These compounds may be used alone, or may be used by mixing two or more kinds.

An amount of these crosslinking agents to be used depends on balance between a (meth)acryl-based polymer to be crosslinked, and is appropriately selected depending on utility as a pressure-sensitive adhesive sheet. In order to obtain sufficient heat resistance due to a cohesive strength of an acryl pressure-sensitive adhesive, generally, the crosslinking agent is contained preferably at 0.01 to 15 parts by weight, more preferably 0.5 to 10 parts by weight relative to 100 parts by weight of the (meth)acryl-based polymer. When a content is less than 0.01 part by weight, crosslinking formation due to a crosslinking agent becomes insufficient, a cohesive strength of a pressure-sensitive adhesive composition becomes small, and sufficient heat resistance is not obtained in some cases, and there is a tendency that it becomes cause for an adhesive residue. On the other hand, when a content exceeds 15 parts by weight, a cohesive strength of a polymer is great, fluidity is reduced, and wetting on an adherend becomes insufficient, and there is a tendency that this becomes cause for peeling off.

Alternatively, a polyfunctional monomer containing two or more radiation-reactive unsaturated bonds as a substantial crosslinking agent is added, and this may be crosslinked with radiation.

As the polyfunctional monomer having two or more radiation-reactive unsaturated bonds, a polyfunctional monomer component having two or more of one kind or two or more kinds radiation-reactive groups which can be crosslinking-treated (cured) by irradiation of radiation, such as a vinyl group, an acryloyl group, a methacryloyl group, and a vinylbenzyl group is used. Generally, a component having 10 or less of radiation-reactive unsaturated bonds is suitably used. Two or more kinds of the polyfunctional monomer may be used by mixing.

Examples of the polyfunctional monomer include ethylene glycol di(meth)acrylate, diethylene glycol di(meth)acrylate, tetraethylene glycol di(meth)acrylate, neopentyl glycol di(meth)acrylate, 1,6-hexanediol di(meth)acrylate, trimethylolpropane tri(meth)acrylate, pentaerythritol tri(meth)acrylate, dipentaerythritol hexa(meth)acrylate, divinylbenzene, and N,N'-methylenebisacrylamide.

An amount of the polyfunctional monomer to be used depends on balance between a (meth)acryl-based polymer to be crosslinked, and is appropriately selected depending on utility as a pressure-sensitive adhesive sheet. In order to obtain sufficient heat resistance due to a cohesive strength of an acryl pressure-sensitive adhesive, generally, the monomer is preferably blended at 0.1 to 30 parts by weight relative to 100 parts by weight of a (meth)acryl-based polymer. From a viewpoint of flexibility and tackiness, the monomer is preferably blended at 10 parts by weight or less relative to 100 parts by weight of a (meth)acryl-based polymer.

Examples of radiation include ultraviolet ray, laser ray, α ray, β ray, γ ray, X-ray, and electron beam. From a viewpoint of controlling property and better handling property and a cost, ultraviolet ray is suitably used. More preferably, ultraviolet ray having a wavelength of 200 to 400 nm is used. Ultraviolet ray can be irradiated using an appropriate light source such as a high pressure mercury lamp, a micro-wave excitation-type lamp, and a chemical lamp. When ultraviolet ray is used as irradiation, a photopolymerization initiator is added to an acryl pressure-sensitive adhesive layer.

The photopolymerization initiator depends on a kind of a radiation-reactive component, and may be a substance which produces a radical or a cation by irradiating ultraviolet ray having an appropriately wavelength which can trigger the polymerization reaction.

Example of the photoradical polymerization initiator include benzoins such as benzoin, benzoin methyl ether, benzoin ethyl ether, methyl o-benzoylbenzoate-p-benzoin ethyl ether, benzoin isopropyl ether, and α-methylbenzoin, acetophenes such as benzylmethylketal, trichloroacetophenone, 2,2-diethoxyacetophenone, and 1-hydroxycyclohexyl phenyl ketone, propiophenones such as 2-hydroxy-2-methylpropiophenone, and 2-hydroxy-4'-isopropyl-2-methylpropiophenone, benzophenones such as benzophenone, methylbenzophenone, p-chlorobenzophenone, and p-dimethylaminobenzophenone, thioxanthons such as 2-chlorothioxanthon, 2-ethylthioxanthon, and 2-isopropylthioxanthon, acylphosphine oxides such as bis(2,4,6-trimethylbenzoyl)-phenylphosphine oxide, 2,4,6-trimethylbenzoyl-diphenylphosphine oxide, and (2,4,6-trimethylbenzoyl)-(ethoxy)-phenylphosphine oxide, benzil, dibenzsuberone, and α-acyloxime ether.

Examples of a photocation polymerization initiator include onium salts such as an aromatic diazonium salt, an aromatic iodonium salt, and an aromatic sulfonium salt, organometallic complexes such as an ion-allene complex, a titanocene complex, and an aryl silanol-aluminum complex, nitrobenzyl ester, sulfonic acid derivative, phosphoric acid ester, phenolsulfonic acid ester, diazonaphthoquinone, and N-hydroxymidosulfonate. Two or more kinds of the photopolymerization initiators may be used by mixing.

It is preferably that the photopolymerization initiator is blended usually in a range of 0.1 to 10 parts by weight, preferably 0.2 to 7 parts by weight relative to 100 parts by weight of a (meth)acryl-based polymer.

Further, it is also possible to use a photoinitiation polymerization assistant such as amines. Examples of the photoinitiation assistant include 2-dimethylaminoethyl benzoate, diemethylaminoacetophenone, p-dimethylaminobenzoic acid ethyl ester, and p-dimethylaminobenzoic acid isoamyl ester. Two or more kinds of the photopolymerization initiation assistants may be used. It is preferably that the polymerization initiation assistant is blended at 0.05 to 10 parts by weight, further 0.1 to 7 parts by weight relative to 100 parts by weight a (meth)acryl-based polymer.

Further, the previously known tackifiers, or the previously known various additives such as a leveling agent, an antioxidant, a corrosion preventing agent, a photo stabilizer, an ultraviolet absorbing agent, a polymerization inhibitor, a silane coupling agent, and a powder, a particle, and a foil of inorganic or organic filer, metal powder and pigment may be appropriately added to the pressure-sensitive adhesive composition used in the pressure-sensitive adhesive sheet of the present invention depending on utility.

Meanwhile, the pressure-sensitive adhesive layer in the present invention is such that the aforementioned pressure-sensitive adhesive composition is crosslinked. In addition, pressure-sensitive adhesive sheets of the present invention are such that such the pressure-sensitive adhesive layer is formed on a supporting film. Thereupon, crosslinking of the pressure-sensitive adhesive composition is generally performed after coating of the pressure-sensitive adhesive composition, and a pressure-sensitive adhesive layer composition after crosslinking may be also transferred onto a supporting film.

When a photopolymerization initiator as an arbitrary component is added as described above, a pressure-sensitive adhesive layer can be obtained by coating the pressure-sensitive adhesive composition directly on a subject to be protected, or coating on one side or both sides of a supporting substrate, and performing light irradiation. Usually, a pressure-sensitive adhesive layer is used by photopolymerization by irradiating with ultraviolet ray having an irradiance of 1 to 200 mW/cm$^2$ at a wavelength of 300 to 400 nm, at an expose dose of around 200 to 4000 mJ/cm$^2$ A method of forming a pressure-sensitive adhesive layer on a film is not particularly limited, but for example, a layer is prepared by coating the aforementioned pressure-sensitive adhesive composition on a supporting film, and drying this to remove a polymerization solvent to form a pressure-sensitive adhesive layer on a supporting film. Thereafter, aging may be performed for the purpose of adjusting transference of a component of a pressure-sensitive adhesive layer or adjusting a crosslinking reaction. Alternatively, when pressure-sensitive adhesive sheets are prepared by coating a pressure-sensitive adhesive composition on a supporting film, one or more kinds of solvents other than a polymerization solvent may be newly added to the composition so that the composition can be uniformly coated on a supporting film.

In addition, as a method of forming the pressure-sensitive adhesive layer of the present invention, the known method used for preparing pressure-sensitive adhesive sheets is used. Specifically, examples include roll coating, gravure coating, reverse coating, roll brushing, spray coating, and air knife coating methods, immersing and curtain coating method, and extruding coating method with a die coater.

Pressure-sensitive adhesive sheets of the present invention are such that the aforementioned pressure-sensitive adhesive layer is coated on one side or both sides of various supports comprising a plastic film such as a polyester film, or a porous material such as a paper and a non-woven fabric at a thickness of usually 3 to 100 μm, preferably around 5 to 50 μm, to form an aspect of a sheet or a tape. In particular, it is preferable to use a plastic substrate as a support in a case of a surface protecting film.

The plastic substrate is not particularly limited as far as it can be formed into a sheet or a film, and examples include a polyolefin film such as polyethylene, polypropylene, poly-1-butene, poly-4-methyl-1-pentene, a polybutadiene film, a polymethylpentene film, an ethylene-propylene copolymer, an ethylene.1-butene copolymer, an ethylene.vinyl acetate copolymer, an ethylene-ethyl acrylate copolymer, and an ethylene.vinyl alcohol copolymer, a polyester film such as polyethylene terephthalate, polyethylene naphthalate, and polybutylene terephthalate, a polyacrylate film, a polyurethane film, a polystyrene film, a polyamide film such as nylon 6, nylon 6,6, and partially aromatic polyamide, a polyvinyl chloride film, a vinyl chloride copolymer film, a polyvinylidene chloride film, and a polycarbonate film.

A thickness of the film is usually 5 to 200 μm, preferably around 10 to 100 μm.

The plastic substrate may be subjected to releasing, anti-staining or acid treatment with silicone, fluorine, long chain alkyl-based or fatty acid amide-based releasing agent, or a silica powder, easy adhesion treatment such as alkali treatment, primer treatment, corona treatment, plasma treatment, and ultraviolet ray treatment, or coating-type, kneading-type, or deposition-type antistatic treatment, if necessary.

In addition, it is more preferably that a plastic substrate used in the surface protecting film of the present invention is electrification preventing-treated.

Antistatic treatment which is performed on a plastic substrate is not particularly limited, but for example, a method of providing an electrification preventing layer on at least one side of a generally used film, or a method of kneading a kneading-type electrification preventing agent into a plastic film is used.

Examples of a method of providing an electrification preventing layer on at least one side of a film include a method of coating an electrification preventing resin comprising an electrification preventing agent and a resin component, or an electrically conductive resin containing an electrically conductive polymer or an electrically conductive substance, and a method of depositing or plating an electrically conductive substance.

Examples of an electrification preventing agent contained in an electrification preventing resin include a cation-type electrification preventing agent having a cationic functional group such as a quaternary ammonium salt, a pyridinium salt, and a primary, secondary or tertiary amino group, an anion-type electrification preventing agent having an anionic functional group such as a sulfonic acid salt, a sulfuric acid ester salt, a phosphonic acid salt, and a phosphoric ester salt, an amphoteric-type electrification preventing agent such as alkylbetain and a derivative thereof, imidazoline and a derivative thereof, and alanine and a derivative thereof, a nonion-type electrification preventing agent such as glycerin and a derivative thereof, and polyethylene glycol and a derivative thereof, and an ionic electrically conductive polymer obtained by polymerizing or copolymerizing a monomer having the aforementioned cation-type, anion-type, or amphoteric-type ionic electrically conductive group. These compounds may be used alone, or two or more of them may be used by mixing.

Specifically, examples of the cation-type electrification preventing agent include a (meth)acrylate copolymer having a quaternary ammonium group such as an alkyl trimethylammonium salt, acyloylamidopropyltrimethylammonium methosulfate, an alkylbenzylmethylammonium salt, acyl choline chloride, and polydimethylaminoethyl methacrylate, a styrene copolymer having a quaternary ammonium group such as polyvinylbenzyltrimethylammonium chloride, and a diallylamine copolymer having a quaternary ammonium group such as polydiallyldimethylammonium chloride. The compounds may be used alone, or two or more kinds may be used by mixing.

Examples of the anion-type electrification preventing agent include an alkyl sulfonic acid salt, an alkylbenzenesulfonic acid salt, an alkyl sulfate ester salt, an alkyl ethoxy sulfate ester salt, an alkyl phosphate ester salt, and a sulfonic acid group-containing styrene copolymer. These compounds may be used alone, or two or more kinds may be used by mixing.

Examples of the amphoteric-type electrification preventing agent include alkylbetain, alkylimidazoliumbetain, and carbobetaingrafted copolymer. These compounds may be used alone, or two or more kinds may be used by mixing.

Examples of the nonion-type electrification preventing agent include fatty acid alkylolamide, di(2-hydroxyethyl) alkylamine, polyoxyethylenealkylamine, fatty acid glycerin ester, polyoxyethylene glycol fatty acid ester, sorbitan fatty acid ester, polyoxysorbitan fatty acid ester, polyoxyethylene alkyl phenyl ether, polyoxyethylene alkyl ether, polyethylene glycol, polyoxyethylenediamine, a copolymer consisting of polyether, polyester and polyamide, and methoxypolyethyleneglycol (meth)acrylate. These compounds may be used alone, or two or more kinds may be used by mixing.

Examples of the electrically conductive polymer include polyaniline, polypyrrole and polythiophene. These electrically conductive polymers may be used alone, or two or more kinds may be used by mixing.

Examples of the electrically conductive substance include tin oxide, antimony oxide, indium oxide, cadmium oxide, titanium oxide, zinc oxide, indium, tin, antimony, gold, silver, copper, aluminum, nickel, chromium, titanium, iron, covert, copper iodide, and an alloy and a mixture thereof. These electrically conductive substances may be used alone, or two or more kinds may be used by mixing.

As a resin component used in the electrification preventing resin and the electrically conductive resin, a generally used resin such as polyester, acryl, polyvinyl, urethane, melanine and epoxy is used. In the case of a polymer-type electrification preventing agent, it is not necessary that a resin component is contained. In addition, the electrification preventing resin component may contain compounds of a methylolated or alkylolated melanine series, a urea series, a glyoxal series, and an acrylamide series, an epoxy compound, or an isocyanate compound as a crosslinking agent.

An electrification preventing layer is formed, for example, by diluting the aforementioned electrification preventing resin, electrically conductive polymer or electrically conductive resin with a solvent such as an organic solvent and water, and coating this coating solution on a plastic film, followed by drying.

Examples of an organic solvent used in formation of the electrification preventing layer include methyl ethyl ketone, acetone, ethyl acetate, tetrahydrofuran, dioxane, cyclohexanone, n-hexane, toluene, xylene, methanol, ethanol, n-propanol and isopropanol. These solvents may be used alone, or two or more kinds may be used by mixing.

As a coating method in formation of the electrification preventing layer, the known coating method is appropriately used, and examples include roll coating, gravure coating, reverse coating, roll brushing, spray coating, and air knife coating methods, an immersing and curtain coating method, and an extrusion coating method with a die coater.

A thickness of the aforementioned electrification preventing resin layer, electrically conductive polymer or electrically conductive resin is usually 0.01 to 5 μm, preferably around 0.03 to 1 μm.

Examples of a method of depositing or plating an electrically conductive substance include vacuum deposition, sputtering, ion plating, chemical deposition, spray pyrolysis, chemical plating, and electric plating methods.

A thickness of the electrically conductive substance is usually 20 to 10000 Å, preferably 50 to 5000 Å.

As the kneading-type electrification preventing agent, the aforementioned electrification preventing agent is appropriately used.

An amount of the kneading-type electrification preventing agent to be blended is 20% by weight or less, preferably in a range of 0.05 to 10% by weight relative to a total weight of a plastic film. A kneading method is not particularly limited as far as it is a method by which the electrification preventing agent can be uniformly mixed into a resin used in a plastic film, but for example, a heating roll, a Banbury mixer, a pressure kneader, and a biaxial kneading machine are used.

The plastic film may be subjected to releasing, anti-staining or acid treatment with a silicone-based, fluorine-based, long chain alkyl-based or fatty acid amide-based releasing agent, or a silica powder, or easy adhesion treatment such as alkali treatment, primer treatment, corona treatment, plasma treatment, and ultraviolet treatment, if necessary.

If necessary, a separator (or peeling liner, peeling sheet etc.) can be laminated on a surface of a pressure-sensitive adhesive for the purpose of protecting a pressure-sensitive adhesive surface. As a substrate constituting a separator, there are a paper and a plastic film, and a plastic film is suitably used from a viewpoint of excellent surface smoothness.

The film is not particularly limited as far as it is a film which can protect the pressure-sensitive adhesive layer, and examples include a polyolefin film such as polyethylene, polypropylene, poly-1-butene, poly-4-methyl-1-pentene, an ethylene-propylene copolymer, an ethylene-1-butene copolymer, an ethylene.vinyl acetate copolymer, an ethylene-ethyl acrylate copolymer, and an ethylene.vinyl alcohol copolymer, a polyether film such as polyethylene terephthalate, polyethylene naphthalate, and polybutylene terephthalate, a polyacrylate film, a polystyrene film, a polyamide film such as nylon 6, nylon 6,6, and partially aromatic polyamide, a polyvinyl chloride film, a poly vinylidene chloride film, and a polycarbonate film.

A thickness of the film is usually around 5 to 200 μm, preferably around 10 to 100 μm. A pressure-sensitive adhesive layer applying surface of the film is appropriately subjected to treatment with a releasing agent such as a silicone-based, fluorine-based, long chain alkyl-based, or fatty acid amide-based releasing agent, or a silica powder.

The pressure-sensitive adhesive composition, the pressure-sensitive adhesive layer and the pressure-sensitive adhesive sheets using the present invention are used, particularly, in plastic products on which static electricity is easily generated and, in particular, can be used as a surface protecting film used for the purpose of protecting an optical member surface such as a polarizing plate, a wavelength plate, an optical compensating film, a light diffusion sheet and a reflecting sheet which are used in a liquid crystal display.

EXAMPLES

Examples which specifically show a construction and effect of the present invention will be explained below. Assessment items in Examples were measured as follows:

<Measurement of Acid Value>

An acid value was measured using an automatically titrating apparatus (COM-550 manufactured by HIRANUMA SANGYO Co., Ltd.), and was obtained by the following equation.

$$A=\{(Y-X) \times f \times 5.611\}/M$$

A; Acid value
Y; Titration amount of sample solution (ml)
X; Titration amount of solution of only 50 g of mixed solvent (ml)
f; Factor of titration solution
M; Weight of polymer sample (g)
Measurement Conditions are as Follows:

Sample solution: About 0.5 g of a polymer sample was dissolved in 50 g of a mixed solvent (toluene/2-propanol/distilled water=50/49.5/0.5, weight ratio) to obtain a sample solution.

Titration solution: 0.1N2-propanolic potassium hydroxide solution (for petroleum product neutralization value test manufactured by Wako Pure Chemical Industries, Ltd.)

Electrode: glass electrode; GE-101, comparative electrode; RE-201, Measurement mode: petroleum product neutralization value test 1

<Measurement of Molecular Weight>

A molecular weight was measured using a GPC apparatus (HLC-8220GPC manufactured by Tosoh Corporation). Measuring conditions are as follows.

Sample concentration: 0.2 wt % (THF solution)
Sample injection amount: 10 μl
Eluent: THF
Flow rate: 0.6 ml/min
Measuring temperature: 40° C.
Column:
Sample column;
TSKguard column SuperHZ-H(1 column)+TSK gel Super HZM-H(2 columns)
Reference column;
TSK gel SuperH-RC(1 column)
Detector: Refractive index detector (RI)
A molecular weight was obtained in terms of polystyrene.

<Analysis of Ionic Liquid Structure>

Structural analysis of an ionic liquid was performed by NMR measurement, XRF measurement, and FT-IR measurement.

[NMR Measurement]

NMR measurement was performed under the following measuring condition using a nuclear magnetic resonance apparatus (EX-400 manufactured by JEOL. Ltd.).

Observation frequency: 400 MHz ($^1$H), 100 MHz ($^{13}$C)
Measuring solvent: acetone-$d_6$
Measuring temperature: 23° C.

[XRF Measurement]

XRF measurement was performed under the following measuring condition using a scanning-type fluorescent X-ray analyzing apparatus (ZSX-100e manufactured by Rigaku Corporation).

Measuring method: filter paper method
X-ray source: Rh

[FT-IR Measurement]

FT-IR measurement was performed under the following measuring condition using an infrared spectrophotometer (Magna-560 manufactured by Nicolet).

Measuring method: ATR method
Detector: DTGS
Resolution: 4.0 cm$^{-1}$
Accumulation times: 64

Examples I to III will be explained below.

Example I

Measurement of Glass Transition Temperature Tg

A glass transition temperature Tg(° C.) was obtained by the following equation using the following reference values as a glass transition temperature $Tg_n$(° C.) of a homopolymer of each monomer.
Equation:

$$1/(Tg+273)=\Sigma[W_n/(Tg_n+273)]$$

[wherein Tg (° C.) represents a glass transition temperature of a copolymer, $W_n$ (–) represents a weight fraction of each monomer, $Tg_n$ (° C.) represents a glass transition temperature of a homopolymer of each polymer, and n represents a kind of each monomer]
Reference Values:
2-Ethylhexyl acrylate: –70° C.
Ethoxy-diethylene glycol acrylate: –70° C.
2-Hydroxyethyl acrylate: –15° C.

<Measurement of Glass Transition Temperature Tg of Acryl-Based Polymer (F) and (G); Measurement of a Dynamic Viscoelasticity>

A glass transition temperature Tg(° C.) of Acryl-based polymer (F) and (G) was obtained by the following procedures using the measurement of a dynamic viscoelasticity.

Sheets of an acryl-based polymer having a thickness of 25 μm were laminated into a thickness of about 2 mm, this was punched into φ7.9 mm to prepare a cylindrical pellet, and this was used as a sample for measuring a glass transition temperature (Tg).

Using the measuring sample, the measuring sample was fixed on a jig of a φ7.9 mm parallel plate, temperature dependency of loss elastic modulus G" was measured with a dynamic viscoelasticity measuring apparatus (ARES manufactured by Rheometric Scientific, Inc.), and a temperature at which the resulting G" curve became a maximum was adopted as a glass transition temperature (Tg) (° C.). Measuring conditions are as follows.
Measurement: shear mode
Temperature range: –70° C. to 200° C.
Temperature raising rate: 5° C./min
Frequency: 1 Hz

[Preparation of (Meth)Acryl-Based Polymers]

(Acryl-Based Polymer (A))

A four-neck flask equipped with a stirring wing, a thermometer, a nitrogen gas introducing tube, a condenser, and a dropping funnel was charged with 140 parts by weight of 2-ethylhexyl acrylate, 60 parts by weight of ethoxy-diethylene glycol acrylate, 8 parts by weight of 2-hydroxyethyl acrylate, 0.4 part by weight of 2,2'-azobisisobutyronitrile as a polymerization initiator, 218 parts by weight of ethyl acetate, and 94 parts by weight of toluene, a nitrogen gas was introduced while mildly stirring, and a polymerization reaction was performed for about 6 hours while maintaining a liquid temperature in a flask at about 65° C., to prepare a solution (40% by weight) of an acryl-based polymer (A). This acryl-based polymer (A) had Tg=–68° C., a weight average molecular weight of 500 thousands, and an acid value of 0.0.

(Acryl-Based Polymer (B))

A four-neck flask equipped with a stirring wing, a thermometer, a nitrogen gas introducing tube, a condenser, and a dropping funnel was charged with 200 parts by weight of ethoxy-diethylene glycol acrylate, 12 parts by weight of 2-hydroxyethyl acrylate, 0.4 part by weight of 2,2'-azobisisobutyronitrile as a polymerization initiator, 197 parts by weight of ethyl acetate, and 197 parts by weight of toluene, a nitrogen gas was introduced while mildly stirring, and a polymerization reaction was performed for about 6 hours while maintaining a liquid temperature in a flask at about 65° C., to prepare a solution (35% by weight) of an acryl-based polymer (B). This acryl-based polymer (B) had Tg=–68° C., a weight average molecular weight of 430 thousands, and an acid value of 0.0.

(Acryl-Based Polymer (C))

A four-neck flask equipped with a stirring wing, a thermometer, a nitrogen gas introducing tube, a condenser, and a dropping funnel was charged with 200 parts by weight of 2-ethylhexyl acrylate, 8 parts by weight of 2-hydroxyethyl acrylate, 0.4 part by weight of 2,2'-azobisisobutyronitrile as a polymerization initiator, and 312 parts by weight of ethyl acetate, a nitrogen gas was introduced while mildly stirring, and a polymerization reaction was performed for about 6 hours while maintaining a liquid temperature in a flask at about 65° C., to prepare a solution (40% by weight) of an acryl-based polymer (C). This acryl-based polymer (C) had Tg=–68° C., a weight average molecular weight of 500 thousands, and an acid value of 0.0.

(Acryl-Based Polymer (D))

A four-neck flask equipped with a stirring wing, a thermometer, a nitrogen gas introducing tube, a condenser, and a dropping funnel was charged with 190 parts by weight of 2-ethylhexyl acrylate, 10 parts by weight of ethoxy-diethylene glycol acrylate, 8 parts by weight of 2-hydroxyethyl acrylate, 0.4 part by weight of 2,2'-azobisisobutyronitrile as a polymerization initiator, and 312 parts by weight of ethyl acetate, a nitrogen gas was introduced while mildly stirring, and a polymerization reaction was performed for about 6 hours while maintaining a liquid temperature in a flask at about 65° C., to prepare a solution (40% by weight) of an acryl-based polymer (D). This acryl-based polymer (D) had Tg=–68° C., a weight average molecular weight of 680 thousands, and an acid value of 0.0.

(Acryl-Based Polymer (E))

A four-neck flask equipped with a stirring wing, a thermometer, a nitrogen gas introducing tube, a condenser, and a dropping funnel was charged with 180 parts by weight of 2-ethylhexyl acrylate, 20 parts by weight of ethoxy-diethylene glycol acrylate, 8 parts by weight of 2-hydroxyethyl acrylate, 0.4 part by weight of 2,2'-azobisisobutyronitrile as a polymerization initiator, 265 parts by weight of ethyl acetate, and 47 parts by weight of toluene, a nitrogen gas was introduced while mildly stirring, and a polymerization reaction was performed for about 6 hours while maintaining a liquid temperature in a flask at about 65° C., to prepare a solution (40% by weight) of an acryl-based polymer (E). This acryl-based polymer (E) had Tg=–68° C., a weight average molecular weight of 510 thousands, and an acid vaglue of 0.0.

(Acryl-Based Polymer (F))

A four-neck flask equipped with a stirring wing, a thermometer, a nitrogen gas introducing tube, a condenser, and a dropping funnel was charged with 199 parts by weight of 2-ethylhexyl acrylate, 1 part by weight of methoxy polyethylene glycol monoacrylate (manufactured by NOF Corporation, Blemmer PME-1000, number of EO moles added to: approximately 23), 8 parts by weight of 2-hydroxyethyl acrylate, 0.4 part by weight of 2,2'-azobisisobutyronitrile as a polymerization initiator, and 387 parts by weight of ethyl acetate, a nitrogen gas was introduced while mildly stirring, and a polymerization reaction was performed for about 6 hours while maintaining a liquid temperature in a flask at about 65° C., to prepare a solution (35% by weight) of an acryl-based polymer (F). This acryl-based polymer (F) had a Tg of no higher than 0° C., a weight average molecular weight of 490 thousands, and an acid value of 0.0.

(Acryl-Based Polymer (G))

A four-neck flask equipped with a stirring wing, a thermometer, a nitrogen gas introducing tube, a condenser, and a dropping funnel was charged with 199.4 parts by weight of 2-ethylhexyl acrylate, 0.6 part by weight of methoxy polyethylene glycol monoacrylate (manufactured by NOF Corporation, Blemmer PME-1000, number of EO moles added to: approximately 23), 8 parts by weight of 2-hydroxyethyl acrylate, 0.4 part by weight of 2,2'-azobisisobutyronitrile as a polymerization initiator, and 387 parts by weight of ethyl acetate, a nitrogen gas was introduced while mildly stirring, and a polymerization reaction was performed for about 6 hours while maintaining a liquid temperature in a flask at about 65° C., to prepare a solution (35% by weight) of an acryl-based polymer (G). This acryl-based polymer (G) had a Tg of no higher than 0° C., a weight average molecular weight of 490 thousands, and an acid value of 0.0.

[Preparation of Ionic Liquids]

(Ionic Liquid (a))

A 20% by weight aqueous solution of 10 parts by weight of 1-butyl-3-methylimidazolium bromide (manufactured by Tokyo Kasei Kogyo Co., Ltd.) was added to four-neck flask equipped with a stirring wing, a thermometer, and a condenser, and a 20% by weight aqueous solution of 19 parts by weight of lithium bis(trifluoromethanesulfonyl)imide (manufactured by Kishida Chemical Co., Ltd.) was gradually added while rotating a stirring wing. After addition, stirring was continued at 25° C. for 2 hours, and this was allowed to stand for 12 hours. Then, the supernatant was removed to obtain a liquid product.

The resulting liquid product was washed with 200 parts by weight of distilled water three times, and dried for 2 hours under the environment of 110° C. to obtain 20 parts by weight of an ionic liquid (a) which is liquid at 25° C. NMR (1H, 13C) measurement, FT-IR measurement, and XRF measurement of the resulting ionic liquid (a) were performed, and 1-butyl-3-methylimidazolium bis(trifluoromethanesulfonyl)imide was identified and confirmed.

(Ionic Liquid (b))

A 20% by weight aqueous solution of 10 parts by weight of 1-butyl-3-methylpyridinium chloride (manufactured by Wako Pure Chemical Industries, Ltd.) was added to four-neck flask equipped with a stirring wing, a thermometer, and a condenser, and a 20% by weight aqueous solution of 19 parts by weight of lithium bis(trifluoromethanesulfonyl)imide (manufactured by Kishida Chemical Co., Ltd.) was gradually added while rotating a stirring wing. After addition, stirring was continued at 25° C. for 2 hours, and this was allowed to stand for 12 hours. Then, the supernatant was removed to obtain a liquid product.

The resulting liquid product was washed with 200 parts by weight of distilled water three times, and dried for 2 hours under the environment of 110° C. to obtain 20 parts by weight of an ionic liquid (b) which is liquid at 25° C. NMR (1H, 13C) measurement, FT-IR measurement, and XRF measurement of the resulting ionic liquid (b) were performed, and 1-butyl-3-methylpyridinium bis(trifluoromethanesulfonyl)imide was identified and confirmed.

[Preparation of Antistatic Agent Solutions]

(Antistatic Agent Solution (a))

A four-neck flask equipped with a stirring wing, a thermometer, and a condenser was charged with 5 parts by weight of N,N-diethyl-N-methyl-N-(2-methoxyethyl)ammonium bis(trifluoromethanesulfonyl)imide (manufactured by Kanto Chemical Co., Inc, liquid at 25° C.), 5 parts by weight of a nonionic reactive surfactant (manufactured by Asahi Denka Co., Ltd., ADEKA REASOAP NE-10), and 90 parts by weight of ethyl acetate, and mixing and stirring were performed for 30 minutes while maintaining a liquid temperature in a flask at around normal temperature (25° C.) to prepare a solution (10% by weight) of an antistatic agent solution (a).

(Antistatic Agent Solution (b))

A four-neck flask equipped with a stirring wing, a thermometer, and a condenser was charged with 5 parts by weight of N,N-diethyl-N-methyl-N-(2-methoxyethyl)ammonium bis(trifluoromethanesulfonyl)imide (manufactured by KANTO Chemical Co., Inc, liquid at 25° C.), 5 parts by weight of a nonionic reactive surfactant (manufactured by Asahi Denka Co., Ltd., ADEKA REASOAP ER-10), and 90 parts by weight of ethyl acetate, and mixing and stirring were performed for 30 minutes while maintaining a liquid temperature in a flask at around normal temperature (25° C.) to prepare a solution (10% by weight) of an antistatic agent solution (b).

(Antistatic Agent Solution (c))

A four-neck flask equipped with a stirring wing, a thermometer, and a condenser was charged with 10 parts by weight of lauryl trimethyl ammonium chloride (manufactured by Tokyo Kasei Kogyo Co., Ltd., solid at 25° C.), and 90 parts by weight of isopropyl alcohol, and mixing and stirring were performed for 30 minutes while maintaining a liquid temperature in a flask at around normal temperature (25° C.) to prepare a solution (10% by weight) of an antistatic agent solution (c).

(Antistatic Agent Solution (d))

Ten parts by weight of lauryl trimethyl ammonium chloride (manufactured by Tokyo Kasei Kogyo Co., Ltd., solid at 25° C.) which is a cationic surfactant was distilled with 20 parts by weight of ethyl acetate and 20 parts by weight of isopropyl alcohol, and whereby, an antistatic agent solution (d) (20% by weight) was prepared.

(Antistatic Agent Solution (e))

A four-neck flask equipped with a stirring wing, a thermometer, and a condenser was charged with 0.2 part by weight of lithium perchlorate, 9.8 parts by weight of polypropylene glycol (diol type, number average molecular weight: 2000), and 10 parts by weight of ethyl acetate, and mixing and stirring were performed for 2 hours while maintaining a temperature of a liquid in a flask at around 80° C., to prepare an antistatic agent solution (e) (50% by weight).

[Preparation of Antistatic-Treated Film]

(Antistatic-Treated Film)

10 Parts by weight of an antistatic agent (Microsolver RMd-142 manufactured by Solvex Co., Ltd.; a main component is tin oxide and polyester resin) was diluted with a mixed solvent containing 30 parts by weight of water and 70 parts by weight of methanol to prepare an antistatic agent solution.

The resulting antistatic agent solution was coated on a polyethylene terephthalate (PET) film (thickness 38 μm) using a Meyer bar, and this was dried at 130° C. for 1 minute to remove a solvent, to form an antistatic layer (thickness 0.2 μm), whereby, an antistatic-treated film was prepared.

Example I-1

Preparation of Pressure-Sensitive Adhesive Composition

A solution (40% by weight) of the aforementioned acryl based polymer (A) was distilled to 20% by weight with ethyl acetate, and to 100 parts by weight of this solution were added 0.2 part by weight of 1-hexyl-3-methyl imidazolium trifluoromethane sulfonate (manufactured by ACROS Organics Corporation, liquid at 25° C.), 0.6 part by weight of an isocyanurate of hexamethylene diisocyanate (manufactured by Nippon Polyurethane Industry Co., Ltd, Coronate HX), and 0.4 part by weight of tin dibutyl dilaurate (1% by weight of ethyl acetate solution), which is a crosslinking catalyst, which was mixed and stirred for approximately 1 minute at room temperature (25° C.), and whereby, an acryl pressure-sensitive adhesive solution (1) was prepared.

(Preparation of Pressure-Sensitive Adhesive Sheet)

The aforementioned acryl pressure-sensitive adhesive solution (1) was coated on a side opposite to an antistatic-treated side of the antistatic-treated film obtained in Preparation described above, and this was heated at 110° C. for 3 minutes to form a pressure-sensitive adhesive layer having a thickness of 20 μm. Then, a silicone-treated side of a polyethylene terephthalate film having a thickness of 25 μm which had been subjected to silicone-treated was laminated on one side of a surface of the aforementioned pressure sensitive adhesive layer to prepare a pressure-sensitive adhesive sheet.

Example I-2

Preparation of Pressure-Sensitive Adhesive Composition

A solution (40% by weight) of the aforementioned acryl based polymer (A) was distilled to 20% by weight with ethyl acetate, and to 100 parts by weight of this solution were added 0.3 part by weight of aforementioned ionic liquid (a) (liquid at 25° C.), 0.4 part by weight of an isocyanurate of hexamethylene diisocyanate (manufactured by Nippon Polyurethane Industry Co., Ltd, Coronate HX), and 0.4 part by weight of tin dibutyl dilaurate (1% by weight of ethyl acetate solution), which is a crosslinking catalyst, which was mixed and stirred for approximately 1 minute at room temperature (25° C.), and whereby, an acryl pressure-sensitive adhesive solution (2) was prepared.

(Preparation of Pressure-Sensitive Adhesive Sheet)

According to the same manner as that of Example I-1 except that the acryl pressure-sensitive adhesive solution (2) was used in place of an acryl pressure-sensitive adhesive solution (1), a pressure-sensitive adhesive sheet was prepared.

Example I-3

Preparation of Pressure-Sensitive Adhesive Composition

An acryl pressure-sensitive adhesive solution (3) was prepared in the same manner as in Example I-2, except that 0.3 part by weight of N,N-diethyl-N-methyl-N-(2-methoxy ethyl)ammonium bis(trifluoromethanesulfonyl)imide (manufactured by Kanto Chemical Co., Inc, liquid at 25° C.) was used in place of 0.3 part by weight of the aforementioned ionic liquid (a).

(Preparation of Pressure-Sensitive Adhesive Sheet)

According to the same manner as that of Example I-1 except that the acryl pressure-sensitive adhesive solution (3) was used in place of an acryl pressure-sensitive adhesive solution (1), a pressure-sensitive adhesive sheet was prepared.

Example I-4

Preparation of Pressure-Sensitive Adhesive Composition

The aforementioned solution (35% by weight) of acryl based polymer (B) was diluted to 20% by weight with ethyl acetate, and to 100 parts by weight of this solution were added 1.2 parts by weight of 1-hexyl-3-methyl imidazolium trifluoromethane sulfonate (manufactured by ACROS Organics Corporation, liquid at 25° C.), 0.4 part by weight of an isocyanurate of hexamethylene diisocyanate (manufactured by Nippon Polyurethane Industry Co., Ltd, Coronate HX), and 0.4 part by weight of tin dibutyl dilaurate (1% by weight of ethyl acetate solution), which is a crosslinking catalyst, which was mixed and stirred for approximately 1 minute at room temperature (25° C.), and whereby, an acryl pressure-sensitive adhesive solution (4) was prepared.

(Preparation of Pressure-Sensitive Adhesive Sheet)

According to the same manner as that of Example I-1 except that the acryl pressure-sensitive adhesive solution (4) was used in place of an acryl pressure-sensitive adhesive solution (1), a pressure-sensitive adhesive sheet was prepared.

Example I-5

Preparation of Pressure-Sensitive Adhesive Composition

A solution (40% by weight) of the aforementioned acryl based polymer (A) was distilled to 20% by weight with ethyl acetate, and to 100 parts by weight of this solution were added 6.0 parts by weight of the aforementioned antistatic agent solution (a) (10% by weight), 0.5 part by weight of an isocyanurate of hexamethylene diisocyanate (manufactured by Nippon Polyurethane Industry Co., Ltd, Coronate HX), and 0.4 part by weight of tin dibutyl dilaurate (1% by weight of ethyl acetate solution), which is a crosslinking catalyst, which was mixed and stirred for approximately 1 minute at room temperature (25° C.), and whereby, an acryl pressure-sensitive adhesive solution (5) was prepared.

(Preparation of Pressure-Sensitive Adhesive Sheet)

According to the same manner as that of Example I-1 except that the acryl pressure-sensitive adhesive solution (5) was used in place of an acryl pressure-sensitive adhesive solution (1), a pressure-sensitive adhesive sheet was prepared.

Example I-6

Preparation of Pressure-Sensitive Adhesive Composition

According to the same manner as that of Example I-5 except that 6.0 parts by weight of the aforementioned antistatic agent solution (b) (10% by weight) was used in place of 6.0 parts by weight of the aforementioned antistatic agent solution (a) (10% by weight), an acryl pressure-sensitive adhesive solution (6) was prepared.

(Preparation of Pressure-Sensitive Adhesive Sheet)

According to the same manner as that of Example I-1 except that the acryl pressure-sensitive adhesive solution (6) was used in place of an acryl pressure-sensitive adhesive solution (1), a pressure-sensitive adhesive sheet was prepared.

Comparative Example I-1

Preparation of Pressure-Sensitive Adhesive Composition

The aforementioned solution (40% by weight) of acryl based polymer (C) was diluted to 20% by weight with ethyl acetate, and to 100 parts by weight of this solution were added 0.1 part by weight of 1-hexyl-3-methyl imidazolium trifluoromethane sulfonate (manufactured by ACROS Organics Corporation, liquid at 25° C.), 0.8 part by weight of an isocyanurate of hexamethylene diisocyanate (manufactured by Nippon Polyurethane Industry Co., Ltd, Coronate HX), and 0.4 part by weight of tin dibutyl dilaurate (1% by weight of ethyl acetate solution), which is a crosslinking catalyst, which was mixed and stirred for approximately 1 minute at room temperature (25° C.), and whereby, an acryl pressure-sensitive adhesive solution (7) was prepared.

(Preparation of Pressure-Sensitive Adhesive Sheet)

According to the same manner as that of Example I-1 except that the acryl pressure-sensitive adhesive solution (7) was used in place of an acryl pressure-sensitive adhesive solution (1), a pressure-sensitive adhesive sheet was prepared.

Comparative Example I-2

Preparation of Pressure-Sensitive Adhesive Composition

A solution (40% by weight) of the aforementioned acryl based polymer (C) was distilled to 20% by weight with ethyl acetate, and to 100 parts by weight of this solution were added 0.2 part by weight of aforementioned ionic liquid (a) (liquid at 25° C.), 0.4 part by weight of an isocyanurate of hexamethylene diisocyanate (manufactured by Nippon Polyurethane Industry Co., Ltd, Coronate HX), and 0.4 part by weight of tin dibutyl dilaurate (1% by weight of ethyl acetate solution), which is a crosslinking catalyst, which was mixed and stirred for approximately 1 minute at room temperature (25° C.), and whereby, an acryl pressure-sensitive adhesive solution (8) was prepared.

(Preparation of Pressure-Sensitive Adhesive Sheet)

According to the same manner as that of Example I-1 except that the acryl pressure-sensitive adhesive solution (8) was used in place of an acryl pressure-sensitive adhesive solution (1), a pressure-sensitive adhesive sheet was prepared.

Comparative Example I-3

Preparation of Pressure-Sensitive Adhesive Composition

An acryl pressure-sensitive adhesive solution (9) was prepared in the same manner as in Comparative Example I-2, except that 0.2 part by weight of N,N-diethyl-N-methyl-N-(2-methoxy ethyl)ammonium bis(trifluoromethanesulfonyl) imide (manufactured by Kanto Chemical Co., Inc, liquid at 25° C.) was used in place of 0.2 part by weight of the aforementioned ionic liquid (a).

(Preparation of Pressure-Sensitive Adhesive Sheet)

According to the same manner as that of Example I-1 except that the acryl pressure-sensitive adhesive solution (9) was used in place of an acryl pressure-sensitive adhesive solution (1), a pressure-sensitive adhesive sheet was prepared.

Comparative Example I-4

Preparation of Pressure-Sensitive Adhesive Composition

An acryl pressure sensitive adhesive solution (10) was prepared in the same manner as in Comparative Example I-3, except that 0.02 part by weight of N,N-diethyl-N-methyl-N-(2-metoxyethyl)ammonium bis(trifluoromethanesulfonyl) imide (manufactured by Kanto Chemical Co., Inc, liquid at 25° C.) was used in place of 0.2 part by weight of the aforementioned N,N-diethyl-N-methyl-N-(2-metoxyethyl)ammonium bis(trifluoromethanesulfonyl)imide (manufactured by Kanto Chemical Co., Inc, liquid at 25° C.).

(Preparation of Pressure-Sensitive Adhesive Sheet)

According to the same manner as that of Example I-1 except that the acryl pressure-sensitive adhesive solution (10) was used in place of an acryl pressure-sensitive adhesive solution (1), a pressure-sensitive adhesive sheet was prepared.

Comparative Example I-5

Preparation of Pressure-Sensitive Adhesive Composition

According to the same manner as that of Example I-2 except that 10.0 parts by weight of the aforementioned antistatic agent solution (c) (10% by weight) was used in place of 0.3 part by weight of the aforementioned aionic liquid (a), an acryl pressure-sensitive adhesive solution (11) was prepared.

(Preparation of Pressure-Sensitive Adhesive Sheet)

According to the same manner as that of Example I-1 except that the acryl pressure-sensitive adhesive solution (11) was used in place of an acryl pressure-sensitive adhesive solution (1), a pressure-sensitive adhesive sheet was prepared.

Example I-7

Preparation of Pressure-Sensitive Adhesive Composition

A solution (40% by weight) of the aforementioned acryl based polymer (A) was distilled to 20% by weight with ethyl acetate, and to 100 parts by weight of this solution were added 0.3 part by weight of aforementioned ionic liquid (b) (liquid at 25° C.), 0.4 part by weight of an isocyanurate of hexamethylene diisocyanate (manufactured by Nippon Polyurethane Industry Co., Ltd, Coronate HX), and 0.4 part by weight of tin dibutyl dilaurate (1% by weight of ethyl acetate solution), which is a crosslinking catalyst, which was mixed and stirred for approximately 1 minute at room temperature (25° C.), and whereby, an acryl pressure-sensitive adhesive solution (12) was prepared.

(Preparation of Pressure-Sensitive Adhesive Sheet)

According to the same manner as that of Example I-1 except that the acryl pressure-sensitive adhesive solution (12) was used in place of an acryl pressure-sensitive adhesive solution (1), a pressure-sensitive adhesive sheet was prepared.

Example I-8

Preparation of Pressure-Sensitive Adhesive Composition

A solution (40% by weight) of the aforementioned acryl based polymer (D) was distilled to 20% by weight with ethyl acetate, and to 100 parts by weight of this solution were added 0.2 part by weight of aforementioned ionic liquid (b) (liquid at 25° C.), 0.4 part by weight of an isocyanurate of hexamethylene diisocyanate (manufactured by Nippon Polyurethane Industry Co., Ltd, Coronate HX), and 0.4 part by weight of tin dibutyl dilaurate (1% by weight of ethyl acetate solution), which is a crosslinking catalyst, which was mixed and stirred for approximately 1 minute at room temperature (25° C.), and whereby, an acryl pressure-sensitive adhesive solution (13) was prepared.

(Preparation of Pressure-Sensitive Adhesive Sheet)

According to the same manner as that of Example I-1 except that the acryl pressure-sensitive adhesive solution (13) was used in place of an acryl pressure-sensitive adhesive solution (1), a pressure-sensitive adhesive sheet was prepared.

Example I-9

An acryl pressure-sensitive adhesive solution was prepared in accordance with the same method as that in Example I-8, except that a solution (40% by weight) of the aforementioned acryl based polymer (E) was used instead of the solution (40% by weight) of the aforementioned acryl based polymer (D), and a pressure-sensitive adhesive sheet was prepared in the same method as in Example I-8 using this.

Example I-10

An acryl pressure-sensitive adhesive solution was prepared in accordance with the same method as that in Example I-8, except that a solution (35% by weight) of the aforementioned acryl based polymer (F) was used instead of the solution (40% by weight) of the aforementioned acryl based polymer (D), and a pressure-sensitive adhesive sheet was prepared in the same method as in Example I-8 using this.

Example I-11

An acryl pressure-sensitive adhesive solution was prepared in accordance with the same method as that in Example I-8, except that a solution (35% by weight) of the aforementioned acryl based polymer (G) was used instead of the solution (40% by weight) of the aforementioned acryl based polymer (D), and a pressure-sensitive adhesive sheet was prepared in the same method as in Example I-8 using this.

Comparative Example I-6

Preparation of Pressure-Sensitive Adhesive Composition

A solution (40% by weight) of the aforementioned acryl based polymer (C) was distilled to 20% by weight with ethyl acetate, and to 100 parts by weight of this solution were added 0.2 part by weight of aforementioned ionic liquid (b) (liquid at 25° C.), 0.4 part by weight of an isocyanurate of hexamethylene diisocyanate (manufactured by Nippon Polyurethane Industry Co., Ltd, Coronate HX), and 0.4 part by weight of tin dibutyl dilaurate (1% by weight of ethyl acetate solution), which is a crosslinking catalyst, which was mixed and stirred for approximately 1 minute at room temperature (25° C.), and whereby, an acryl pressure-sensitive adhesive solution (14) was prepared.

(Preparation of Pressure-Sensitive Adhesive Sheet)

According to the same manner as that of Example I-1 except that the acryl pressure-sensitive adhesive solution (14) was used in place of an acryl pressure-sensitive adhesive solution (1), a pressure-sensitive adhesive sheet was prepared.

Comparative Example I-7

An acryl pressure-sensitive adhesive solution was prepared in the same manner as in Example I-8, except that 0.2 part by weight of the aforementioned ionic liquid (b) was not used, and a pressure-sensitive adhesive sheet was fabricated in the same method as in Example I-8 using this.

Comparative Example I-8

An acryl pressure-sensitive adhesive solution was prepared in the same manner as in Example I-9, except that 0.2 part by weight of the aforementioned ionic liquid (b) was not used, and a pressure-sensitive adhesive sheet was fabricated in the same method as in Example I-8 using this.

Comparative Example I-9

An acryl pressure-sensitive adhesive solution was prepared in the same manner as in Comparative Example I-6, except that 1.0 parts by weight of the aforementioned antistatic agent solution (d) (20% by weight) was used in place of 0.2 part by weight of the aforementioned ionic liquid (b), and a pressure-sensitive adhesive sheet was fabricated in the same method as in Comparative Example I-6 using this.

Comparative Example I-10

Preparation of Pressure-Sensitive Adhesive Composition

A solution (40% by weight) of the aforementioned acryl based polymer (C) was distilled to 20% by weight with ethyl acetate, and to 100 parts by weight of this solution were added 4 parts by weight of aforementioned antistatic agent solution (e) (50% by weight), 0.53 part by weight of a trimethylolpropane/tolylene diisocyanate trimer adduct (manufactured by Nippon Polyurethane Industry Co., Ltd, Coronate L), and 0.4 part by weight of tin dibutyl dilaurate (1% by weight of ethyl acetate solution), which is a crosslinking catalyst, which was mixed and stirred for approximately 1 minute at room temperature (25° C.), and whereby, an acryl pressure-sensitive adhesive solution (15) was prepared.

(Preparation of Pressure-Sensitive Adhesive Sheet)

According to the same manner as that of Example I-1 except that the acryl pressure-sensitive adhesive solution (15) was used in place of an acryl pressure-sensitive adhesive solution (1), a pressure-sensitive adhesive sheet was prepared.

Regarding the pressure-sensitive adhesive sheets obtained in the aforementioned Examples and Comparative Examples, a peeling electrification voltage, staining property, and an adhesive strength were assessed under the following conditions.

<Measurement of Peeling Electrification Voltage>

A pressure-sensitive adhesive sheet was cut into a size of a width of 70 mm and a length of 130 mm, a separator was peeled, and this was adhered to a surface of a polarizing plate (SEG1425EWVGS2B manufactured by Nitto Denko Corporation, width: 70 mm, length: 100 mm) laminated to an acryl plate (Acrylite manufactured by Mitsubishi Rayon Co., Ltd, thickness: 1 mm, width: 70 mm, length: 100 mm) from which electricity had been removed in advance, with a hand roller, so that one end was protruded by 30 mm.

After allowed to stand for one day under the environment of 23° C.×50% RH, and a sample was set at a prescribed position as shown in FIG. 1. One end protruding by 30 mm was fixed on an automatic winding machine, and a sample (a pressure-sensitive adhesive sheet 2) was peeled at a peeling angle of 150° and a peeling rate of 10 m/min. A voltage at a surface of a polarizing plate 3 (placed on an acryl plate 4 supported by a sample fixing base 5) generated thereupon was measured with an electrostatic voltmeter 1 (KSD-0103 manufactured by Kasuga Denka, INC.) fixed at a prescribed position. Measurement was performed under the environment of 23° C.×50% RH.

<Assessment of Staining Property>

A pressure-sensitive adhesive sheet was cut into a size of a width of 30 mm and a length of 80 mm, a separator was peeled, and this was adhered on a surface of a polarizing plate (SEG1425EWVAGS2B manufactured by Nitto Denko Corporation, width 70 mm, length: 100 mm), with a hand roller, to prepare an assessment sample.

The aformentioned assessment sample was allowed to stand for 24 hours under the environment 50° C.×92% RH and, thereafter, the pressure-sensitive adhesive sheet was peeled from an adherend with a hand, and staining state of an adherend surface thereupon was observed with naked eyes. Assessment criteria are as follows:

Case of observation of no staining: ○
Case of observation of staining: x

<Measurement of Adhesive Strength>

A triacetylcellulose film (FujiTAC manufactured by Fuji Photo Film Co., Ltd., thickness: 90 μm) was cut into size of a width of 70 mm and a length of 100 mm, this was immersed in an aqueous sodium hydroxide solution (10% by weight) at 60° C. for 1 minute, and washed with distilled water to prepare an adherend.

The adherend was allowed to stand for 24 hours under the environment of 23° C.×50% RH, and a pressure-sensitive adhesive sheet which had been cut into a size of a width of 25 mm and a length of 100 mm was laminated on the adherend at a pressure of 0.25 MPa to prepare an assessment sample.

After allowing to stand for 30 minutes under the environment of 23° C.×50% RH after the lamination, an adhesive strength when peeled with a universal tensile testing machine at a peeling rate of 10 m/min and a peeling angle of 180° was measured. Measurement was performed under the environment of 23° C.×50% RH.

The results of the above are shown in Table 1.

TABLE 1

|  | peeling electrification voltage [kV] | staining property [-] | adhesive strength [N/25 mm] |
|---|---|---|---|
| Example I-1 | 0.0 | ○ | 0.4 |
| Example I-2 | −0.3 | ○ | 0.9 |
| Example I-3 | 0.0 | ○ | 0.9 |
| Example I-4 | −0.4 | ○ | 0.6 |
| Example I-5 | 0.0 | ○ | 0.6 |
| Example I-6 | 0.0 | ○ | 0.5 |
| Example I-7 | −0.3 | ○ | 0.9 |
| Example I-8 | 0.0 | ○ | 1.2 |
| Example I-9 | 0.0 | ○ | 1.3 |
| Example I-10 | 0.0 | ○ | 0.9 |
| Example I-11 | 0.0 | ○ | 1.0 |
| Comparative Example I-1 | 0.0 | x | 0.4 |
| Comparative Example I-2 | 0.0 | x | 0.8 |
| Comparative Example I-3 | −0.3 | x | 0.8 |
| Comparative Example I-4 | −0.9 | ○ | 0.9 |
| Comparative Example I-5 | 0.0 | x | 0.5 |
| Comparative Example I-6 | 0.0 | x | 1.6 |
| Comparative Example I-7 | −1.2 | ○ | 1.4 |
| Comparative Example I-8 | −1.0 | ○ | 1.4 |
| Comparative Example I-9 | 0.0 | x | 0.3 |
| Comparative Example I-10 | 0.0 | x | 0.5 |

As can be seen from the results shown in the aforementioned Table 1, in the case where the pressure-sensitive adhesive composition manufactured in the present invention was used (Examples I-1 to I-11), it is clear that the peeling electrification voltage of a polarizing plate was suppressed, and staining on a polarizing plate did not occur in any of the Examples.

In contrast to this, in the case where a pressure-sensitive adhesive composition where the (meth)acryl-based polymer did not contain a (meth)acrylic acid alkylene oxide as monomer units is used (Comparative Examples I-1 to I-3 and I-6), and in Comparative Examples I-5 to I-9, where a cation type surfactant was used as an antistatic agent, the results showed that the occurrence of staining was recognized, although the peeling electrification voltage was suppressed. In addition, in Comparative Example I-4, where the amount of antistatic agent was reduced in the pressure-sensitive adhesive composition where the (meth)acryl polymer did not contain (meth)acrylic acid alkylene oxide as monomer units, the results showed that although the occurrence of staining was not recognized, the peeling electrification voltage had become high. Furthermore, in Comparative Examples I-7 and I-8, where no ionic liquid was utilized, the results showed that the peeling electrification voltage had become high. Furthermore, in Comparative Example I-10, where an antistatic agent containing the polyether polyol and the alkali metal salt was used, staining occurred due to bleeding. Accordingly, in any of Comparative Examples, the results showed that restriction of the peeling electrification voltage of the polarizing plate which is an adherend, and prevention of staining could not both be achieved.

Example II

Measurement of Glass Transition Temperature Tg

The glass transition temperature Tg (° C.) of the polymer was found with the following equation using the following reference values as a glass transition temperature Tgn(° C.) of a homopolymer of each monomer. Here, no reference value was found for N-cyclohexyl maleimide, and the glass transition temperature thereof was determined using a Measurement of a dynamic viscoelasticity.

Equation:

$$1/(Tg+273)=\Sigma[W_n/(Tg_n+273)]$$

[wherein Tg (° C.) represents a glass transition temperature of a copolymer, Wn (–) represents a weight fraction of each monomer, Tgn (° C.) represents a glass transition temperature of a homopolymer of each polymer, and n represents a kind of each monomer]

Reference Values:
2-Ethyl hexyl acrylate: –70° C.
2-Hydroxy ethyl acrylate: –15° C.
N,N-Diethyl acryl amide: 81° C.
Diacetone acryl amide: 77° C.
Acryloyl morpholine: 145° C.

<Measurement of a Dynamic Viscoelasticity>

The glass transition temperature (Tg) (° C.) of a polymer that contains N-cyclohexyl maleimide was determined based on the measurement of a dynamic viscoelasticity that is described in Example I.

[Preparation of (Meth)Acryl-Based Polymers]

(Acryl-Based Polymer (a))

A four-neck flask equipped with a stirring wing, a thermometer, a nitrogen gas introducing tube, a condenser, and a dropping funnel was charged with 190 parts by weight of 2-ethylhexyl acrylate, 10 parts by weight of N,N-diethyl acryl amide, 8 parts by weight of 2-hydroxyethyl acrylate, 0.4 part by weight of 2,2'-azobisisobutyronitrile as a polymerization initiator, and 312 parts by weight of ethyl acetate, a nitrogen gas was introduced while mildly stirring, and a polymerization reaction was performed for about 5 hours while maintaining a liquid temperature in a flask at about 60° C., to prepare a solution (40% by weight) of an acryl-based polymer (A). This acryl-based polymer (A) had Tg=–64° C., a weight average molecular weight of 620 thousands, and an acid value of 0.0.

(Acryl-Based Polymer (B))

A four-neck flask equipped with a stirring wing, a thermometer, a nitrogen gas introducing tube, a condenser, and a dropping funnel was charged with 190 parts by weight of 2-ethylhexyl acrylate, 10 parts by weight of diacetone acryl amide, 8 parts by weight of 2-hydroxyethyl acrylate, 0.4 part by weight of 2,2'-azobisisobutyronitrile as a polymerization initiator, and 312 parts by weight of ethyl acetate, a nitrogen gas was introduced while mildly stirring, and a polymerization reaction was performed for about 5 hours while maintaining a liquid temperature in a flask at about 60° C., to prepare a solution (40% by weight) of an acryl-based polymer (B). This acryl-based polymer (B) had Tg=–64° C., a weight average molecular weight of 730 thousands, and an acid value of 0.0.

(Acryl-Based Polymer (C))

A four-neck flask equipped with a stirring wing, a thermometer, a nitrogen gas introducing tube, a condenser, and a dropping funnel was charged with 190 parts by weight of 2-ethylhexyl acrylate, 10 parts by weight of acryloyl morpholine, 8 parts by weight of 2-hydroxyethyl acrylate, 0.4 part by weight of 2,2'-azobisisobutyronitrile as a polymerization initiator, and 312 parts by weight of ethyl acetate, a nitrogen gas was introduced while mildly stirring, and a polymerization reaction was performed for about 5 hours while maintaining a liquid temperature in a flask at about 60° C., to prepare a solution (40% by weight) of an acryl-based polymer (C). This acryl-based polymer (C) had Tg=–63° C., a weight average molecular weight of 730 thousands, and an acid value of 0.0.

(Acryl-Based Polymer (D))

A four-neck flask equipped with a stirring wing, a thermometer, a nitrogen gas introducing tube, a condenser, and a dropping funnel was charged with 190 parts by weight of 2-ethylhexyl acrylate, 10 parts by weight of N-cyclohexyl maleimide, 8 parts by weight of 2-hydroxyethyl acrylate, 0.4 part by weight of 2,2'-azobisisobutyronitrile as a polymerization initiator, and 312 parts by weight of ethyl acetate, a nitrogen gas was introduced while mildly stirring, and a polymerization reaction was performed for about 5 hours while maintaining a liquid temperature in a flask at about 60° C., to prepare a solution (40% by weight) of an acryl-based polymer (D). This acryl-based polymer (D) had Tg=–55° C., a weight average molecular weight of 800 thousands, and an acid value of 0.0.

(Acryl-Based Polymer (E))

A four-neck flask equipped with a stirring wing, a thermometer, a nitrogen gas introducing tube, a condenser, and a dropping funnel was charged with 180 parts by weight of 2-ethylhexyl acrylate, 20 parts by weight of N,N-diethyl acryl amide, 8 parts by weight of 2-hydroxyethyl acrylate, 0.4 part by weight of 2,2'-azobisisobutyronitrile as a polymerization initiator, and 312 parts by weight of ethyl acetate, a nitrogen gas was introduced while mildly stirring, and a polymerization reaction was performed for about 5 hours while maintaining a liquid temperature in a flask at about 60° C., to prepare a solution (40% by weight) of an acryl-based polymer (E). This acryl-based polymer (E) had Tg=–59° C., a weight average molecular weight of 610 thousands, and an acid value of 0.0.

(Acryl-Based Polymer (F))

A four-neck flask equipped with a stirring wing, a thermometer, a nitrogen gas introducing tube, a condenser, and a dropping funnel was charged with 200 parts by weight of 2-ethylhexyl acrylate, 8 parts by weight of 2-hydroxyethyl acrylate, 0.4 part by weight of 2,2'-azobisisobutyronitrile as a polymerization initiator, and 312 parts by weight of ethyl acetate, a nitrogen gas was introduced while mildly stirring, and a polymerization reaction was performed for about 5 hours while maintaining a liquid temperature in a flask at about 60° C., to prepare a solution (40% by weight) of an acryl-based polymer (F). This acryl-based polymer (F) had Tg=–68° C., a weight average molecular weight of 550 thousands, and an acid value of 0.0.

[Preparation of Ionic Liquid]

(Ionic liquid (1))

A 20% by weight aqueous solution of 10 parts by weight of 1-butyl-3-methylpyridinium chloride (manufactured by Wako Pure Chemical Industries, Ltd.) was added to four-neck flask equipped with a stirring wing, a thermometer, and a condenser, and a 20% by weight aqueous solution of 19 parts by weight of lithium bis(trifluoromethanesulfonyl)imide (manufactured by Kishida Chemical Co., Ltd.) was gradually added while rotating a stirring wing. After addition, stirring was continued at 25° C. for 2 hours, and this was allowed to stand for 12 hours. Then, the supernatant was removed to obtain a liquid product.

The resulting liquid product was washed with 200 parts by weight of distilled water three times, and dried for 2 hours under the environment of 110° C. to obtain 20 parts by weight of an ionic liquid (1) which is liquid at 25° C. NMR (1H, 13C) measurement, FT-IR measurement, and XRF measurement of the resulting ionic liquid (1) were performed, and 1-butyl-3-methylpyridinium bis(trifluoromethanesulfonyl)imide was identified and confirmed.

[Preparation of Antistatic Agent Solution]

(Antistatic Agent Solution (a))

Ten parts by weight of the aforementioned ionic liquid (1), and 90 parts by weight of ethyl acetate were put into a flask with four openings provided with mixing blades, a thermometer, and a condenser, and the mixture was stirred for 30 minutes while the temperature of the liquid within the flask was maintained at approximately room temperature (25° C.), so that an antistatic agent solution (a) (10% by weight) was prepared.

(Antistatic Agent Solution (b))

Five parts by weight of the aforementioned ionic liquid (1), 5 parts by weight of nonionic reactive surfactant (manufactured by Asahi Denka Co., Ltd., ADEKA REASOAP ER-10), and 90 parts by weight of ethyl acetate were put into a flask with four openings provided with mixing blades, a thermometer, and a condenser, and the mixture was stirred for 30 minutes while the temperature of the liquid within the flask was maintained at approximately room temperature (25° C.), so that an antistatic agent solution (b) (10% by weight) was prepared.

(Antistatic Agent Solution (c))

Ten parts by weight of N,N-diethyl-N-methyl-N-(2-methoxy ethyl) ammonium bis(trifluoromethanesulfonyl)imide (manufactured by Kanto Chemical Co., Inc, liquid at 25° C.) and 90 parts by weight of ethyl acetate were put into a flask with four openings provided with mixing blades, a thermometer, and a condenser, and the mixture was stirred for 30 minutes while the temperature of the liquid within the flask was maintained at approximately room temperature (25° C.), so that an antistatic agent solution (c) (10% by weight) was prepared.

(Antistatic Agent Solution (d))

A four-neck flask equipped with a stirring wing, a thermometer, and a condenser was charged with 0.1 part by weight of lithium iodide, 9.9 parts by weight of polypropylene glycol (diol type, number average molecular weight: 2000), and 90 parts by weight of ethyl acetate, and mixing and stirring were performed for 2 hours while maintaining a temperature of a liquid in a flask at around 80° C., to prepare an antistatic agent solution (d) (10% by weight).

[Preparation of Antistatic-Treated Film]

(Antistatic-Treated Film)

The antistatic-treated film of Preparation Example in Example II was used as an antistatic-treated film in Example I.

Example II-1

Preparation of Pressure-Sensitive Adhesive Composition

A solution (40% by weight) of the aforementioned acryl-based polymer (A) was distilled to 20% by weight with ethyl acetate, and to 100 parts by weight of this solution were added 3 parts by weight of the antistatic agent solution (a) (10% by weight), 0.6 part by weight of an isocyanurate of hexamethylene diisocyanate (manufactured by Nippon Polyurethane Industry Co., Ltd, Coronate HX), and 0.4 part by weight of tin dibutyl dilaurate (1% by weight ethyl acetate solution), which is a crosslinking catalyst, which was mixed and stirred for approximately 1 minute at room temperature (25° C.), and whereby, an acryl pressure-sensitive adhesive solution (1) was prepared.

(Preparation of Pressure-Sensitive Adhesive Sheet)

The aforementioned acryl pressure-sensitive adhesive solution (1) was coated on a side opposite to an antistatic-treated side of the antistatic-treated film obtained in Preparation described above, and this was heated at 110° C. for 3 minutes to form a pressure-sensitive adhesive layer having a thickness of 20 μm. Then, a silicone-treated side of a polyethylene terephthalate film having a thickness of 25 μm which had been subjected to silicone-treated was laminated on one side of a surface of the aforementioned pressure sensitive adhesive layer to prepare a pressure-sensitive adhesive sheet.

Example II-2

Preparation of Pressure-Sensitive Adhesive Composition

A solution (40% by weight) of the aforementioned acryl-based polymer (B) was distilled to 20% by weight with ethyl acetate, and to 100 parts by weight of this solution were added 6 parts by weight of the antistatic agent solution (b) (10% by weight), 0.6 part by weight of an isocyanurate of hexamethylene diisocyanate (manufactured by Nippon Polyurethane Industry Co., Ltd, Coronate HX), and 0.4 part by weight of tin dibutyl dilaurate (1% by weight ethyl acetate solution), which is a crosslinking catalyst, which was mixed and stirred for approximately 1 minute at room temperature (25° C.), and whereby, an acryl pressure-sensitive adhesive solution (2) was prepared.

(Preparation of Pressure-Sensitive Adhesive Sheet)

According to the same manner as that of Example II-1 except that the acryl pressure-sensitive adhesive solution (2) was used in place of an acryl pressure-sensitive adhesive solution (1), a pressure-sensitive adhesive sheet was prepared.

Example II-3

Preparation of Pressure-Sensitive Adhesive Composition

A solution (40% by weight) of the aforementioned acryl-based polymer (C) was distilled to 20% by weight with ethyl acetate, and to 100 parts by weight of this solution were added 6 parts by weight of the antistatic agent solution (b) (10% by weight), 0.6 part by weight of an isocyanurate of hexamethylene diisocyanate (manufactured by Nippon Polyurethane Industry Co., Ltd, Coronate HX), and 0.4 part by weight of tin dibutyl dilaurate (1% by weight ethyl acetate solution), which is a crosslinking catalyst, which was mixed and stirred for approximately 1 minute at room temperature (25° C.), and whereby, an acryl pressure-sensitive adhesive solution (3) was prepared.

(Preparation of Pressure-Sensitive Adhesive Sheet)

According to the same manner as that of Example II-1 except that the acryl pressure-sensitive adhesive solution (3) was used in place of an acryl pressure-sensitive adhesive solution (1), a pressure-sensitive adhesive sheet was prepared.

Example II-4

Preparation of Pressure-Sensitive Adhesive Composition

A solution (40% by weight) of the aforementioned acryl-based polymer (D) was distilled to 20% by weight with ethyl acetate, and to 100 parts by weight of this solution were added 6 parts by weight of the antistatic agent solution (b) (10% by weight), 0.6 part by weight of an isocyanurate of hexamethylene diisocyanate (manufactured by Nippon Polyurethane Industry Co., Ltd, Coronate HX), and 0.4 part by weight of tin dibutyl dilaurate (1% by weight ethyl acetate solution), which is a crosslinking catalyst, which was mixed and stirred for approximately 1 minute at room temperature (25° C.), and whereby, an acryl pressure-sensitive adhesive solution (4) was prepared.

(Preparation of Pressure-Sensitive Adhesive Sheet)

According to the same manner as that of Example II-1 except that the acryl pressure-sensitive adhesive solution (4) was used in place of an acryl pressure-sensitive adhesive solution (1), a pressure-sensitive adhesive sheet was prepared.

Example II-5

Preparation of Pressure-Sensitive Adhesive Composition

A solution (40% by weight) of the aforementioned acryl-based polymer (E) was distilled to 20% by weight with ethyl acetate, and to 100 parts by weight of this solution were added 6 parts by weight of the antistatic agent solution (a) (10% by weight), 0.6 part by weight of an isocyanurate of hexamethylene diisocyanate (manufactured by Nippon Polyurethane Industry Co., Ltd, Coronate HX), and 0.4 part by weight of tin dibutyl dilaurate (1% by weight ethyl acetate solution), which is a crosslinking catalyst, which was mixed and stirred for approximately 1 minute at room temperature (25° C.), and whereby, an acryl pressure-sensitive adhesive solution (5) was prepared.

(Preparation of Pressure-Sensitive Adhesive Sheet)

According to the same manner as that of Example II-1 except that the acryl pressure-sensitive adhesive solution (5) was used in place of an acryl pressure-sensitive adhesive solution (1), a pressure-sensitive adhesive sheet was prepared.

Example II-6

Preparation of Pressure-Sensitive Adhesive Composition

A solution (40% by weight) of the aforementioned acryl-based polymer (E) was distilled to 20% by weight with ethyl acetate, and to 100 parts by weight of this solution were added 2 parts by weight of the antistatic agent solution (c) (10% by weight), 0.6 part by weight of an isocyanurate of hexamethylene diisocyanate (manufactured by Nippon Polyurethane Industry Co., Ltd, Coronate HX), and 0.4 part by weight of tin dibutyl dilaurate (1% by weight ethyl acetate solution), which is a crosslinking catalyst, which was mixed and stirred for approximately 1 minute at room temperature (25° C.), and whereby, an acryl pressure-sensitive adhesive solution (6) was prepared.

(Preparation of Pressure-Sensitive Adhesive Sheet)

According to the same manner as that of Example II-1 except that the acryl pressure-sensitive adhesive solution (6) was used in place of an acryl pressure-sensitive adhesive solution (1), a pressure-sensitive adhesive sheet was prepared.

Comparative Example II-1

Preparation of Pressure-Sensitive Adhesive Composition

A solution (40% by weight) of the aforementioned acryl-based polymer (F) was distilled to 20% by weight with ethyl acetate, and to 100 parts by weight of this solution were added 2 parts by weight of the antistatic agent solution (a) (10% by weight), 0.6 part by weight of an isocyanurate of hexamethylene diisocyanate (manufactured by Nippon Polyurethane Industry Co., Ltd, Coronate HX), and 0.4 part by weight of tin dibutyl dilaurate (1% by weight ethyl acetate solution), which is a crosslinking catalyst, which was mixed and stirred for approximately 1 minute at room temperature (25° C.), and whereby, an acryl pressure-sensitive adhesive solution (7) was prepared.

(Preparation of Pressure-Sensitive Adhesive Sheet)

According to the same manner as that of Example II-1 except that the acryl pressure-sensitive adhesive solution (7) was used in place of an acryl pressure-sensitive adhesive solution (1), a pressure-sensitive adhesive sheet was prepared.

Comparative Example II-2

Preparation of Pressure-Sensitive Adhesive Composition

A solution (40% by weight) of the aforementioned acryl-based polymer (F) was distilled to 20% by weight with ethyl acetate, and to 100 parts by weight of this solution were added 14 parts by weight of the antistatic agent solution (d) (10% by weight), 0.6 part by weight of an isocyanurate of hexamethylene diisocyanate (manufactured by Nippon Polyurethane Industry Co., Ltd, Coronate HX), and 0.4 part by weight of tin dibutyl dilaurate (1% by weight ethyl acetate solution), which is a crosslinking catalyst, which was mixed and stirred for approximately 1 minute at room temperature (25° C.), and whereby, an acryl pressure-sensitive adhesive solution (8) was prepared.

(Preparation of Pressure-Sensitive Adhesive Sheet)

According to the same manner as that of Example II-1 except that the acryl pressure-sensitive adhesive solution (8) was used in place of an acryl pressure-sensitive adhesive solution (1), a pressure-sensitive adhesive sheet was prepared.

Comparative Example II-3

Preparation of Pressure-Sensitive Adhesive Composition

A solution (40% by weight) of the aforementioned acryl-based polymer (F) was distilled to 20% by weight with ethyl acetate, and to 100 parts by weight of this solution were added 2.0 parts by weight of an anionic surfactant, a sodium salt of dialkyl sulfo succinate (manufactured by DAI-ICHI kogyo seiyaku CO., Ltd., NEOCOL P), 1 part by weight of a trimethylolpropane/tolylene diisocyanate trimer adduct (manufactured by Nippon Polyurethane Industry Co., Ltd, Coronate L, 75% by weight ethyl acetate solution), and 0.6 part by weight of tin dibutyl dilaurate (1% by weight ethyl acetate solution), which is a crosslinking catalyst, which was mixed and stirred for approximately 1 minute at room temperature (25° C.), and whereby, an acryl pressure-sensitive adhesive solution (9) was prepared.

(Preparation of Pressure-Sensitive Adhesive Sheet)

According to the same manner as that of Example II-1 except that the acryl pressure-sensitive adhesive solution (9) was used in place of an acryl pressure-sensitive adhesive solution (1), a pressure-sensitive adhesive sheet was prepared.

Regarding the pressure-sensitive adhesive sheets obtained in the aforementioned Examples and Comparative Examples, a peeling electrification voltage, staining property, an adhesive strength, and occurrence of peeling off were assessed under the following conditions.

<Measurement of Peeling Electrification Voltage>

Measurement of peeling electrification voltage in Example II was measured as in Example I.

<Assessment of Staining Property>

A pressure-sensitive adhesive sheet was cut into a size of a width of 50 mm and a length of 80 mm, a separator was peeled, and this was adhered on a surface of a polarizing plate (SEG1425DU manufactured by Nitto Denko Corporation, width: 70 mm, length: 100 mm), with a hand roller, to prepare an assessment sample.

The afornentioned assessment sample was allowed to stand for 24 hours under the environment 50° C.×92% RH, and then for 2 hours under the environment 23° C.×50% RH, and, thereafter, the pressure-sensitive adhesive sheet was peeled from an adherend with a hand, and staining state of an adherend surface thereupon was observed with naked eyes. Assessment criteria are as follows:

Case of observation of no staining: ○
Case of observation of staining: x

<Measurement of Adhesive Strength>

A pressure-sensitive adhesive sheet was cut into a size of a width of 25 mm and a length of 100 mm, a separator was peeled, and this was laminated on a polarizing plate (SEG1425DU manufactured by Nitto Denko Corporation, width: 70 mm, length: 100 mm) with a pressure of 0.25 MPa, to prepare an assessment sample.

After allowing to stand for 30 minutes under the environment of 23° C.×50% RH after the lamination, an adhesive strength when peeled with a universal tensile testing machine at a peeling rate of 10 m/min and a peeling angle of 180° was measured. Measurement was performed under the environment of 23° C.×50% RH.

<Assessment of Occurrence of Peeling Off>

A pressure-sensitive adhesive sheet was cut into a size of a width of 40 mm and a length of 40 mm, a separator was peeled, and the resulting sheet was laminated on a polarizing plate (SEG1425WVAGS2B manufactured by Nitto Denko Corporation, width: 70 mm, length: 100 mm) with a pressure of 0.25 MPa after a separator was peeled off, to prepare an assessment sample.

After being laminated, the aforementioned assessment sample was fixed to a slide glass (manufactured by Matsunami Glass Ind., Ltd., with clearly polished edges, thickness: 1.3 mm, width: 65 mm, length: 165 mm), and an autoclave process was carried out for 20 minutes at 50° C. under 5 atmospheres. After that, the sample was left for 2 hours at 80° C. at normal pressures, and then, whether or not the pressure-sensitive adhesive sheet peels from the polarizing plate was observed with naked eyes. Assessment criteria are as follows:

In the case where the occurrence of peeling off was not observed: ○

In the case where the occurrence of peeling off was observed: x

The results of the above are shown in Table 2.

TABLE 2

|  | peeling electrification voltage [kV] | staining property [-] | adhesive strength [N/25 mm] | occurrence of peeling off [-] |
|---|---|---|---|---|
| Example II-1 | 0.0 | ○ | 1.1 | ○ |
| Example II-2 | −0.1 | ○ | 1.1 | ○ |
| Example II-3 | 0.0 | ○ | 1.0 | ○ |
| Example II-4 | 0.0 | ○ | 1.3 | ○ |
| Example II-5 | −0.1 | ○ | 1.8 | ○ |
| Example II-6 | 0.0 | ○ | 1.4 | ○ |
| Comparative Example II-1 | 0.0 | x | 0.6 | x |
| Comparative Example II-2 | −0.2 | x | 0.4 | x |
| Comparative Example II-3 | 0.0 | x | 0.4 | x |

As can be seen from the results shown in the aforementioned Table 2, in the case where the pressure-sensitive adhesive composition manufactured in the present invention was used (Examples I-1 to II-6), it is clear that the peeling electrification voltage of a polarizing plate was suppressed, staining on a polarizing plate, occurrence of peeling off did not occur, and the adhesion reliance is excellent in any of the Examples.

In contrast to this, in the case where a pressure-sensitive adhesive composition that did not contain a nitrogen-containing monomer as a monomer unit was used (Comparative Examples II-1 to II-3), the results showed that in all cases, staining and occurrence of peeling off were observed, although the peeling electrification voltage was suppressed. Accordingly, in all of the Comparative Examples, the results showed that suppression of the peeling electrification voltage to the polarizing plate, which is an adherend, as well as prevention of staining and the occurrence of peeling off, and in addition to the excellent adhesion reliance could not all be achieved at the same time. [Example III]

<Measurement of Glass Transition Temperature Tg; Measurement of a Dynamic Viscoelasticity>

The glass transition temperature (Tg) (° C.) of the resulting (meth)acryl-based polymer was determined based on the measurement of a dynamic viscoelasticity described in Example I.

[Preparation of (Meth)Acryl-Based Polymers]

(Acryl-Based Polymer (A))

A four-neck flask equipped with a stirring wing, a thermometer, a nitrogen gas introducing tube, a condenser, and a dropping funnel was charged with 195 parts by weight of 2-ethylhexyl acrylate, 5 parts by weight of a nonionic reactive surfactant (manufactured by Asahi Denka Co., Ltd., Adeka Reasoap ER-10), 8 parts by weight of 2-hydroxy ethyl acrylate, 0.4 part by weight of 2,2'-azobisisobutyronitrile as a polymerization initiator, and 312 parts by weight of ethyl acetate, a nitrogen gas was introduced while mildly stirring, and a polymerization reaction was performed for about 6 hours while maintaining a liquid temperature in a flask at about 65° C., to prepare a solution (40% by weight) of an acryl-based polymer (A). This acryl-based polymer (A) had Tg=−10° C. or lower, a weight average molecular weight of 680 thousands, and an acid value of 0.0.

(Acryl-Based Polymer (B))

A four-neck flask equipped with a stirring wing, a thermometer, a nitrogen gas introducing tube, a condenser, and a dropping funnel was charged with 200 parts by weight of 2-ethylhexyl acrylate, 8 parts by weight of 2-hydroxy ethyl acrylate, 0.4 part by weight of 2,2'-azobisisobutyronitrile as a polymerization initiator, and 312 parts by weight of ethyl acetate, a nitrogen gas was introduced while mildly stirring, and a polymerization reaction was performed for about 6 hours while maintaining a liquid temperature in a flask at about 65° C., to prepare a solution (40% by weight) of an acryl-based polymer (B). This acryl-based polymer (B) had Tg=−10° C. or lower, a weight average molecular weight of 550 thousands, and an acid value of 0.0.

(Acryl-Based Polymer (C))

A four-neck flask equipped with a stirring wing, a thermometer, a nitrogen gas introducing tube, a condenser, and a dropping funnel was charged with 198 parts by weight of 2-ethylhexyl acrylate, 2 parts by weight of a nonionic reactive surfactant (manufactured by Asahi Denka Co., Ltd., Adeka Reasoap ER-10), 8 parts by weight of 2-hydroxy ethyl acrylate, 0.4 part by weight of 2,2'-azobisisobutyronitrile as a polymerization initiator, and 386 parts by weight of ethyl acetate, a nitrogen gas was introduced while mildly stirring, and a polymerization reaction was performed for about 5 hours while maintaining a liquid temperature in a flask at about 60° C., to prepare a solution (35% by weight) of an acryl-based polymer (C). This acryl-based polymer (C) had Tg=−10° C. or lower, a weight average molecular weight of 440 thousands, and an acid value of 0.0.

(Acryl-Based Polymer (D))

A four-neck flask equipped with a stirring wing, a thermometer, a nitrogen gas introducing tube, a condenser, and a dropping funnel was charged with 193 parts by weight of 2-ethylhexyl acrylate, 6 parts by weight of diacetone acryl amide, 1 part by weight of a nonionic reactive surfactant (manufactured by Asahi Denka Co., Ltd., Adeka Reasoap ER-10), 8 parts by weight of 2-hydroxy ethyl acrylate, 0.4 part by weight of 2,2'-azobisisobutyronitrile as a polymerization initiator, and 312 parts by weight of ethyl acetate, a nitrogen gas was introduced while mildly stirring, and a polymerization reaction was performed for about 5 hours while maintaining a liquid temperature in a flask at about 60° C., to prepare a solution (40% by weight) of an acryl-based polymer (D). This acryl-based polymer (D) had Tg=−10° C. or lower, a weight average molecular weight of 650 thousands, and an acid value of 0.0.

(Acryl-Based Polymer (E))

A four-neck flask equipped with a stirring wing, a thermometer, a nitrogen gas introducing tube, a condenser, and a dropping funnel was charged with 193 parts by weight of 2-ethylhexyl acrylate, 6 parts by weight of acryloyl morpholine, 1 part by weight of a nonionic reactive surfactant (manufactured by Asahi Denka Co., Ltd., Adeka Reasoap ER-10), 8 parts by weight of 2-hydroxy ethyl acrylate, 0.4 part by weight of 2,2'-azobisisobutyronitrile as a polymerization initiator, and 312 parts by weight of ethyl acetate, a nitrogen gas was introduced while mildly stirring, and a polymerization reaction was performed for about 5 hours while maintaining a liquid temperature in a flask at about 60° C., to prepare a solution (40% by weight) of an acryl-based polymer (E). This acryl-based polymer (E) had Tg=−10° C. or lower, a weight average molecular weight of 600 thousands, and an acid value of 0.0.

(Acryl-Based Polymer (F))

A four-neck flask equipped with a stirring wing, a thermometer, a nitrogen gas introducing tube, a condenser, and a dropping funnel was charged with 193 parts by weight of 2-ethylhexyl acrylate, 6 parts by weight of N,N-diethyl acryl amide, 1 part by weight of a nonionic reactive surfactant (manufactured by Asahi Denka Co., Ltd., Adeka Reasoap ER-10), 8 parts by weight of 2-hydroxy ethyl acrylate, 0.4 part by weight of 2,2'-azobisisobutyronitrile as a polymerization initiator, and 312 parts by weight of ethyl acetate, a nitrogen gas was introduced while mildly stirring, and a polymerization reaction was performed for about 5 hours while maintaining a liquid temperature in a flask at about 60° C., to prepare a solution (40% by weight) of an acryl-based polymer (F). This acryl-based polymer (F) had Tg=−10° C. or lower, a weight average molecular weight of 620 thousands, and an acid value of 0.0.

[Preparation of Ionic Liquids]

(Ionic Liquid (1))

A 20% by weight aqueous solution of 10 parts by weight of 1-butyl-3-methylpyridinium chloride (manufactured by Wako Pure Chemical Industries, Ltd.) was added to four-neck flask equipped with a stirring wing, a thermometer, and a condenser, and a 20% by weight aqueous solution of 19 parts by weight of lithium bis(trifluoromethanesulfonyl)imide (manufactured by Kishida Chemical Co., Ltd.) was gradually added while rotating a stirring wing. After addition, stirring was continued at 25° C. for 2 hours, and this was allowed to stand for 12 hours. Then, the supernatant was removed to obtain a liquid product.

The resulting liquid product was washed with 200 parts by weight of distilled water three times, and dried for 2 hours under the environment of 110° C. to obtain 20 parts by weight of an ionic liquid (1) which is liquid at 25° C. NMR (1H, 13C) measurement, FT-IR measurement, and XRF measurement of the resulting ionic liquid (1) were performed, and 1-butyl-3-methylpyridinium bis(trifluoromethanesulfonyl)imide was identified and confirmed.

[Preparation of Antistatic Agent Solutions]

(Antistatic Agent Solution (a))

Ten parts by weight of lauryl trimethyl ammonium chloride (manufactured by Tokyo Kasei Kogyo Co., Ltd., solid at 25° C.) which is a cationic surfactant was distilled with 20 parts by weight of ethyl acetate and 20 parts by weight of isopropyl alcohol, and whereby, an antistatic agent solution (a) (20% by weight) was prepared.

(Antistatic Agent Solution (b))

A four-neck flask equipped with a stirring wing, a thermometer, and a condenser was charged with 0.2 part by weight of lithium perchlorate, 9.8 parts by weight of polypropylene glycol (diol type, number average molecular weight: 2000), and 10 parts by weight of ethyl acetate, and mixing and stirring were performed for 2 hours while maintaining a temperature of a liquid in a flask at around 80° C., to prepare an antistatic agent solution (b) (50% by weight).

[Preparation of Antistatic-Treated Film]

(Antistatic-Treated Film)

The antistatic-treated film of Preparation Example in Example III was used as an antistatic-treated film in Example I.

Example III-1

Preparation of Pressure-Sensitive Adhesive Composition

A solution (40% by weight) of the aforementioned acryl-based polymer (A) was distilled to 20% by weight with ethyl acetate, and to 100 parts by weight of this solution were added 0.2 part by weight of the aforementioned ionic liquid (1), 0.4 part by weight of an isocyanurate of hexamethylene diisocyanate (manufactured by Nippon Polyurethane Industry Co., Ltd, Coronate HX), and 0.4 part by weight of tin dibutyl dilaurate (1% by weight ethyl acetate solution), which is a crosslinking catalyst, which was mixed and stirred for approximately 1 minute at room temperature (25° C.), and whereby, an acryl pressure-sensitive adhesive solution (1) was prepared.

(Preparation of Pressure-Sensitive Adhesive Sheet)

The aforementioned acryl pressure-sensitive adhesive solution (1) was coated on a side opposite to an antistatic-treated side of the antistatic-treated film obtained in Preparation described above, and this was heated at 110° C. for 3 minutes to form a pressure-sensitive adhesive layer having a thickness of 20 mm. Then, a silicone-treated side of a polyethylene terephthalate film having a thickness of 25 mm which had been subjected to silicone-treated was laminated on one side of a surface of the aforementioned pressure sensitive adhesive layer to prepare a pressure-sensitive adhesive sheet.

Example III-2

Preparation of Pressure-Sensitive Adhesive Composition

A solution (35% by weight) of the aforementioned acryl-based polymer (C) was distilled to 20% by weight with ethyl acetate, and to 100 parts by weight of this solution were added 0.12 part by weight of the fatty amine based ionic liquid (manufactured by KOEI Chemical Co., Ltd, IL-A5, liquid at 25° C.), 0.4 part by weight of an isocyanurate of hexamethylene diisocyanate (manufactured by Nippon Polyurethane Industry Co., Ltd, Coronate HX), and 0.4 part by weight of tin dibutyl dilaurate (1% by weight ethyl acetate solution), which is a crosslinking catalyst, which was mixed and stirred for approximately 1 minute at room temperature (25° C.), and whereby, an acryl pressure-sensitive adhesive solution (2) was prepared.

(Preparation of Pressure-Sensitive Adhesive Sheet)

According to the same manner as that of Example III-1 except that the acryl pressure-sensitive adhesive solution (2) was used in place of an acryl pressure-sensitive adhesive solution (1), a pressure-sensitive adhesive sheet was prepared.

Example III-3

Preparation of Pressure-Sensitive Adhesive Composition

A solution (40% by weight) of the aforementioned acryl-based polymer (D) was distilled to 20% by weight with ethyl acetate, and to 100 parts by weight of this solution were added 0.14 part by weight of the aforementioned ionic liquid (1), 0.6 part by weight of an isocyanurate of hexamethylene diisocyanate (manufactured by Nippon Polyurethane Industry Co., Ltd, Coronate HX), and 0.4 part by weight of tin dibutyl dilaurate (1% by weight ethyl acetate solution), which is a crosslinking catalyst, which was mixed and stirred for approximately 1 minute at room temperature (25° C.), and whereby, an acryl pressure-sensitive adhesive solution (3) was prepared.

(Preparation of Pressure-Sensitive Adhesive Sheet)

According to the same manner as that of Example III-1 except that the acryl pressure-sensitive adhesive solution (3) was used in place of an acryl pressure-sensitive adhesive solution (1), a pressure-sensitive adhesive sheet was prepared.

Example III-4

Preparation of Pressure-Sensitive Adhesive Composition

An acryl pressure-sensitive adhesive solution (4) was prepared in the same manner as in Example III-3, except that a solution (40% by weight) of the aforementioned acryl based polymer (E) was used in place of a solution (40% by weight) of the aforementioned acryl-based polymer (D).

(Preparation of Pressure-Sensitive Adhesive Sheet)

According to the same manner as that of Example III-1 except that the acryl pressure-sensitive adhesive solution (4) was used in place of an acryl pressure-sensitive adhesive solution (1), a pressure-sensitive adhesive sheet was prepared.

Example III-5

Preparation of Pressure-Sensitive Adhesive Composition

A solution (40% by weight) of the aforementioned acryl-based polymer (F) was distilled to 20% by weight with ethyl acetate, and to 100 parts by weight of this solution were added 0.2 part by weight of the aforementioned ionic liquid (1), 0.6 part by weight of an isocyanurate of hexamethylene diisocyanate (manufactured by Nippon Polyurethane Industry Co., Ltd, Coronate HX), and 0.4 part by weight of tin dibutyl dilaurate (1% by weight ethyl acetate solution), which is a crosslinking catalyst, which was mixed and stirred for approximately 1 minute at room temperature (25° C.), and whereby, an acryl pressure-sensitive adhesive solution (5) was prepared.

(Preparation of Pressure-Sensitive Adhesive Sheet)

According to the same manner as that of Example III-1 except that the acryl pressure-sensitive adhesive solution (5) was used in place of an acryl pressure-sensitive adhesive solution (1), a pressure-sensitive adhesive sheet was prepared.

Comparative Example III-1

Preparation of Pressure-Sensitive Adhesive Composition

A solution (40% by weight) of the aforementioned acryl-based polymer (B) was distilled to 20% by weight with ethyl acetate, and to 100 parts by weight of this solution were added 0.2 part by weight of the aforementioned ionic liquid (1), 0.4 part by weight of an isocyanurate of hexamethylene diisocyanate (manufactured by Nippon Polyurethane Industry Co., Ltd, Coronate HX), and 0.4 part by weight of tin dibutyl dilaurate (1% by weight ethyl acetate solution), which is a crosslinking catalyst, which was mixed and stirred for approximately 1 minute at room temperature (25° C.), and whereby, an acryl pressure-sensitive adhesive solution (6) was prepared.

(Preparation of Pressure-Sensitive Adhesive Sheet)

According to the same manner as that of Example III-1 except that the acryl pressure-sensitive adhesive solution (6) was used in place of an acryl pressure-sensitive adhesive solution (1), a pressure-sensitive adhesive sheet was prepared.

Comparative Example III-2

Preparation of Pressure-Sensitive Adhesive Composition

An acryl pressure-sensitive adhesive solution (7) was prepared in the same manner as in Example III-2, except that a solution (40% by weight) of the aforementioned acryl based polymer (B) was used in place of a solution (35% by weight) of the aforementioned acryl-based polymer (C).

(Preparation of Pressure-Sensitive Adhesive Sheet)

According to the same manner as that of Example III-1 except that the acryl pressure-sensitive adhesive solution (7) was used in place of an acryl pressure-sensitive adhesive solution (1), a pressure-sensitive adhesive sheet was prepared.

Comparative Example III-3

Preparation of Pressure-Sensitive Adhesive Composition

An acryl pressure-sensitive adhesive solution (8) was prepared in the same manner as in Example III-1, except that the aforementioned ionic liquid (1) was not used.

(Preparation of Pressure-Sensitive Adhesive Sheet)

According to the same manner as that of Example III-1 except that the acryl pressure-sensitive adhesive solution (8) was used in place of an acryl pressure-sensitive adhesive solution (1), a pressure-sensitive adhesive sheet was prepared.

Comparative Example III-4

Preparation of Pressure-Sensitive Adhesive Composition

An acryl pressure-sensitive adhesive solution (9) was prepared in the same manner as in Example III-1, except that 1 part by weight of the aforementioned antistatic agent solution (a) (20% by weight) was used in place of 0.2 part by weight of the aforementioned ionic liquid (1).

(Preparation of Pressure-Sensitive Adhesive Sheet)

According to the same manner as that of Example III-1 except that the acryl pressure-sensitive adhesive solution (9) was used in place of an acryl pressure-sensitive adhesive solution (1), a pressure-sensitive adhesive sheet was prepared.

Comparative Example III-5

Preparation of Pressure-Sensitive Adhesive Composition

A solution (40% by weight) of the aforementioned acryl-based polymer (B) was distilled to 20% by weight with ethyl acetate, and to 100 parts by weight of this solution were added 4 parts by weight of the aforementioned antistatic agent solution (b) (50% by weight), 0.53 part by weight of a trimethylolpropane/tolylene diisocyanate trimer adduct (manufactured by Nippon Polyurethane Industry Co., Ltd, Coronate L), and 0.4 part by weight of tin dibutyl dilaurate (1% by weight ethyl acetate solution), which is a crosslinking catalyst, which was mixed and stirred for approximately 1 minute at room temperature (25° C.), and whereby, an acryl pressure-sensitive adhesive solution (10) was prepared.

(Preparation of Pressure-Sensitive Adhesive Sheet)

According to the same manner as that of Example III-1 except that the acryl pressure-sensitive adhesive solution (10) was used in place of an acryl pressure-sensitive adhesive solution (1), a pressure-sensitive adhesive sheet was prepared.

Regarding the pressure-sensitive adhesive sheets obtained in the aforementioned Examples and Comparative Examples, a peeling electrification voltage, staining property, and an adhesive strength were assessed under the following conditions.

<Measurement of Peeling Electrification Voltage>

A pressure-sensitive adhesive sheet was cut into a size of a width of 70 mm and a length of 130 mm, a separator was peeled, and this was adhered to a surface of a polarizing plate (SEG1425EWVGS2B manufactured by Nitto Denko Corporation, width: 70 mm, length: 100 mm) laminated to an acryl plate (Acrylite manufactured by Mitsubishi Rayon Co., Ltd, thickness: 1 mm, width: 70 mm, length: 100 mm) from which electricity had been removed in advance, with a hand roller, so that one end was protruded by 30 mm.

After allowed to stand for one day under the environment of 23° C.'50% RH, and a sample was set at a prescribed position as shown in FIG. 1. One end protruding by 30 mm was fixed on an automatic winding machine, and a sample was peeled at a peeling angle of 150° and a peeling rate of 10 m/min. A voltage at a polarizing plate surface generated thereupon was measured with an electrostatic voltmeter (KSD-0103 manufactured by Kasuga Denka, INC.) fixed at a prescribed position. Measurement was performed under the environment of 23° C.'50% RH.

<Assessment of Staining Property>

A pressure-sensitive adhesive sheet was cut into a size of a width of 30 mm and a length of 80 mm, a separator was peeled, and this was adhered on a surface of a polarizing plate (SEG1425DU manufactured by Nitto Denko Corporation, width: 70 mm, length: 100 mm), with a hand roller, to prepare an assessment sample.

The aformentioned assessment sample was allowed to stand for a month under the environment 25° C.'50% RH, and, thereafter, the pressure-sensitive adhesive sheet was peeled from an adherend with a hand, and staining state of an adherend surface thereupon was observed with naked eyes. Assessment criteria are as follows:

Case of observation of no staining: ○
Case of observation of staining: x

<Measurement of Adhesive Strength>

Measurement of adhesive strength in Example III was measured as in Example I.

The results of the above are shown in Table 3.

TABLE 3

| | peeling electrification voltage [kV] | staining property [-] | adhesive strength [N/25 mm] |
|---|---|---|---|
| Example III-1 | −0.1 | ○ | 1.2 |
| Example III-2 | 0.0 | ○ | 1.5 |
| Example III-3 | −0.3 | ○ | 0.9 |
| Example III-4 | −0.1 | ○ | 1.0 |
| Example III-5 | 0.0 | ○ | 1.0 |
| Comparative Example III-1 | 0.0 | x | 1.6 |
| Comparative Example III-2 | 0.0 | x | 1.7 |
| Comparative Example III-3 | −1.1 | ○ | 1.4 |
| Comparative Example III-4 | 0.0 | x | 0.3 |
| Comparative Example III-5 | 0.0 | x | 0.5 |

As can be seen from the results shown in the aforementioned Table 3, in the case where the pressure-sensitive adhesive composition manufactured in the present invention was used (Examples III-1 to III-5), it is clear that the peeling electrification voltage of a polarizing plate was suppressed, and staining on a polarizing plate did not occur in any of the Examples.

In contrast to this, in the case where the pressure-sensitive adhesive composition that did not contain a reactive surfactant as a monomer unit of the base polymer was used (Comparative Examples III-1 and III-2), in all cases, the results showed that staining was observed, although the peeling electrification voltage was suppressed. In addition, in the case where a pressure-sensitive adhesive composition that did not contain an ionic liquid was used (Comparative Example III-3), the results showed that the peeling electrification voltage to the polarizing plate, which is an adherend, was high, although no staining was found. Furthermore, in the case where a cation type surfactant was used as an antistatic agent (Comparative Example III-4) and in the case where an alkali metal salt and polyether polyol were used (Comparative Example III-5), the results showed that staining was observed, although the peeling electrification voltage was suppressed. Accordingly, in all of the Comparative Examples, the results showed that suppression of the peeling electrification voltage to the polarizing plate, which is an adherend, and prevention of staining could not both be achieved, and it became clear that these Comparative Examples were not appropriate as a pressure sensitive adhesive composition for an antistatic pressure-sensitive adhesive sheet.

What is claimed is:

1. A pressure-sensitive adhesive composition comprising an ionic liquid, and a (meth)acryl-based polymer containing, as a monomer component, 0.01 to 20% by weight of a reactive surfactant wherein the amount of ionic liquid is 0.01 to 40 parts by weight relative to 100 parts by weight of the (meth)acryl-based polymer.

2. The pressure-sensitive adhesive composition according to claim 1, wherein the ionic liquid is at least one kind or more of a nitrogen-containing onium salt, a sulfur-containing onium salt, and a phosphorus-containing onium salt.

3. The pressure-sensitive adhesive composition according to claim 1, wherein the ionic liquid contains one or more kinds of cations represented by the following general formulas (A) to (D), wherein:

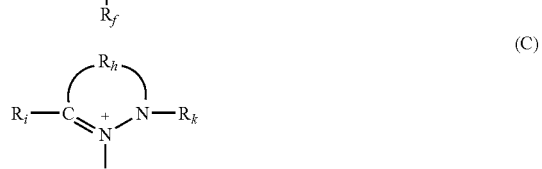

in the formula (A), $R_a$ represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present;

in the formula (B), $R_d$ represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom;

in the formula (C), $R_h$ represents a hydrocarbon group of a carbon number of 2 to 20, and may contain a hetero atom, and $R_i$, $R_j$ and $R_k$ are the same or different, represent a hydrogen or a hydrocarbon group of a carbon number of 1 to 16, and may contain a hetero atom; and in the formula (D), Z represents a nitrogen atom, a sulfur atom, or a phosphorus atom, and $R_l$, $R_m$, $R_n$ and $R_o$ are the same or different, represent a hydrocarbon group of a carbon number of 1 to 20, and may contain a hetero atom, provided that, when Z is a sulfur atom, $R_o$ is not present.

4. The pressure-sensitive adhesive composition according to claim 1, wherein the reactive surfactant is a reactive surfactant having an ethylene oxide group.

5. A pressure-sensitive adhesive layer, wherein the pressure-sensitive adhesive composition as defined in claim 1 is crosslinked.

6. A pressure-sensitive adhesive sheet comprising a pressure-sensitive adhesive layer containing a pressure-sensitive adhesive composition as defined in claim 1 on one side or both sides of a support.

7. A surface protecting film comprising a pressure-sensitive adhesive layer, which is formed by crosslinking a pressure-sensitive adhesive composition as defined in claim 1 on one side or both sides of a support which is provided with an antistatic-treated plastic film.

8. The pressure-sensitive adhesive composition according to claim 1, wherein the acid value of the (meth)acryl-based polymer is 29 or less.

9. A pressure-sensitive adhesive composition comprising an ionic liquid, and a (meth)acryl-based polymer containing, as a monomer component, 0.01 to 20% by weight of a reactive surfactant, wherein the acid value of the (meth)acryl-based polymer is 29 or less.

10. The pressure-sensitive adhesive composition according to claim 9, wherein the (meth)acryl-based polymer contains an acid functional group.

* * * * *

UNITED STATES PATENT AND TRADEMARK OFFICE
CERTIFICATE OF CORRECTION

| | |
|---|---|
| PATENT NO. | : 7,842,742 B2 |
| APPLICATION NO. | : 12/052951 |
| DATED | : November 30, 2010 |
| INVENTOR(S) | : Tatsumi Amano et al. |

It is certified that error appears in the above-identified patent and that said Letters Patent is hereby corrected as shown below:

At Column 6, line 67, after "ionic" insert --liquids having these cations, further excellent antistatic ability is obtained.--.

At Column 9, line 52, change "$R_n$," to --$R_n$--.

At Column 10, line 9, change "methylmidazolium" to --methylimidazolium--.

At Column 10, line 47, change "(2-metoxyetyl)" to --(2-methoxyethyl)--.

At Column 11, line 30, change "(2-metoxy ethyl)" to --(2-methoxy ethyl)--.

At Column 14, line 60 (Structure 9), change " " to -- 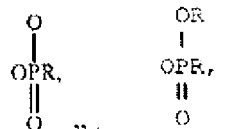 --.

At Column 22, line 5, after "and" insert --R4--.

At Column 23, line 20, change "hydroxalkyl" to --hydroxyalkyl--.

At Column 25, line 52, change "1" to --l--.

At Column 25, line 53, change "n+m+1" to --n+m+l--.

At Column 25, line 55 (Approx.), please change

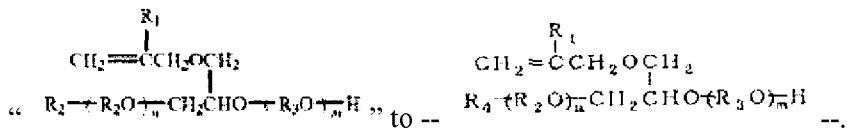

At Column 29, line 32, change "polypropyelene" to --polypropylene--.

At Column 31, line 60, change "melanine" to --melamine--.

At Column 32, line 67, change "diethlene" to --diethylene--.

At Column 33, line 36, change "acetophenes" to --acetophenones--.

At Column 33, line 42, change "thioxanthons" to --thioxanthones--.

Signed and Sealed this
Tenth Day of April, 2012

David J. Kappos
*Director of the United States Patent and Trademark Office*

CERTIFICATE OF CORRECTION (continued)
U.S. Pat. No. 7,842,742 B2

At Column 33, line 52, change "complex." to --complex,--.

At Column 34, line 33, after "mJ/cm$^2$" insert --.--.

At Column 35, line 46, change "alkylbetain" to --alkylbetaine--.

At Column 36, line 9, change "alkylbetain, alkylimidazoliumbetain," to --alkylbetaine, alkylimidazoliumbetaine,--.

At Column 36, line 36, change "melanine" to --melamine--.

At Column 36, line 40, change "melanine" to --melamine--.

At Column 38, line 16, change "0.1N2" to --0.1 N2--.

At Column 38, line 25, change "follows." to --follows:--.

At Column 39, line 42, change "follows." to --follows:--.

At Column 40, line 58, change "vaglue" to --value--.

At Column 46, line 22, change "metoxyethyl" to --methoxyethyl--.

At Column 46, line 25, change "metoxyethyl" to --methoxyethyl--.

At Column 46, line 44, change "aionic" to --anionic--.

At Column 49, line 43, after "width" insert --:--.

At Column 49, line 45, change "aformentioned" to --aforementioned--.

At Column 51, line 28, change "(a))" to --(A))--.

At Column 57, line 32, change "aformentioned" to --aforementioned--.

At Column 58, line 31, change "I-1" to --II-1--.

At Column 64, line 65, change "aformentioned" to --aforementioned--.